US007379242B2

(12) United States Patent
Ushigome

(10) Patent No.: US 7,379,242 B2
(45) Date of Patent: May 27, 2008

(54) POLARIZATION BEAM SPLITTER AND PROJECTION APPARATUS HAVING THE SAME

(75) Inventor: Reona Ushigome, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 168 days.

(21) Appl. No.: 11/200,795

(22) Filed: Aug. 9, 2005

(65) Prior Publication Data
US 2006/0028726 A1 Feb. 9, 2006

(30) Foreign Application Priority Data

Aug. 9, 2004 (JP) ............................. 2004-232126
May 23, 2005 (JP) ............................. 2005-149943

(51) Int. Cl.
*G02B 5/30* (2006.01)
*G02B 27/28* (2006.01)

(52) U.S. Cl. ..................... 359/487; 359/495; 359/638; 353/20

(58) Field of Classification Search .................. None
See application file for complete search history.

(56) References Cited

U.S. PATENT DOCUMENTS

| 5,453,859 | A | * | 9/1995 | Sannohe et al. ............... 349/9 |
| 5,658,490 | A | | 8/1997 | Sharp et al. |
| 5,751,384 | A | | 5/1998 | Sharp |
| 5,822,021 | A | | 10/1998 | Johnson et al. |
| 5,825,849 | A | | 10/1998 | Garland et al. |
| 5,929,946 | A | | 7/1999 | Sharp et al. |
| 5,953,083 | A | | 9/1999 | Sharp |
| 5,990,996 | A | | 11/1999 | Sharp |
| 5,999,240 | A | | 12/1999 | Sharp et al. |
| 6,046,786 | A | | 4/2000 | Sharp et al. |

(Continued)

FOREIGN PATENT DOCUMENTS

JP 11-504441 4/1999
JP 11-153774 6/1999

OTHER PUBLICATIONS

Li Li and J. A. Dobrowolski, "High-performance thin-film polarizing beam splitter operating at angles greater than the critical angle", Applied Optical, vol. 39, pp. 2754-2771, Jun. 1, 2000.

*Primary Examiner*—Stephone B. Allen
*Assistant Examiner*—Lee Fineman
(74) *Attorney, Agent, or Firm*—Morgan & Finnegan LLP

(57) ABSTRACT

The present invention provides a polarization beam splitter including a multilayer film formed by laminating a first layer having a refractive index in a first range, a second layer having a refractive index in a second range which does not overlap the first range, and a third layer having a refractive index in a third range which does not overlap the first or second range in the order of the first layer, the second layer, the first layer, and the third layer in succession, wherein the transmittance of s-polarized light is 60% or more higher than the transmittance of p-polarized light in a first wavelength region, the transmittance of p-polarized light is equal to or higher than 70% in a second wavelength region different from the first wavelength region, and each of the first wavelength region and the second wavelength region has a bandwidth equal to or larger than 30 nm.

19 Claims, 27 Drawing Sheets

U.S. PATENT DOCUMENTS

| | | |
|---|---|---|
| 6,049,367 A | 4/2000 | Sharp et al. |
| 6,078,374 A | 6/2000 | Sharp et al. |
| 6,183,091 B1 | 2/2001 | Johnson et al. |
| 6,252,638 B1 | 6/2001 | Johnson et al. |
| 6,273,571 B1 | 8/2001 | Sharp et al. |
| 6,310,673 B1 | 10/2001 | Sharp |
| 6,310,729 B1 * | 10/2001 | Tsukamoto ................. 359/634 |
| 6,380,997 B1 | 4/2002 | Sharp et al. |
| 6,417,892 B1 | 7/2002 | Sharp et al. |
| 6,452,646 B1 | 9/2002 | Sharp et al. |
| 7,258,445 B2 * | 8/2007 | Okuyama .................... 353/20 |

* cited by examiner

POLARIZATION BEAM SPLITTER AND PROJECTION APPARATUS HAVING THE SAME

BACKGROUND OF THE INVENTION

The present invention relates to a polarization beam splitter and a projection apparatus having the same. The present invention relates to a polarization beam splitter with wavelength selectivity which transmits s-polarized light in a first wavelength band and reflects the s-polarized light in a second wavelength band different from the first wavelength band, and reflects p-polarized light in the first wavelength band and transmits the p-polarized light in the second wavelength band, by way of example. The present invention is particularly preferable for a projection apparatus which employs a light modulator with liquid crystal.

A conventionally well-known polarization beam splitter is a polarization beam splitter (PBS) of a prism type in which polarization splitting is achieved by a dielectric thin film comprised of a number of alternately laminated H layers and L layers between two prisms. Each H layer is formed of a dielectric thin film with high refractive index and each L layer is formed of a dielectric thin film with low refractive index.

The dielectric thin film has the optical characteristic of transmitting p-polarized light and reflecting s-polarized light incident thereon. The principles of the polarization beam splitter are that, for p-polarized light, the incident angle generally matches the Brewster angle θB expressed by the relationship of the refractive index $n_P$ of the material of the prism, the refractive index $n_H$ of the H layer, and the refractive index $n_L$ of the L layer, thereby transmitting the p-polarized light. For s-polarized light, the reflection at the interface between the H layer and the L layer is used to reflect the s-polarized light through multilayer film interaction.

The characteristic of the PBS is degraded when it is used out of design conditions due to variations in factors because of a change in incident angle or wavelength for use. In particular, the conditions for the Brewster angle are sensitive to each constant, so that the p-polarized light is more likely to be affected than the s-polarized light.

In an optical system for use in an image projection apparatus (a projection apparatus), luminous flux radiated from a light source often has a certain angular range, and a wavelength range as wide as the whole range of visual light is used. In general, the number of the layers in the polarization splitting film is added or the thickness of the film is modified to provide favorable characteristics in an intended angular range and wavelength band.

A PBS which reflects p-polarized light and transmits s-polarized light has been reported in "Li Li and J. A. Dobrowolski, Appl. Opt., vol. 39, p. 2754, 2000" (hereinafter referred to as "Document 1"). The incident angle is set to an angle equal to or larger than the critical angle of a prism with high refractive index (a prism made of a material with high refractive index) and a thin film with low refractive index (a thin film made of a material with low refractive index) to produce attenuated total reflection. Since the light after attenuated total reflection has its phase changed, the principles of transmitting p-polarized light and reflecting s-polarized light through interference in a provided multilayer film are used to realize the PBS. This achieves favorable characteristics in a wide range of incident angles.

On the other hand, a dichroic filter is also well-known which has a dielectric thin film comprised of alternately laminated H layers each formed of a dielectric thin film with high refractive index and L layers each formed of a dielectric thin film with low refractive index.

The dichroic film also has the optical characteristic of utilizing interference in the multilayer film through reflection at the interface between the H layer and the L layer to transmit or reflect light in a specific wavelength band. A variety of film structures are known which realize the functions of a high pass filter, a low pass filter, a band pass filter or the like. In particular, to separate the wavelength bands for red, green, and blue from each other, it is possible to use a long wavelength transmission filter, a wavelength band pass filter, a short wavelength transmission filter or the like. The characteristic of the dichroic filter is degraded when the incident angle and polarization conditions are out of design conditions.

When the incident angle is changed, the optical admittance of the thin film material is changed to widen the transmission band of p-polarized light (or narrow the reflection band) and narrow the transmission band of s-polarized light (or widen the reflection band). As a result, the transition wavelengths at the shift from the transmission band to the reflection band are changed in opposite directions in the p-polarized light and s-polarized light.

Thus, design is typically made such that the number of the layers in the polarization splitting film is added or the thickness of the film is modified to widen the angular range for use and reduce the polarization dependence in p-polarized light and s-polarized light. On the contrary, design may be made by taking advantage of the difference in characteristics depending on polarization.

The PBS or dichroic filter is used to form a color separation/combination optical system (a color separation/color combination means) of an image projection apparatus.

FIG. 27 shows an example of a conventional image projection apparatus which employs a light modulator of a reflection type realized with liquid crystal.

Arrows represent the optical paths of light beams for red, green, and blue in white display (image information is for white color). Solid lines represent s-polarized light, while broken lines represent p-polarized light.

White light emits from a light source 51, and unified into s-polarized light by a polarization changer 52. A dichroic mirror 53a transmits a light beam 30 in a green wavelength band, and reflects a light beam 40 in a red wavelength band and a light beam 20 in a blue wavelength band.

The light beam 30 in the green wavelength band transmitted through the dichroic mirror 53a is reflected by a PBS 54a, incident on a reflection type light modulator 55g realized with liquid crystal for green, and modulated. For the white display, the modulated light emerges therefrom as p-polarized light 31 which is then transmitted through the PBS 54a and a PBS 54c and is incident on a projection lens system (a projection optical system) 57 for projection.

The light beam 20 in the blue wavelength band reflected by the dichroic mirror 53a is changed into p-polarized light 21 by a wavelength selective phase shifter 56b, transmitted through a PBS 54b, and incident on a reflection type light modulator 55b realized with liquid crystal for blue and then modulated.

For the white display, the modulated light emerges therefrom as s-polarized light 20, so that it is reflected by the PBS 54b and maintained as the s-polarized light 20 through a wavelength selective phase shifter 56r. It is then reflected by the PBS 54c and is incident on the projection lens system 57 for projection.

The light beam 40 in the red wavelength band reflected by the dichroic mirror 53a is maintained as the s-polarized light 40 through the wavelength selective phase shifter 56b, reflected by the PBS 54b, and incident on a reflection type light modulator 55r realized with liquid crystal for red, and then modulated. For the white display, since the modulated light emerges therefrom as p-polarized light 41, it is transmitted through the PBS 54b, changed into s-polarized light 40 through the wavelength selective phase shifter 56r, reflected by the PBS 54c, and incident on the projection lens system 57 for projection.

For black display (image information is for black color), all of the light beams emerge from the reflection type light modulators 55r, 55g, or 55b with the same polarization as when they are incident thereon, so that they return toward the light source 51 along the same optical paths through the respective optical members. The color separation/combination means as described above is used to take advantage of the reflection type light modulator realized with the liquid crystal with high resolution and to form a small apparatus.

The conventional PBS aims to transmit p-polarized light and reflect s-polarized light throughout the wavelength band for use. The PBS described in Document 1 reflects p-polarized light and transmits s-polarized light. All of the PBSs are devices for providing polarization splitting throughout the wavelength band for use. None of the previously reported PBSs has wavelength selectivity or has polarization splitting characteristics reversed in different wavelength bands such that it transmits s-polarized light and reflects p-polarized light in a first wavelength band and reflects s-polarized light and transmits p-polarized light in a second wavelength band different from the first wavelength band.

In the dichroic filter, the transmission band of p-polarized light is widened and the transmission band of s-polarized light is narrowed when light is obliquely incident thereon, so that polarization splitting is performed in a certain wavelength band. However, p-polarized light is transmitted and s-polarized light is reflected at all times, and p-polarized light is not reflected and s-polarized light is not transmitted. Thus, it does not have the characteristic depending on wavelength such that it transmits s-polarized light and reflects p-polarized light in a first wavelength band and reflects s-polarized light and transmits p-polarized light in a second wavelength band different from the first wavelength band.

The color separation/combination in the image projection apparatus shown in FIG. 27 requires the two wavelength selective phase shifters 56b and 56r. Each of the wavelength selective phase shifters 56b and 56r is comprised of a plurality of laminated stretched polycarbonate films with birefringence such that their anisotropy axes are arranged at particular angles, as described in U.S. Pat. No. 5,658,490 (hereinafter referred to as "Document 2"). It involves a more complicated fabricating method and thus is an expensive optical device as compared with the PBS or dichroic filter formed with the dielectric thin film using a deposition method.

Since the polycarbonate is a polymer film, it is highly susceptible to the influence of external environment such as heat, humidity, and ultraviolet rays in view of the physical property of the material, and the reliability and durability of the color separation/combination means may be reduced. In addition, the low surface accuracy may cause flare if it is used in an optical system. On the other hand, depending on an anti-reflection film, each of the projection lenses reflects some amount of light, and the reflected light returns toward the color separation/combination means as return light. In the conventional color separation/combination means, the return light reaches the light modulator realized with liquid crystal and thus causes flare.

Japanese Patent Laid-Open No. 11-504441 (hereinafter referred to as "Document 3") has disclosed a projection apparatus which employs a reflection type light modulator realized with liquid crystal without a wavelength selective phase shifter. Document 3 has disclosed a color separation/combination means which employs a PBS having the effect of reflecting p-polarized light and transmitting s-polarized light in a blue wavelength band and transmitting p-polarized light and reflecting s-polarized light in green and red wavelength bands. However, the PBS is only described in terms of its functions, and a method of realizing it has not been disclosed.

A polarization beam splitter with wavelength selectivity (a wavelength selective polarization beam splitter) which transmits s-polarized light and reflects p-polarized light in a first wavelength band and reflects s-polarized light and transmits p-polarized light in a second wavelength band different from the first wavelength band has not been realized.

It is an object of the present invention to provide a wavelength selective polarization beam splitter which transmits s-polarized light and reflects p-polarized light in a first wavelength band and reflects s-polarized light and transmits p-polarized light in a second wavelength band different from the first wavelength band.

It is another object of the present invention to realize a projection apparatus which employs the wavelength selective polarization beam splitter as a color separation/color combination means (a color separation/combination system) of the projection apparatus to simplify the structure and achieve high contrast with excellent reliability and durability.

BRIEF SUMMARY OF THE INVENTION

According to an aspect, the present invention provides a polarization beam splitter including a multilayer film formed by laminating a first layer having a refractive index in a first range, a second layer having a refractive index in a second range which does not overlap the first range, and a third layer having a refractive index in a third range which does not overlap the first or second range in the order of the first layer, the second layer, the first layer, and the third layer, wherein the transmittance of s-polarized light is 60% or more higher than the transmittance of p-polarized light in a first wavelength region, the transmittance of p-polarized light is equal to or higher than 70% in a second wavelength region different from the first wavelength region, and each of the first wavelength region and the second wavelength region has a bandwidth equal to or larger than 30 nm.

According to another aspect, the present invention provides an image display apparatus including a first image display device, a second image display device, and a color combination optical system which combines first image light emerging from the first image display device and second image light emerging from the second image display device, wherein the color combination optical system has the polarization beam splitter according to the abovementioned aspect.

BRIEF DESCRIPTION OF THE DRAWINGS

FIG. 1(a) shows s-polarized light and FIG. 1(b) shows p-polarized light.

FIG. 26(a) shows the optical paths for white display and FIG. 26(b) shows the optical paths of return light from a projection lens system.

DETAILED DESCRIPTION OF THE PREFERRED EMBODIMENTS

Figure 1A:
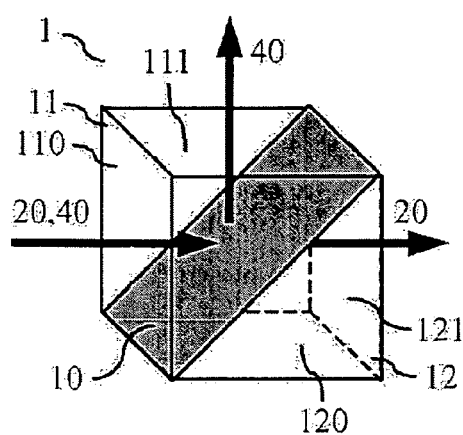
FIGS. 1(a) and 1(b) schematically show the basic operation (characteristic) of a polarization beam splitter with wavelength selectivity, and specifically.

Preferred embodiments will hereinafter be described.

A polarization beam splitter of each of the embodiments includes a multilayer film formed by laminating a first layer having a refractive index in a first range, a second layer having a refractive index in a second range which does not overlap the first range, and a third layer having a refractive index in a third range which does not overlap the first or second range in the order of the first layer, the second layer, the first layer, and the third layer (in succession). The polarization beam splitter has transmittance of s-polarized light (at least 70% or more) which is 60% or more higher than the transmittance of p-polarized light (at least 30% or less) in a first wavelength region (a region having a band of at least 30 nm or more from 450 to 480 nm, and more preferably, from 440 to 485 nm) and has transmittance of p-polarized light equal to or higher than 70% in a second wavelength band (a region having a band of at least 30 nm or more from 600 to 630 nm, and more preferably, from 590 to 640 nm) different from the first wavelength band. Each of the first wavelength region and the second wavelength region has a bandwidth equal to or larger than 30 nm. Alternatively, the polarization beam splitter has transmittance of s-polarized light 60% or more higher than the transmittance of p-polarized light in a first wavelength region (preferably at least part of a blue wavelength region from 400 to 500 nm) and has transmittance of p-polarized light 60% or more higher than the transmittance of s-polarized light in a second wavelength band (preferably at least part of a red wavelength region from 570 to 700 nm) different from the first wavelength band. Each of the first wavelength region and the second wavelength region has a bandwidth equal to or larger than 30 nm.

The multilayer film is a multilayer film formed by laminating the first layer, the second layer, the first layer, and the third layer in this order in succession five times or more.

The first wavelength region and the second wavelength region are included in region of visible wavelength (400 nm or higher and 700 nm or lower). The first wavelength region includes a band of 450 nm to 480 nm and the second wavelength region includes a band of 600 nm to 630 nm.

When a layer of the first, second, and third layers with the highest refractive index is an H layer (a high refractive index layer), a layer of the three layers with the second highest refractive index is an M layer (a middle refractive index layer), and a layer of the three layers with the lowest refractive index is an L layer (a low refractive index layer), then the high refractive index layer has a refractive index of 2.0 or higher and 2.6 or lower, the middle refractive index layer has a refractive index of 1.59 or higher and 1.9 or lower, and the low refractive index layer has a refractive index of 1.25 or higher and 1.56 or lower.

In the polarization beam splitter in claim 7 according to any one of claims 1 to 6, when a layer of the first, second, and third layers with the highest refractive index is an H layer (a high refractive index layer), a layer of the three layers with the second highest refractive index is an M layer (a middle refractive index layer), and a layer of the three layers with the lowest refractive index is an L layer (a low refractive index layer), then the difference in the refractive index between the high refractive index layer and the middle refractive index layer is 0.35 or higher and 0.9 or lower, and the difference in the refractive index between the middle refractive index layer and the lower refractive index layer is 0.12 or higher and 0.55 or lower.

The multilayer film is sandwiched between a substance made of a first material having a refractive index of 1.55 or higher and 2.10 or lower and a substance made of a second material having a refractive index of 1.40 or higher and 1.70 or lower.

At least one of the first layer, the second layer, and the third layer includes two layers having refractive indexes different from each other.

The first range corresponds to the highest range of refractive indexes of the first, second, and third ranges. In the polarization beam splitter, when a layer of the first, second, and third layers with the highest refractive index is an H layer, a layer of the three layers with the second highest refractive index is an M layer, a layer of the three layers with the lowest refractive index is an L layer, the refractive indexes of the H layer, L layer, and M layer are represented as $n_H$, $n_L$, and $n_M$, a design wavelength is represented as $\lambda$, the multilayer film is formed by laminating the first H layer, the M layer, the second H layer, and the L layer in this order in succession, and the film thickness of the first H layer, the M layer, the second H layer, and the L layer are represented as $b \times \lambda/(4n_H)$, $c \times \lambda/(4n_M)$, $d \times \lambda/(4n_H)$, $a \times \lambda/(4n_L)$, then $0<a<3$, $0<b\leq 1$, $0<c<5$, and $0<d\leq 1$ are satisfied.

In the polarization beam splitter, when a layer of the first, second, and third layers with the highest refractive index is an H layer, a layer of the three layers with the second highest refractive index is an M layer, a layer of the three layers with the lowest refractive index is an L layer, the refractive indexes of the H layer, L layer, and M layer are represented as $n_H$, $n_L$, and $n_M$, a design wavelength is represented as $\lambda$, the multilayer film is formed by laminating the first H layer, the M layer, the second H layer, and the L layer in this order in succession, and the film thickness of the first H layer, the M layer, the second H layer, and the L layer are represented as $b\times\lambda/(4n_H)$, $c\times\lambda/(4n_M)$, $d\times\lambda/(4n_H)$, $a\times\lambda/(4n_L)$, then $0<b\leq a\leq c<5$, $0<d\leq a\leq c<5$ are satisfied.

The first range corresponds to the second highest range of refractive indexes of the first, second, and third ranges. In the polarization beam splitter, when a layer of the first, second, and third layers with the highest refractive index is an H layer, a layer of the three layers with the second highest refractive index is an M layer, a layer of the three layers with the lowest refractive index is an L layer, the refractive indexes of the H layer, L layer, and M layer are represented as $n_H$, $n_L$, and $n_M$, a design wavelength is represented as $\lambda$, the multilayer film is formed by laminating the first M layer, the L layer, the second M layer, and the H layer in this order in succession, and the film thickness of the first M layer, the L layer, the second M layer, and the H layer are represented as $a\times\lambda/(4n_M)$, $b\times\lambda/(4n_L)$, $c\times\lambda/(4n_M)$, $d\times\lambda/(4n_H)$, then $0<a<6$, $0<c<6$, $d<b$, $0<b<5$, and $0<d<2$ are satisfied.

When a layer of the first, second, and third layers with the highest refractive index is an H layer, a layer of the three layers with the second highest refractive index is an M layer, a layer of the three layers with the lowest refractive index is an L layer, the refractive indexes of the H layer, L layer, and M layer are represented as $n_H$, $n_L$, and $n_M$, a design wavelength is represented as $\lambda$, the multilayer film is formed by laminating the first M layer, the L layer, the second M layer, and the H layer in this order in succession, and the film thickness of the first M layer, the L layer, the second M layer, and the H layer are represented as $a\times\lambda/(4n_M)$, $b\times\lambda/(4n_L)$, $c\times\lambda/(4n_M)$, $d\times\lambda/(4n_H)$, then $0<a<3$, $0<c<6$, $d<b$, $0<b<2$, and $0<d<1$ are satisfied.

The first range corresponds to the lowest range of refractive indexes of the first, second, and third ranges. In the polarization beam splitter, when a layer of the first, second, and third layers with the highest refractive index is an H layer, a layer of the three layers with the second highest refractive index is an M layer, a layer of the three layers with the lowest refractive index is an L layer, the refractive indexes of the H layer, L layer, and M layer are represented as $n_H$, $n_L$, and $n_M$, a design wavelength is represented as $\lambda$, the multilayer film is formed by laminating the first L layer, the H layer, the second L layer, and the M layer in this order in succession, and the film thickness of the first L layer, the H layer, the second L layer, and the M layer are represented as $a\times\lambda/(4n_L)$, $b\times\lambda/(4n_H)$, $c\times\lambda/(4n_L)$, $d\times\lambda/(4n_M)$, then $0<a<3$, $0<b<5$, $d<b$, $0<c<3$, and $0<d\leq 1$ are satisfied.

In the polarization beam splitter in claim 18 according to claim 16 or 17, when a layer of the first, second, and third layers with the highest refractive index is an H layer, a layer of the three layers with the second highest refractive index is an M layer, a layer of the three layers with the lowest refractive index is an L layer, the refractive indexes of the H layer, L layer, and M layer are represented as $n_H$, $n_L$, and $n_M$, a design wavelength is represented as $\lambda$, the multilayer film is formed by laminating the first L layer, the H layer, the second L layer, and the M layer in this order in succession, and the film thickness of the first L layer, the H layer, the second L layer, and the M layer are represented as $a\times\lambda/(4n_L)$, $b\times\lambda/(4n_H)$, $c\times\lambda/(4n_L)$, $d\times\lambda/(4n_M)$, then $0<b\leq a\leq c<5$, $0<d\leq a\leq c<5$ are satisfied.

According to an aspect, the present invention provides an image display apparatus includes a first image display device, a second image display device, and a color combination optical system which combines first image light emerging from the first image display device and second image light emerging from the second image display device, wherein the color combination optical system has the polarization beam splitter as described above.

According to another aspect, the present invention provides an image display apparatus including a first reflection type liquid crystal display device which is provided for first color light, a second reflection type liquid crystal display device which is provided for second color light different from the first color light, an illumination optical system which illuminates the first and second reflection type liquid crystal display devices with light from a light source, and a projection optical system which projects light from the first and second reflection type liquid crystal display devices to a projected surface, wherein the illumination optical system includes the polarization beam splitter as described above, and the first color light in a first polarization state and the second color light in the first polarization state are directed to the polarization beam splitter to illuminate the first reflection type liquid crystal display device with the first color light in the first polarization state and illuminate the second reflection type liquid crystal display device with the second color light in the first polarization state, and the polarization beam splitter color-combines the first color light in a second polarization state and the second color light in the second polarization state emerging from the first reflection type liquid crystal display device and the second reflection type liquid crystal display device, respectively, to direct the combined light to the projection optical system, the second polarization state showing a polarization direction orthogonal to the first polarization state.

Examples of the present invention will hereinafter be described in detail with reference to the drawings.

EXAMPLE 1

Figure 1B:
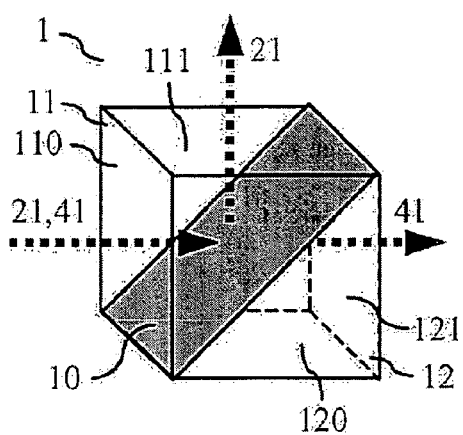

FIGS. 1(a) and 1(b) are schematic diagrams showing the main portions of a polarization beam splitter with wavelength selectivity (a wavelength selective polarization beam splitter) of Example 1. FIGS. 1(a) and 1(b) simply illustrate the characteristic of the wavelength selective polarization beam splitter. The wavelength selective polarization beam splitter 1 of Example 1 is formed by bonging a prism on an incident side (an optical member) 11 and a prism on an emergence side (an optical member) 12. A multilayer film structure 10 with a structure described later is provided on a plane inclined 45 degrees with respect to an incident surface 110 of the incident-side prism 11 and an emergence surface 121 of the emergence-side prism 12.

Luminous flux incident on the multilayer film structure 10 of the wavelength selective polarization beam splitter 1 has an incident angle (in design) of 45 degrees (in other words, it has almost ideal characteristics for light incident thereon at an incident angle of 45 degrees). The characteristic of the wavelength selective polarization beam splitter 1 depends on the polarization direction and wavelength band. The wavelength selective polarization beam splitter 1 has the characteristic of higher transmittance of s-polarized light than that of p-polarized light for light in a wavelength range (lower reflectance of s-polarized light than that of p-polarized light), and lower transmittance of s-polarized light than that of p-polarized light for light in a wavelength range different from that wavelength region (higher reflectance of s-polarized light than that of p-polarized light).

It is assumed that a light beam 20 of s-polarized light in a blue wavelength band (in a wavelength band of at least 450 to 480 nm, and preferably, 445 to 480 nm) and a light beam 40 of s-polarized light in a red wavelength band (in a wavelength band of at least 600 to 630, and preferably, 590 to 640 nm) are incident on the wavelength selective polarization beam splitter 1. In this case, as shown in FIG. 1(a), the light beam 20 in the blue wavelength band is transmitted through the multilayer structure 10 and emerges from the emergence surface 121, while the light beam 40 in the red wavelength band is reflected by the multilayer film structure 10 and emerges from an emergence surface 111. As shown in FIG. 1(b), when a light beam 21 of p-polarized light in the blue wavelength band and a light beam 41 of p-polarized light in the red wavelength band are incident thereon, the light beam 21 in the blue wavelength band is reflected by the multilayer film structure 10 and emerges from the emergence surface 111, while the light beam 41 in the red wavelength band is transmitted through the multilayer structure 10 and emerges from the emergence surface 121 as shown in FIG. 1(b).

The multilayer film structure 10 provided for the wavelength selective polarization beam splitter 1 of Example 1 is formed to include a multilayer film provided by laminating three kinds of thin films, that is, an H layer with high refractive index, an L layer with low refractive index, an M layer with middle refractive index between those of the H and L layers, in the order of H, M, H, and L. The refractive index of each layer and the thickness of the film can be appropriately set as described below to provide a polarization beam splitter which transmits s-polarized light and reflects p-polarized light in a wavelength band.

The polarization beam splitter 1 is comprised of the incident-side prism 11 made of a material with a refractive index of 1.85, the multilayer film provided closer to the emergence side than the incident-side prism 11 and made of three (or four or more) kinds of materials with different refractive indexes from each other, that is, the high refractive index layer (hereinafter referred to as the "H layer") made of a material with a refractive index of 2.32, the low refractive index layer (hereinafter referred to as the "L layer") made of a material with a refractive index of 1.39, and the middle refractive index layer (hereinafter referred to as the "M layer") made of a material with a refractive index of 1.65, and an adhesive with a refractive index of 1.55 provided on the emergence side of the multilayer film.

Figure 2A:
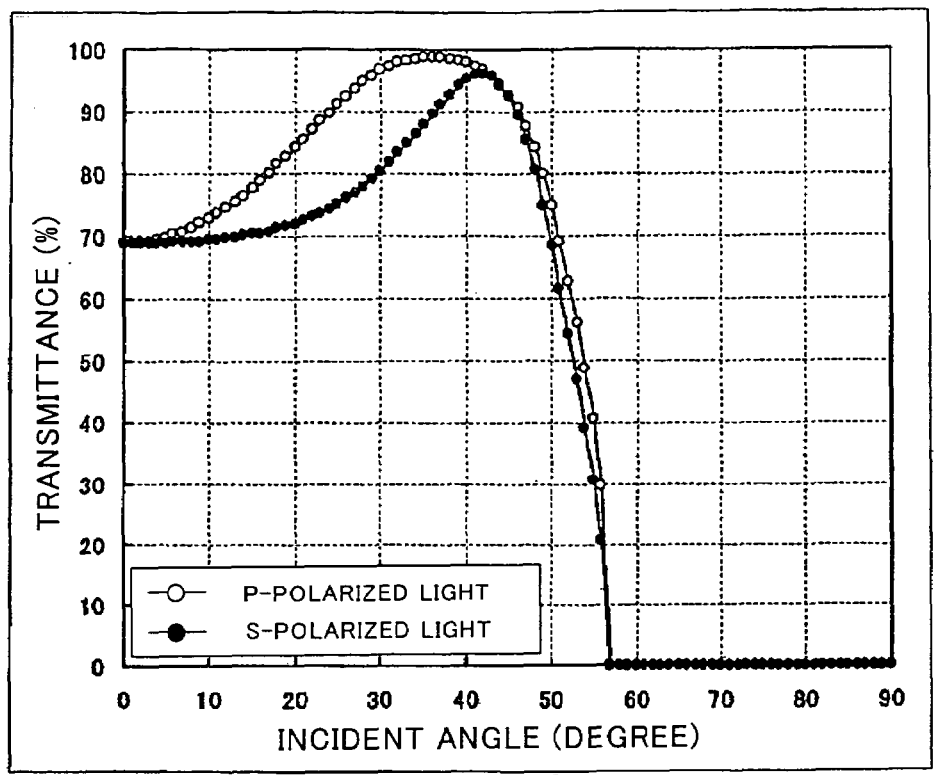
FIG. 2(a) shows the simulation result of the angular characteristic of transmittance of s-polarized light and p-polarized light at a wavelength of 500 nm in the film structure expressed as Prism|1.0L0.5H1.0M0.5H|Adhesive when an incident-side prism is made of a material having a refractive index of 1.85, an H layer has a refractive index of 2.32, an L layer has a refractive index of 1.39, an M layer has a refractive index of 1.65, and an adhesive with a refractive index of 1.55 is used on the emergence side.

The refractive indexes of the materials of the H layer, L layer, and M layer are represented as $n_H$, $n_L$, and $n_M$. The thicknesses of the H layer, L layer, and M layer (the actual thicknesses, not the distances of air determined from conversion) are represented as $d_H$, $d_L$, and $d_M$. The design wavelength (550 nm in this case) is represented as $\lambda$. The quarter wavelength thicknesses of the H layer, L layer, and M layer (H=$\lambda/(4n_H)$ for the H layer, L=$d_L$=$\lambda/(4n_L)$ for the L layer, M=$\lambda/(4n_M)$ for the M layer) are represented as H, L, and M. In this case, FIG. 2(a) shows the angular characteristic of the transmittance of s-polarized light and p-polarized light at a wavelength of 550 nm in the multilayer film structure formed by laminating the incident-side prism, 1.0×L, 0.5×H, 1.0×M, 0.5×H, and the adhesive (hereinafter such a multilayer film structure is represented as "Prism|1.0L0.5H1.0M0.5H|Adhesive") in order from the incident side. The incident prism and the adhesive provided on the emergence side may be made of different materials as long as the same refractive indexes are maintained (for example, the adhesive and the prism may be provided on the incident side and the emergence side, respectively).

Figure 2B:
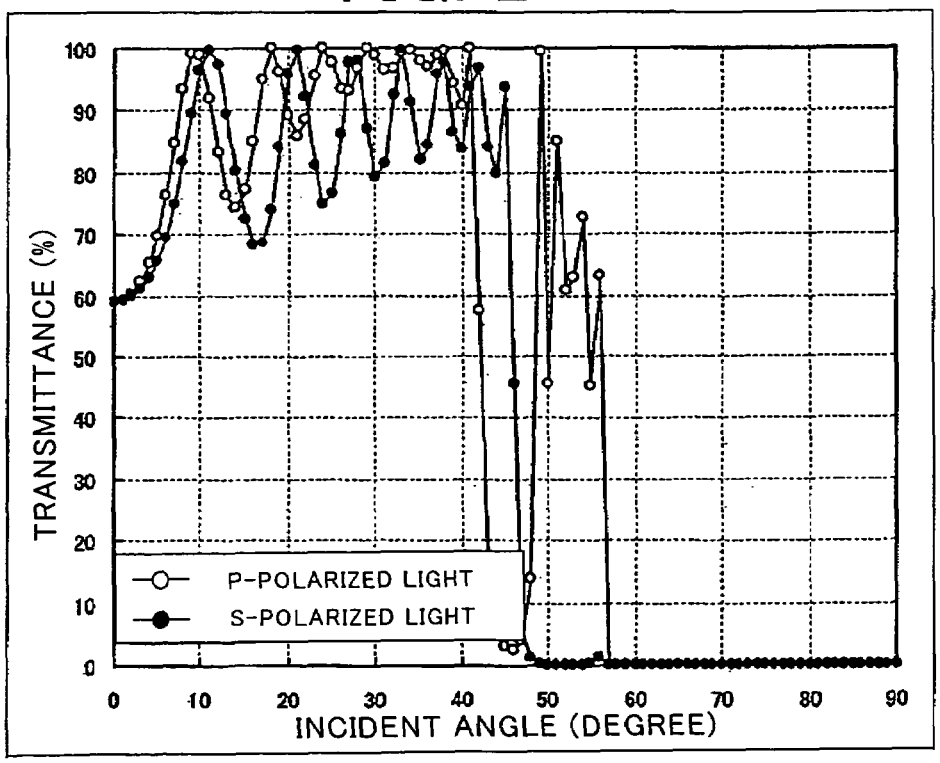
FIG. 2(b) shows the simulation result of the angular characteristic of transmittance of s-polarized light and p-polarized light at a wavelength of 550 nm in the film structure expressed as Prism|(1.0L0.5H1.0M0.5H)$^{10}$|Adhesive when the incident-side prism is made of a material having a refractive index of 1.85, the H layer has a refractive index of 2.32, the L layer has a refractive index of 1.39, the M layer has a refractive index of 1.65, and the adhesive with a refractive index of 1.55 is used on the emergence side.

In FIG. 2(a), the transmittance of s-polarized light is larger than that of p-polarized light at incident angles of 42 to 44 degrees, although the difference is small. FIG. 2(b) shows the angular characteristic of the transmittance of s-polarized light and p-polarized light at a wavelength of 550 nm in a polarization beam splitter having a multilayer film of 10 repetitions of the arrangement comprised of the L layer, H layer, M layer, and H layer (or the H layer, M layer, H layer, and L layer). The structure of the polarization beam splitter having the multilayer film of 10 repetitions of the arrangement of the L layer, H layer, M layer, and H layer is represented as "Prism|(1.0L0.5H1.0M05.H)$^{10}$|Adhesive."

Figure 3:
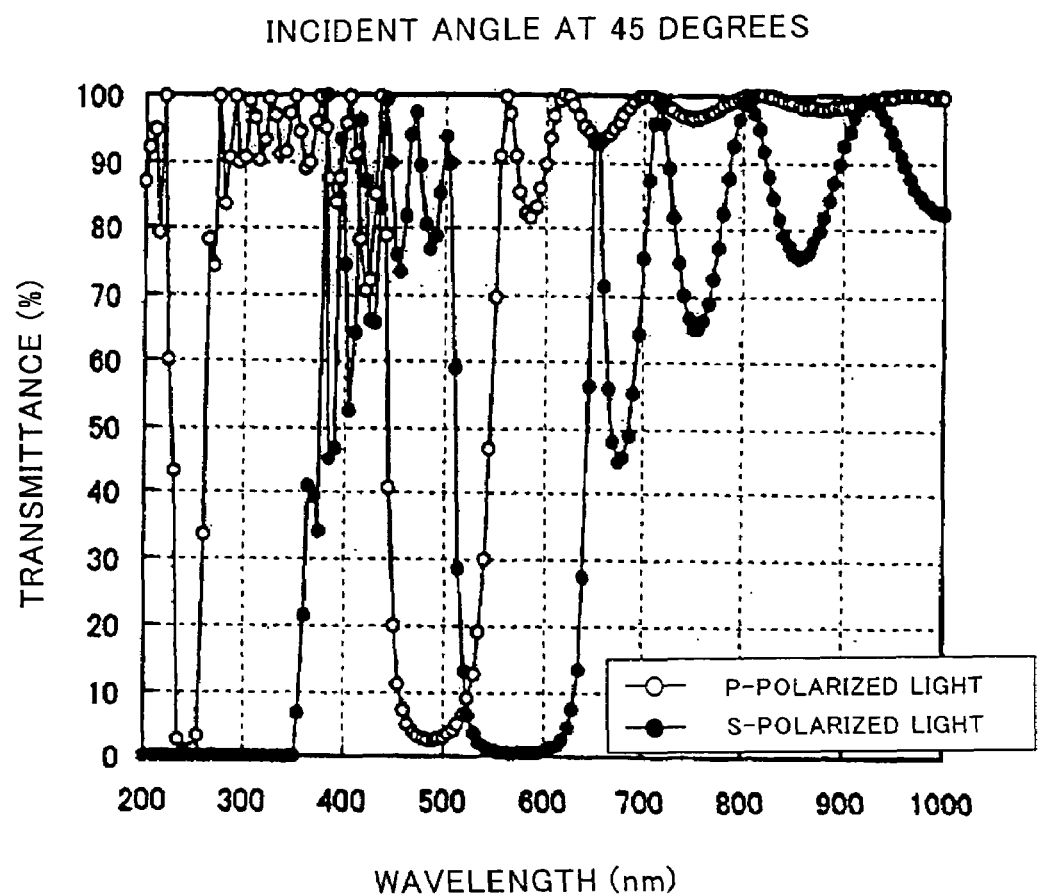
FIG. 3 shows the simulation result of the wavelength characteristic of transmittance of s-polarized light and p-polarized light at an incident angle of 45 degrees in the film structure expressed as Prism|(1.0L0.5H1.0M0.5H)$^{10}$|Adhesive when the incident-side prism is made of a material having a refractive index of 1.85, the H layer has a refractive index of 2.32, the L layer has a refractive index of 1.39, the M layer has a refractive index of 1.65, and the adhesive with a refractive index of 1.55 is used on the emergence side.

As compared with FIG. 2(a), the difference in transmittance between s-polarized light and p-polarized light is increased to show the obvious polarization splitting. FIG. 3 shows the wavelength characteristic of the transmittance in the multilayer film at an incident angle of 45 degrees. The multilayer film basically shows the characteristic of an edge filter in which a transmission band and a reflection band alternately appear, and it is characterized by significant polarization splitting in the s-polarized light and p-polarized light. The significant polarization splitting is used to provide the characteristic that s-polarized light is transmitted and p-polarized light is reflected in the blue wavelength band (a first wavelength band), while s-polarized light is reflected and p-polarized light is transmitted in the red wavelength band (a second wavelength band). In other words, the basic characteristic of the wavelength selective polarization beam splitter is shown. As a result of study, the multilayer film structure satisfies the following relationship for the basic film structure, and the refractive index of each layer and the film thickness are appropriately selected, thereby allowing an excellent polarization beam splitter. Specifically, a multilayer film or a polarization beam splitter having the multilayer film is designed to satisfy $0<a<3$, $0<b\leq1$, $0<c<5$, $0<d\leq1$ (a, b, c, and d are real numbers) when the thicknesses of the H layer, M layer, H layer, and L layer laminated repeatedly in the first multilayer film described above are set to b×H, c×M, d×H, and a×L, respectively.

It is also possible to provide a multilayer film or a polarization beam splitter with a more favorable angular characteristic when the multilayer film structure of the first multilayer film is formed to satisfy the relationship: $0<a<1.5$, $0<b\leq1$, $0<c<2$, $0<d\leq1$ (a, b, c, and d are real numbers).

However, some ripple is found in the transmission wavelength band (an incident angle of 45 degrees) in FIG. 3. The film thickness was adjusted (optimized) in order to reduce the ripple and adjust the wavelength band. PBH56 (product name) manufactured by OHARA Inc. (the material thereof having a refractive index of 1.85 at a wavelength of 550 nm) was used for the incident prism 11, $TiO_2$ (with a refractive index of 2.32 at a wavelength of 550 nm) was used for the H layer, $MgF_2$ (with a refractive index of 1.39 at a wavelength of 550 nm) was used for the L layer, $Al_2O_3$ (with a refractive index of 1.65 at a wavelength of 550 nm) was used for the M layer, and an adhesive with a refractive index of 1.55 was used on the emergence side. In each of Examples described below, the same materials can be used for the H layer, L layer, and M layer.

Figure 4:
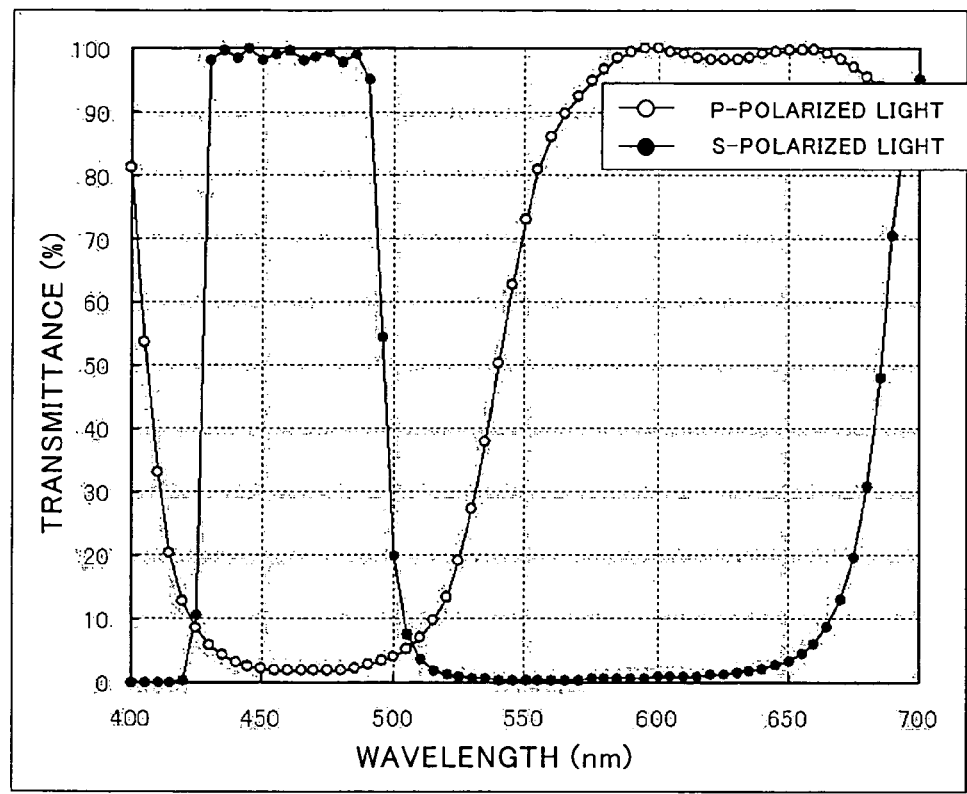
FIG. 4 shows the simulation result of transmittance of s-polarized light and p-polarized light in the wavelength selective polarization beam splitter in Example 1.

Table 1 shows the film thickness of each layer of the first multilayer film after the adjustment of the film thickness. FIG. 4 shows the transmittance characteristic (at an incident angle of 45 degrees) of the polarization beam splitter having the multilayer layer. In Table 1, the number of a layer represents the order from the incident side. As seen from Table 1, the number of the layers in the first multilayer layer was 40 in total.

As apparent from FIG. 4, it is possible to provide the polarization beam splitter (the wavelength selective polarization beam splitter) in which, for the light in the blue wavelength range (particularly 440 to 480 nm) of the light incident on the first multilayer film at an incident angle of 45 degrees, the transmittance of s-polarized light is 60% or more higher than that of p-polarized light (s-polarized light is transmitted and p-polarized light is reflected), and for the light in the red wavelength band (particularly 580 to 660 nm), the transmittance of p-polarized light is 60% or more higher than that of s-polarized light (s-polarized light is reflected and p-polarized light is transmitted).

The number of layers and the film thickness are not limited to those described in Table 1. Even when the film thickness is changed somewhat, or one or two films not described in Table 1 are included in the multilayer film, it can be considered as falling within substantially the same scope as that described in Example 1.

While the optimizing method is used to reduce the ripple, it is possible to design a monolayer or a multilayer as an adjusting layer and optimize a multilayer film by arranging the adjusting layer. Since the equivalent optical characteristic can also be provided when a conventional film design method is used such as a symmetric multilayer film structure, the optimization method is not limited to that described in Example 1.

The number of necessary layers depends on the specifications of the polarization splitting value, the central angle for use, and the angular range for use. Thus, the present invention is not limited to the number of layers described in Table 1 or other Tables.

It is possible to provide a layer with no optical effect or slight optical effect between the adjacent ones of the H layer, M layer, and L layer. For example, the layer may be provided to satisfy the following expression generally:

$nd \leq 2$ nm where n represents the refractive index and d represents the thickness.

The H layer is the thin film layer having the refractive index falling within the highest range of refractive indexes. The M layer is the thin film layer having the refractive index falling within the range of refractive indexes lower than those of the H layer. The L layer is the thin film layer having the refractive index falling within the range of refractive indexes lower than those of the M layer. Thus, in the multilayer film structure having the repetitions of the arrangement of the L layer, H layer, M layer, and H layer, the H layer has the higher refractive index than those of the adjacent thin films, the L layer has the lower refractive index than those of the adjacent thin films, and the M layer has the higher refractive index than that of one of the adjacent thin films and the lower refractive index than that of the other of the adjacent thin films. It goes without saying that each of the H layer, M layer, and L layer does not need to be made of a single kind of material, and a plurality of materials may be used as long as they have refractive indexes falling within the associated ranges.

In the multilayer film structure of Example 1, it is desirable that the arrangement of the L layer, H layer, M layer, and H layer (or the multilayer film including the H layer, M layer, H layer, and L layer in this order) is repeated ten times or more (at least five times) (preferably, they are repeatedly laminated without any other layers sandwiched).

The multilayer film (the first multilayer film) has the optical characteristic of having high transmittance of s-polarized light in the first wavelength band and low transmittance of s-polarized light in the second wavelength band different from the first wavelength band, and low transmittance of p-polarized light in the first wavelength band and high transmittance of p-polarized light in the second wavelength band. It is desirable that each of the first wavelength band and the second wavelength band has a bandwidth of 30 nm or more (preferably 50 nm or more) and the difference in transmittance between s-polarized light and p-polarized light is 60% or higher (preferably 75% or higher) in each of the first wavelength region and the second wavelength region each having the bandwidth of 30 nm or more.

As shown in FIGS. 1(a) and 1(b), the wavelength selective polarization beam splitter has the multilayer film structure 10 disposed between the incident-side prism 11 and the emergence-side prism 12. Reflection occurs on the bonding surface of the adhesive and the prism on which the multilayer film is not disposed. The reflection reduces the transmittance in the transmission band. It is thus preferable to provide an anti-reflection structure on the bonding surface of the prism and the adhesive. As the anti-reflection structure, a well-known monolayer or multilayer anti-reflection film or the like can be used.

The polarization beam splitter described in Example 1 and other polarization beam splitters described in Examples below hardly absorb light in the visible region. While only the "transmittance" is described in each figure which show the transmittance of the polarization beam splitter provided herein, the "reflectance" of the polarization beam splitter can be easily found since the polarization beam splitters described in Examples hardly absorb light in the visible region. Although the "reflectance" of the polarization beam splitter is not particularly described in each figure or the like, it can essentially be considered to be described by assuming "100%−(transmittance)≈(reflectance)." The absorption rate of light of the visible region in the polarization beam splitter (the absorption rate of white light in which light at wavelengths of 400 to 700 nm is present substantially uniformly) is 2% at most, and preferably 0.5% or lower.

The foregoing explanation applies to each of Examples described below.

For reference, the real numbers a, b, c, and d will be calculated from Table 1.

As described above, $n_H$, $n_L$, $n_M$ represent the refractive indexes of the materials of the H layer, L layer, and M layer, and λ the design wavelength. Since $H=\lambda/(4n_H)$, $L=d_L=\lambda/(4n_L)$, $M=\lambda/(4n_M)$, the thicknesses of the L layer, H layer, M layer, and H layer are determined as $a \times \lambda/(4n_L)$, $b \times \lambda/(4n_H)$, $c \times \lambda/(4n_M)$, and $d \times \lambda/(4n_H)$, respectively.

First, the relationship between the film thickness $d_L$ of the L layer with low refractive index as the first layer and the real number a is determined as follows. From $d_L = a \times \lambda/(4n_L)$, $a = d_L \times \lambda/(4n_L)/\lambda$ is calculated. With reference to Table 1, $d_L$=70.66 (nm), λ=550 (nm), and $n_L$=1.39 are substituted to determine a=0.714.

The real number b for the H layer with high refractive index as the second layer is calculated as follows. Specifically, $d_H$=26.45 (nm), λ=550 (nm), and $n_H$=2.32 are substituted in $b = d_H \times (4n_H)/\lambda$, and then b=0.446 is determined.

The real number c for the M layer with middle refractive index as the third layer is calculated as follows. Specifically, $d_M$=96.53 (nm), λ=550 (nm), and $n_M$=1.65 are substituted in $c = d_M \times (4n_M)/\lambda$, and then c=1.158 is determined.

The real number d for the H layer with high refractive index as the fourth layer is calculated as follows. Specifically, $d_H$=39.69 (nm), λ=550 (nm), and $n_H$=2.32 are substituted in $d = d_H \times (4n_H)/\lambda$, and then d=0.670 is determined.

The real numbers a to d can be determined for respective layers with the calculations as described above.

While the real numbers a to d show the values of the numeric range in the respective layers, the splitting characteristic is not significantly changed even when the real numbers a to d are out of the numeric ranges thereof in some of the plurality of layers.

Thus, the average values of the real numbers a to d can be used as a', b', c', and d' in the respective layers laminated in the order of the low refractive index layer, high refractive index layer, middle refractive index layer, and high refractive index layer.

The calculations of the real numbers a to d and the use of the average values a', b', c', and d' in the numeric range apply to each of Examples described below.

EXAMPLE 2

The multilayer layer (referred to as the first multilayer layer) shown in Table 1 of Example 1 is designed for a particular incident angle (45 degrees in Example 1). As seen in the angular characteristic in FIG. 2(b), the optical characteristic such as the transmittance characteristic and reflection characteristic is sensitively changed in response to a change in angle (a shift of the incident angle from the design incident angle, that is, 45 degrees in Example 1). To address this, in Example 2, a polarization beam splitter (a multilayer layer) is designed to be less sensitive to (resistant to) a change in angle as compared with Example 1.

This is because the incident angle of luminous flux incident on a color separation/combination means (a polarization beam splitter for use in a color separation/combination system or the like) of a projection apparatus such as a projector has a predetermined distribution, and some of the light is incident thereon at an angle different from the design value (for example, 45 degrees).

A second multilayer layer, later described, can be put on the first multilayer layer described above to provide a polarization beam splitter with an excellent angular characteristic. The second multilayer film is a multilayer film provided by laminating three kinds of thin films, that is, an H layer with high refractive index, an L layer with low refractive index, and an M layer with middle refractive index between those of the H layer and L layer, in the order of the L layer, H layer, M layer, and H layer (naturally, any of them may be the first layer. In other words, the order of the H layer, M layer, H layer, and L layer may be used, for example). It has high transmittance of s-polarized light in the blue wavelength band, low transmittance of p-polarized light in the blue wavelength band, and high transmittance of p-polarized light in the red wavelength band.

Figure 5A:
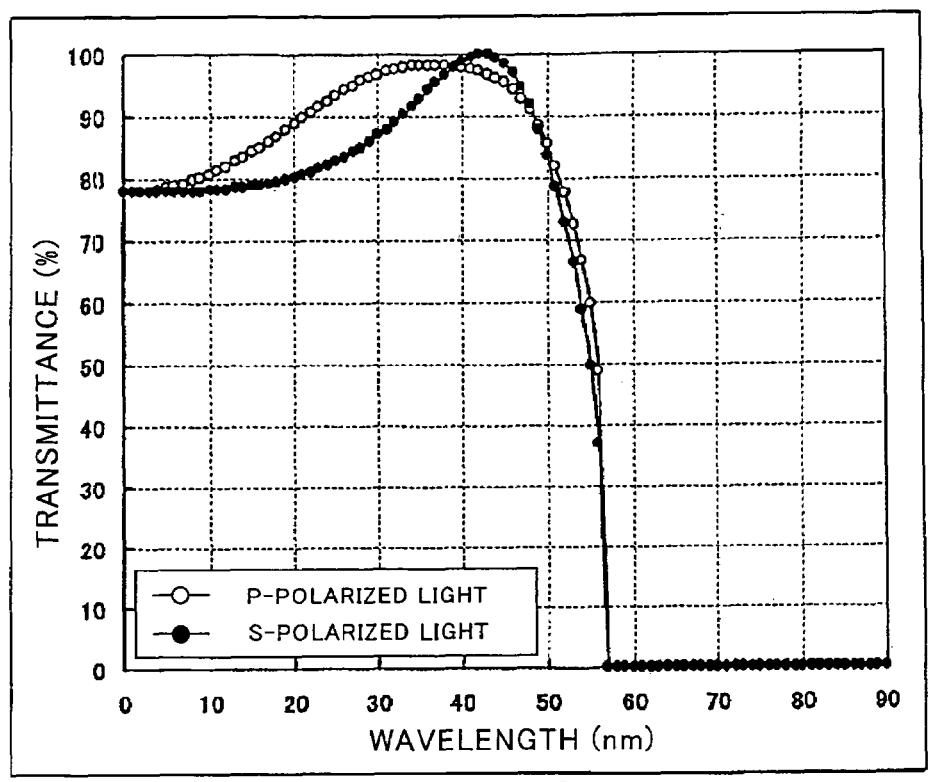
FIG. 5(a) shows the simulation result of the angular characteristic of transmittance of s-polarized light and p-polarized light at a wavelength of 500 nm in the film structure expressed as Prism|0.7L0.35H1.5M0.35H|Adhesive when an incident-side prism is made of a material having a refractive index of 1.85, an H layer has a refractive index of 2.32, an L layer has a refractive index of 1.39, an M layer has a refractive index of 1.65, and an adhesive with a refractive index of 1.55 is used on the emergence side.

FIG. 5(a) shows the angular characteristic of the transmittance of s-polarized light and p-polarized light at a wavelength of 500 nm in a polarization beam splitter in which an incident-side prism 11 is made of a material with a refractive index of 1.85, the H layer has a refractive index of 2.32, the L layer has a refractive index of 1.39, the M layer has a refractive index of 1.65, an adhesive with a refractive index of 1.55 is provided on the emergence side, and the structure of the polarization beam splitter is represented generally as "Prism|0.7L0.35H1.5M0.35H|Adhesive" at a wavelength of 550 nm. The transmittance of s-polarized light is larger than that of p-polarized light at incident angles of 40 to 48 degrees, although the different is slight.

Figure 5B:
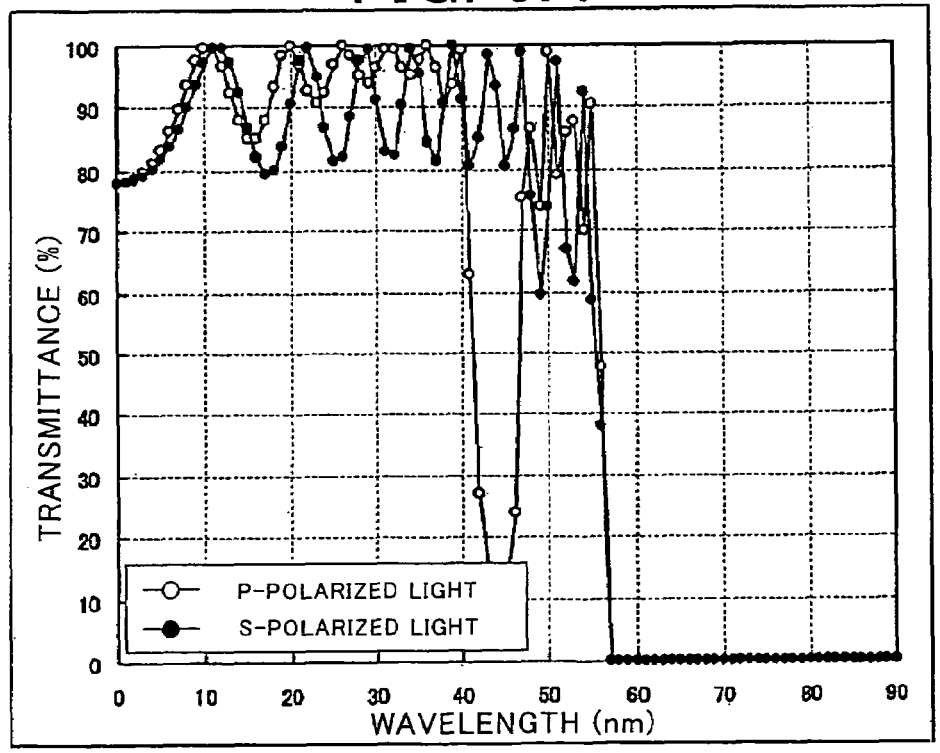
FIG. 5(b) shows the simulation result of the angular characteristic of transmittance of s-polarized light and p-polarized light at a wavelength of 500 nm in the film structure expressed as Prism|(0.7L0.35H1.5M0.35H)$^{10}$|Adhesive at a wavelength of 550 nm when the incident-side prism is made of a material having a refractive index of 1.85, the H layer has a refractive index of 2.32, the L layer has a refractive index of 1.39, the M layer has a refractive index of 1.65, and the adhesive with a refractive index of 1.55 is used on the emergence side.
Figure 6:
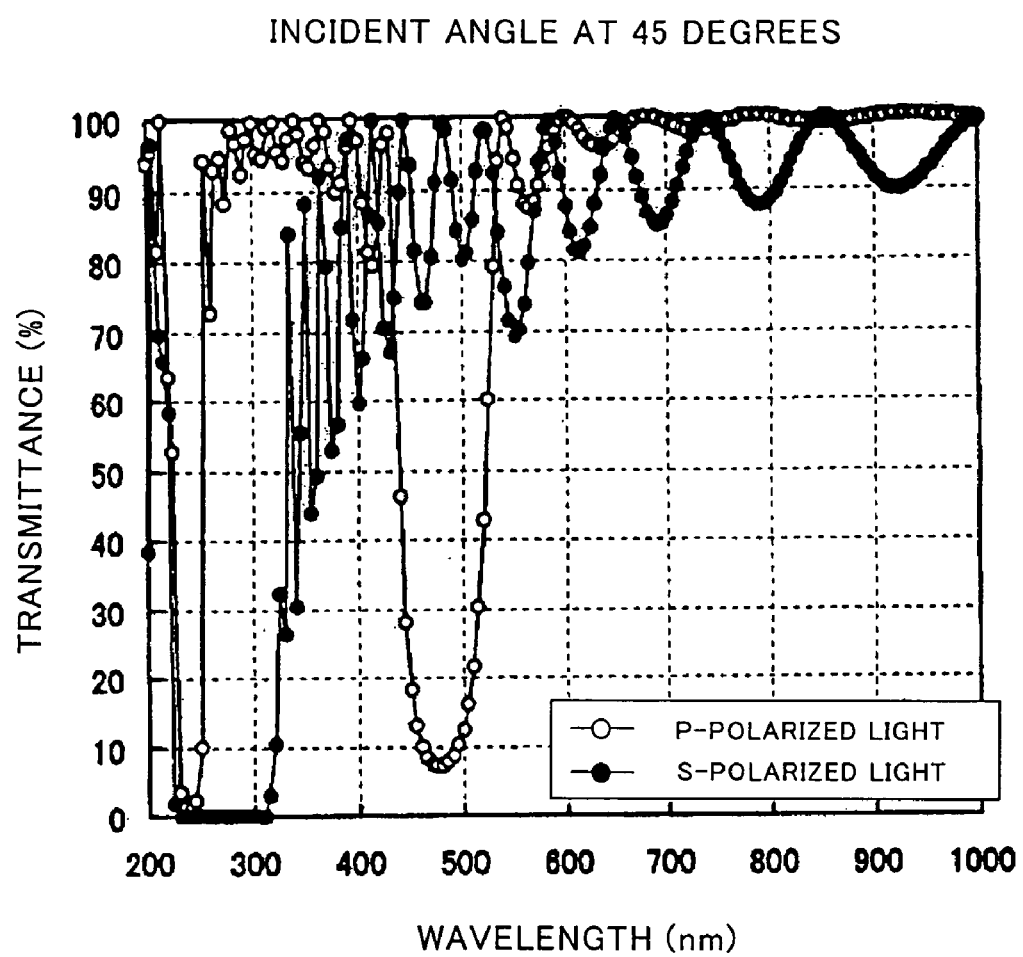
FIG. 6 shows the simulation result of the wavelength characteristic of transmittance of s-polarized light and p-polarized light at an incident angle of 45 degrees in the film structure expressed as Prism|(0.7L0.35H1.5M0.35H)$^{10}$|Adhesive at a wavelength of 550 nm when the incident-side prism is made of a material having a refractive index of 1.85, the H layer has a refractive index of 2.32, the L layer has a refractive index of 1.39, the M layer has a refractive index of 1.65, and the adhesive with a refractive index of 1.55 is used on the emergence side.

FIG. 5(b) shows the angular characteristic of transmittance of s-polarized light and p-polarized light in a polarization beam splitter having 10 repetitions of the abovementioned multilayer film structure and represented as "Prism$^{51}$(0.7L0.35H1.5M0.35H)$^{10}$|Adhesive." As compared with FIG. 5(a), the difference in transmittance between s-polarized light and p-polarized light is increased to show the obvious polarization splitting. FIG. 6 shows the wavelength characteristic of transmittance in the second multilayer film at an incident angle of 45 degrees. Similarly to FIG. 3 for the first multilayer film, it basically shows the characteristic of an edge filter in which a transmission band and a reflection band alternately appear, and significant polarization splitting is seen in s-polarized light and p-polarized light. The second multilayer film is further characterized by adjusting the refractive index and the film thickness to transmit s-polarized light in the reflection band thereof (the band of approximately 500 to 650 nm). This can be used to transmit s-polarized light and reflect p-polarized light generally in the blue wavelength band (a first wavelength band), and transmit s-polarized light and p-polarized light in the red wavelength band (a second wavelength band), that is, provide the basic characteristic of the second multilayer layer.

When multilayer films with shifted design wavelengths are laminated for the second multilayer film, s-polarized light is hardly affected (although ripple is larger) since it is transmitted throughout the wavelength band (at wavelengths of approximately 420 nm to 650 nm), and only the blocking wavelength band of p-polarized light is widened. Thus, the second multilayer film can be put on another multilayer film to reduce only the transmittance of p-polarized light in the blue wavelength band as a whole. In this manner, the first multilayer film can be put on the second multilayer film to provide a multilayer film having a wavelength selective polarization splitting function with an excellent angular characteristic or a polarization beam splitter (a wavelength selective polarization beam splitter) having the multilayer layer.

The polarization beam splitter can be provided with an excellent angular characteristic by forming the multilayer film such that the following is satisfied:

$$0<b\leq a\leq c<5, 0<d\leq a\leq c<5 \text{ (a, b, c, and d are real numbers)}$$

when the thicknesses of the H layer, M layer, H layer, and L layer laminated repeatedly in the second multilayer film are set to b×H, c×M, d×H, and a×L, respectively.

More preferably, the following is satisfied:

$$0<b\leq a\leq c<2, 0<d\leq a\leq c<2$$

Figure 7:
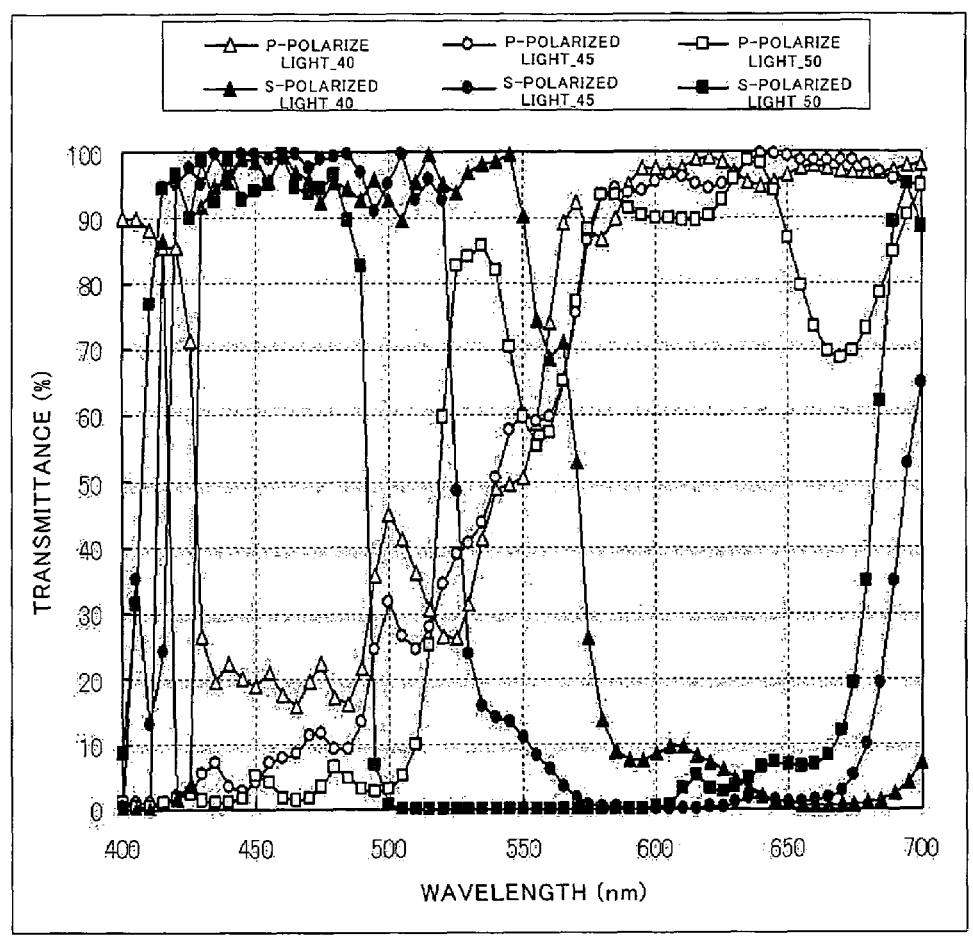
FIG. 7 shows the simulation result of transmittance of s-polarized light and p-polarized light in a wavelength selective polarization beam splitter in Example 2.

The second multilayer film intended to increase the blocking band at a small incident angle as described above is put on the first multilayer film, and the film thickness is adjusted (optimized) in order to reduce ripple and adjust the wavelength band. PBH56 (product name) manufactured by OHARA Inc. (the material thereof having a refractive index 1.85 at a wavelength of 550 nm) was used for the incident-side prism 11, TiO$_2$ (with a refractive index of 2.32 at a wavelength of 550 nm) was used for the H layer, MgF$_2$ (with a refractive index of 1.39 at a wavelength of 550 nm) was used for the L layer, Al$_2$O$_3$ (with a refractive index 1.65 at a wavelength of 550 nm) was used for the M layer, and an adhesive with a refractive index of 1.55 was used on the emergence side. The number of layers was 103 in total. Table 2 shows each film thickness in the multilayer film and the polarization beam splitter having the multilayer film. FIG. 7 shows the transmittance characteristic of the polarization beam splitter for s-polarized light and p-polarized light incident at an incident angle of 45±5 degrees. As seen in FIG. 7, in the range of incident angles of 45±5 degrees (substantially throughout the range of incident angles of 40 to 50 degrees), it is possible to provide the polarization beam splitter (the wavelength selective polarization beam splitter) which has transmittance of s-polarized light in the blue wavelength band (especially 440 to 480 nm) 60% or more higher than the transmittance of p-polarized light (transmitting s-polarized light and reflecting p-polarized light) and the transmittance of p-polarized light in the red wavelength band (especially 590 to 640 nm) 60% or more higher than the transmittance of s-polarized light (reflecting s-polarized light and transmitting p-polarized light).

EXAMPLE 3

In Example 3, a third multilayer film is designed to have the optical characteristic of high transmittance of s-polarized light in the blue wavelength band (a first wavelength band) and low transmittance of s-polarized light in the red wavelength band (a second wavelength band), and high transmittance of p-polarized light in the red wavelength band. The third multilayer film is put on the second multilayer film used in Example 2 (the film having high transmittance of s-polarized light and low transmittance of p-polarized light in the blue wavelength band and high transmittance of p-polarized light in the red wavelength band) to form a polarization beam splitter film.

The third multilayer film can be realized by satisfying the Brewster angle determined from the refractive index of the multilayer film for the incidence of p-polarized light and functioning as a dichroic filter for the incident of s-polarized light. In addition, it can also be designed by adjusting the cut-off wavelength of s-polarized light and p-polarized light in the dichroic filter.

Figure 8:
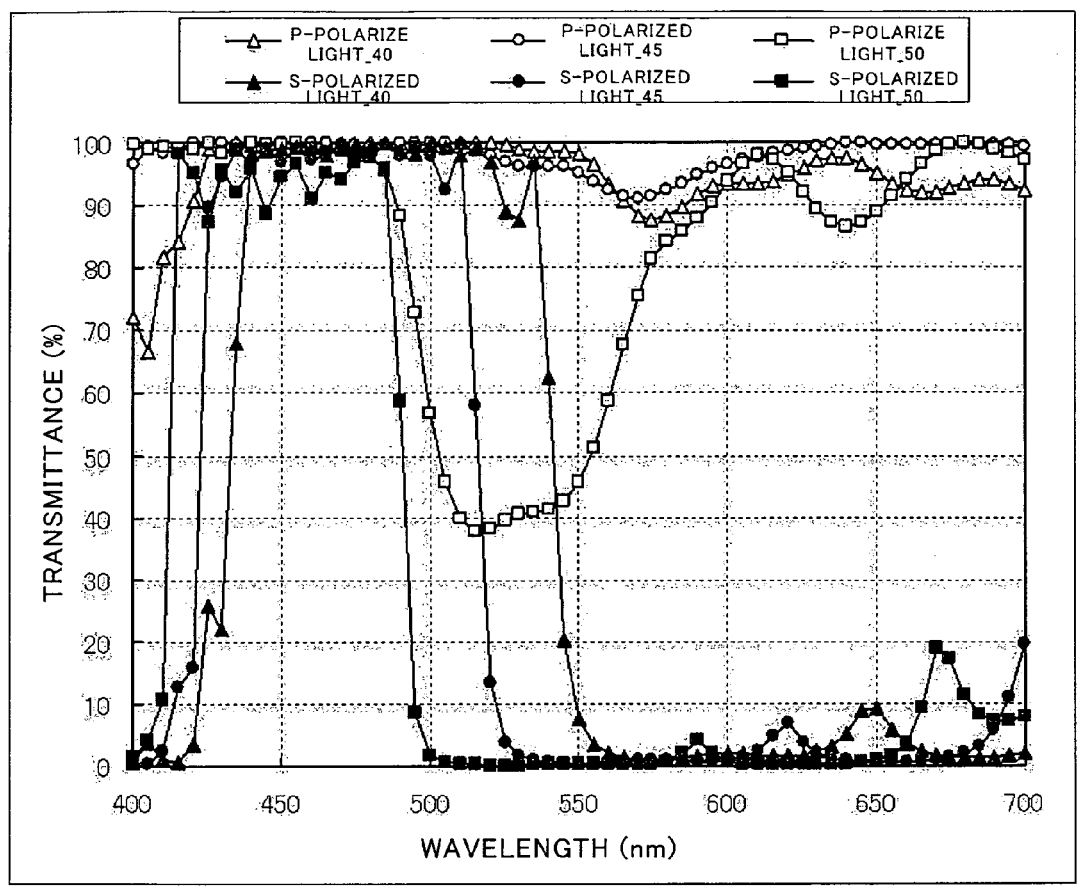
FIG. 8 shows the simulation result of transmittance of s-polarized light and p-polarized light in a third multilayer film in Example 3.

Table 3 shows an example of the third multilayer layer. FIG. 8 shows the transmittance characteristic (changes in transmittance) when light in the visible region (400 to 700 nm) is incident on the third multilayer layer at incident angles of 40, 45, and 50 degrees. PBH56 (product name) manufactured by OHARA Inc. (the material thereof having a refractive index of 1.85 at a wavelength of 550 nm) was used for an incident prism, $TiO_2$ (with a refractive index of 2.32 at a wavelength of 550 nm) was used for an H layer, $SiO_2$ (with a refractive index of 1.49 at a wavelength of 550 nm) was used for an L layer (an L2 layer, later described), $Al_2O_3$ (with a refractive index of 1.65 at a wavelength of 550 nm) was used for an M layer, and an adhesive with a refractive index of 1.55 was used on the emergence side. In the design example of the third multilayer film, the number of layers is 24 in total (naturally, the number of layers may be other than 24). It can be seen from FIG. 8 showing the transmittance characteristic of the third multilayer film that it transmits s-polarized light in the blue wavelength band and reflects s-polarized light in the red wavelength band incident on the third multilayer film (the polarization beam splitter including the incident-side prism and the adhesive on the emergence side) at an incident angle of 45±5 degrees (substantially in the range of angles of 40 to 50 degrees) and transmits p-polarized light in the red wavelength band (also transmits p-polarized light in the blue wavelength band) incident on the third multilayer film (the polarization beam splitter including the incident-side prism and the adhesive on the emergence side) at an incident angle of 45±5 degrees (substantially in the range of angles of 40 to 50 degrees).

The second multilayer film is put on the third multilayer film to form a multilayer film for use in the polarization beam splitter of Example 3. In the specific design, the number of layers was increased to increase the blocking bandwidth of the second multilayer film (the band in which s-polarized light is transmitted and p-polarized light is reflected), and the film thickness was adjusted (optimized) to reduce ripple and adjust the wavelength band. In a polarization beam splitter which employs the multilayer film after the adjustment of the film thickness, PBH56 (product name) manufactured by OHARA Inc. (the material thereof having a refractive index 1.85 at a wavelength of 550 nm) was used for the incident-side prism, $TiO_2$ (with a refractive index of 2.32 at a wavelength of 550 nm) was used for the H layer, $MgF_2$ (with a refractive index of 1.39 at a wavelength of 550 nm) was used for the L1 layer, $SiO_2$ (with a refractive index of 1.49 at a wavelength of 550 nm) was used for the L2 layer, $Al_2O_3$ (with a refractive index 1.65 at a wavelength of 550 nm) was used for the M layer, and an adhesive with a refractive index of 1.55 was used for the material on the emergence side. Of the multilayer film used in the polarization beam splitter, the multilayer film comprised of the H, M, H, and L1 layers including the H layer, M layer, and L1 layer corresponds to the abovementioned second multilayer film, while the multilayer film comprised of the H layer, M layer, and L2 layer corresponds to the abovementioned third multilayer film. The number of layers is 144 in total. The L1 layer and L2 layer are included in the L layer (the layer with low refractive index) in a broad sense. An H1 layer and an H2 layer, later described, are included in the H layer, and an M1 layer and an M2 layer are included in the M layer.

Figure 9:
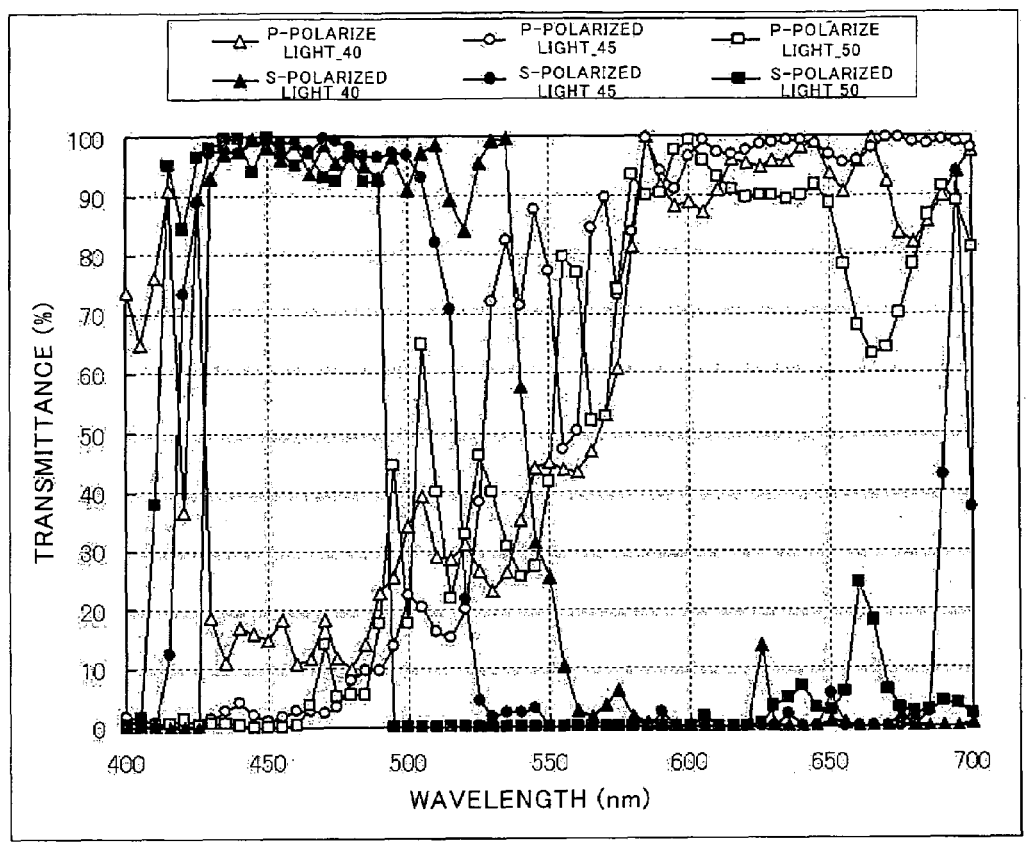
FIG. 9 shows the simulation result of transmittance of s-polarized light and p-polarized light in a wavelength selective polarization beam splitter in Example 3.

Table 4 shows the film thickness of each layer in the polarization beam splitter thus designed. FIG. 9 shows the transmittance characteristic (the transmittance characteristic for light in the visible region) of s-polarized light and p-polarized light incident on the multilayer film of the polarization beam splitter at an incident angle of 45±5 degrees. As can be seen from FIG. 9, it is possible to provide the polarization beam splitter (the wavelength selective polarization beam splitter) which has transmittance of s-polarized light 60% or more higher than the transmittance of p-polarized light in the blue wavelength range (especially 435 to 490 nm) (transmitting s-polarized light and reflecting p-polarized light) and the transmittance of p-polarized light 60% or more higher than the transmittance of s-polarized light in the red wavelength band (especially 590 to 640 nm) (reflecting s-polarized light and transmitting p-polarized light).

EXAMPLE 4

Figure 10:
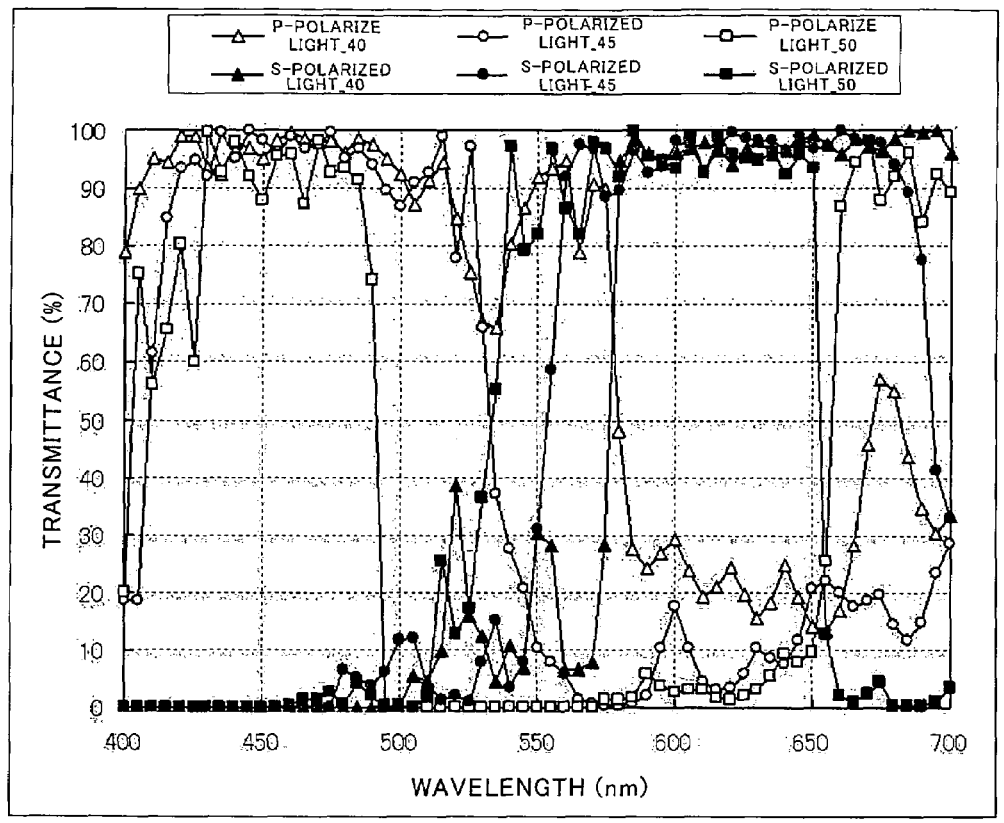
FIG. 10 shows the simulation result of transmittance of s-polarized light and p-polarized light in a wavelength selective polarization beam splitter in Example 4.

In Example 1 to 3, the first wavelength band (the band in which the polarization beam splitter transmits s-polarized light and reflects p-polarized light) is the blue wavelength band, while the second wavelength band (the band in which the polarization beam splitter transmits p-polarized light and reflects s-polarized light) is the red wavelength band. In contrast, in Example 4, the red wavelength band is used as a first wavelength band, while the blue wavelength band is used as a second wavelength band. In design, similarly to Example 3, the second multilayer film was put on the third multilayer film, and the film thickness was optimized. Table 5 shows the thickness of each film resulting from the design and FIG. 10 shows the transmittance at an incident angle of 45±5 degrees.

PBH56 (product name) manufactured by OHARA Inc. (the material thereof having a refractive index 1.85 at a wavelength of 550 nm) was used for an incident-side prism, $TiO_2$ (with a refractive index of 2.32 at a wavelength of 550 nm) was used for an H layer, $MgF_2$ (with a refractive index of 1.39 at a wavelength of 550 nm) was used for an L1 layer, $SiO_2$ (with a refractive index of 1.49 at a wavelength of 550 nm) was used for an L2 layer, $Y_2O_3$ (with a refractive index of 1.80) was used for an M1 layer, $Al_2O_3$ (with a refractive index 1.65 at a wavelength of 550 nm) was used for an M2 layer, and an adhesive with a refractive index of 1.55 was used on the emergence side.

A multilayer film formed by repeatedly laminating H, M, H, and L (L1) including the H layer, M1 layer, and L1 layer was used as the second multilayer film. A multilayer comprised of the H layer, M2 layer, and L2 layer was used as the third multilayer film. The number of layers is 164 in total. In the angular range of 45±5 degrees, s-polarized light is reflected and p-polarized light is transmitted in the blue wavelength band, while s-polarized light is transmitted and p-polarized light is reflected in the red wavelength band. It can be seen that favorable characteristics are provided both in the separation of the wavelength bands and the excellent polarization splitting.

In this manner, the wavelength selective polarization beam splitter is not limited to a particular wavelength band and can provide characteristics based on the specifications. The wavelength band can be shifted by uniformly changing the film thickness of all the layers, as well known.

EXAMPLE 5

In Example 5, $MgF_2$ is not used for an L layer, but $SiO_2$, which is widely used as a material of a thin film with low refractive index, is used. In design, similarly to Example 2, the first multilayer film was put on the second multilayer film, and the film thickness was optimized.

Figure 11:
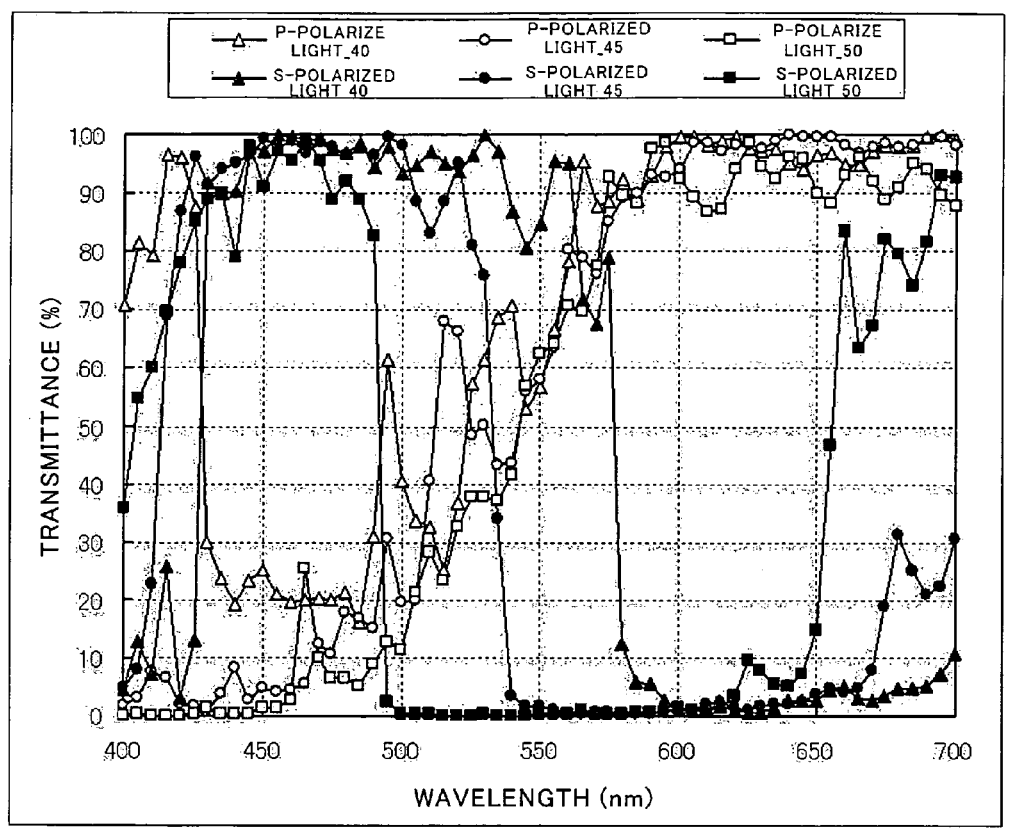
FIG. 11 shows the simulation result of transmittance of s-polarized light and p-polarized light in a wavelength selective polarization beam splitter in Example 5.

Table 6 shows each film thickness resulting from the design and FIG. 11 shows the transmittance at an incident angle of 45±5 degrees. PBH56 (product name) manufactured by OHARA Inc. (the material thereof having a refractive index 1.85 at a wavelength of 550 nm) was used for an incident-side prism, $TiO_2$ (with a refractive index of 2.32 at a wavelength of 550 nm) was used for an H layer, $SiO_2$ (with a refractive index of 1.49 at a wavelength of 550 nm) was used for an L layer, $Y_2O_3$ (with a refractive index of 1.80) was used for an M layer, and an adhesive with a refractive index of 1.55 was used on the emergence side. The number of layers is 203 in total. In the angular range of 45±5 degrees, s-polarized light is transmitted and p-polarized light is reflected in the blue wavelength band, while s-polarized light is reflected and p-polarized light is transmitted in the red wavelength band. It can be seen that favorable characteristics are provided both in the separation of the wavelength bands and the excellent polarization splitting. Since $SiO_2$ has higher refractive index than $MgF_2$, the number of layers is increased as compared with the case where $MgF_2$ is used. The same applies to the H layer. The H layer can be designed by using a thin film made of $Ta_2O_5$ or the like, not $TiO_2$. In this manner, the thin film for realizing the wavelength selective polarization beam splitter is not limited to a particular material.

EXAMPLE 6

In Example 6, PBH56 (product name) is not used for an incident-side prism but S-LAL14 (product name) manufactured by OHARA Inc., which is a type of glass with lower refractive index, is used. In design, similarly to Examples 2 and 5, the first multilayer film was put on the second multilayer film, and the film thickness was optimized.

Figure 12:
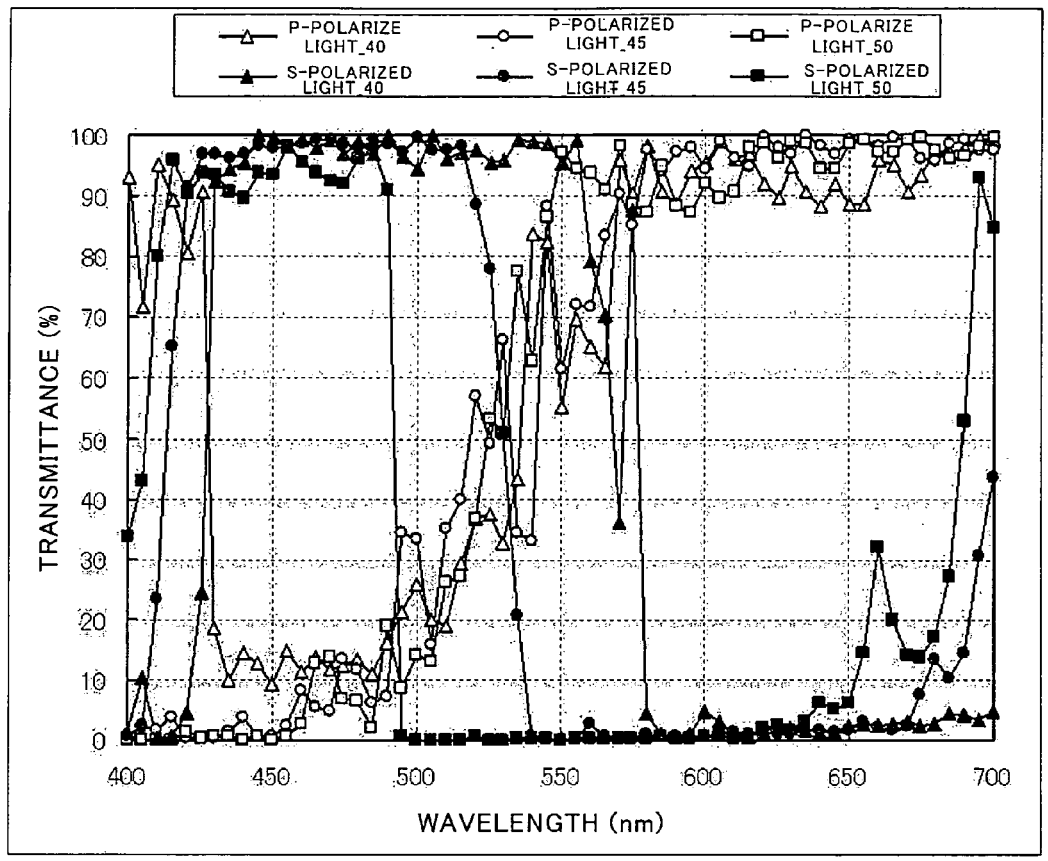
FIG. 12 shows the simulation result of transmittance of s-polarized light and p-polarized light in a wavelength selective polarization beam splitter in Example 6.

Table 7 shows each film thickness resulting from the design and FIG. 12 shows the transmittance at an incident angle of 45±5 degrees. S-LAL14 (product name) manufactured by OHARA Inc. (the material thereof having a refractive index 1.70 at a wavelength of 550 nm) was used for an incident-side prism, $TiO_2$ (with a refractive index of 2.32 at a wavelength of 550 nm) was used for an H layer, $MgF_2$ (with a refractive index of 1.39 at a wavelength of 550 nm) was used for an L layer, $Al_2O_3$ (with a refractive index of 1.65 with a wavelength of 550 nm) was used for an M layer, and an adhesive with a refractive index of 1.55 was used on the emergence side. The number of layers is 232 in total.

In the angular range of 45±5 degrees, s-polarized light is transmitted and p-polarized light is reflected in the blue wavelength band, while s-polarized light is reflected and p-polarized light is transmitted in the red wavelength band. It can be seen that favorable characteristics are provided both in the separation of the wavelength bands and the excellent polarization splitting. Since S-LAL14 (product name) has lower refractive index than PBH56 (product name), the number of layers is increased as compared with the case where PBH56 (product name) is used. However, the polarization beam splitter is not limited to particular glass on the incident side.

EXAMPLE 7

In Example 7, two H layers are made of different materials in design of repetitions of the basic film arrangement comprised of an L layer, H layer, M layer, and H layer in this order. The basic film arrangement comprised of an L layer, H1 layer, M layer, and H2 layer in this order is repeated in Example 7.

Figure 13:
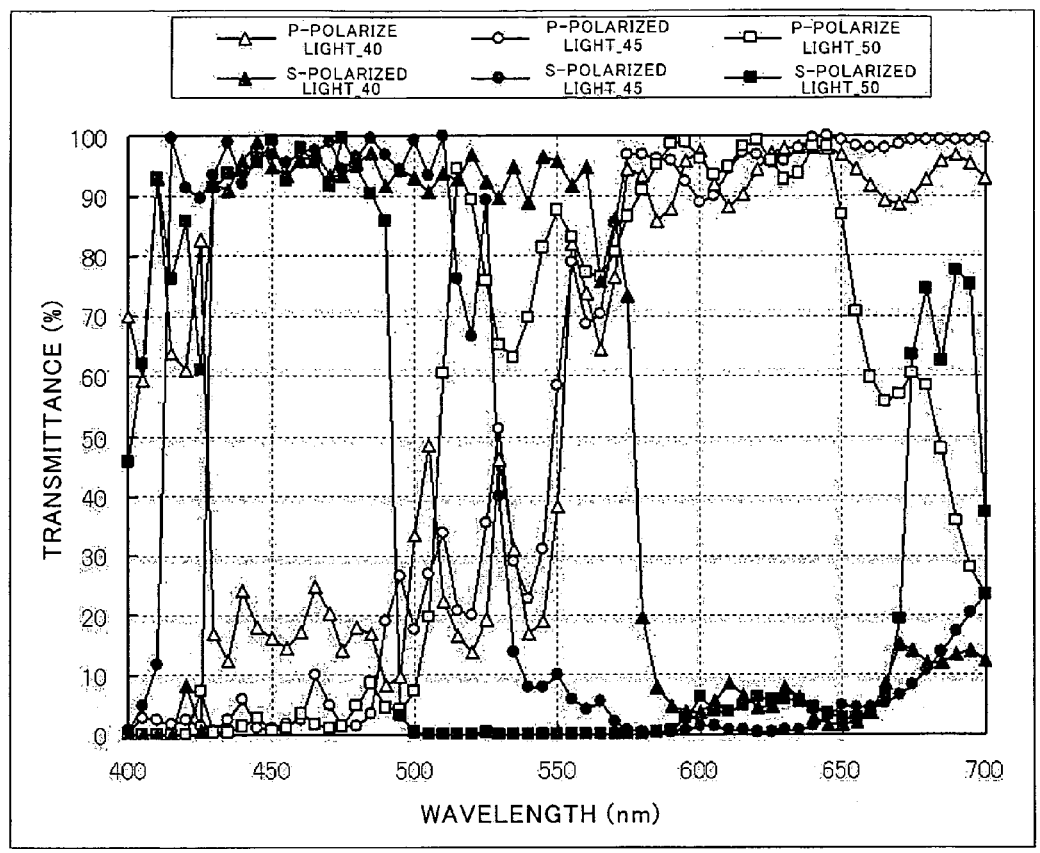
FIG. 13 shows the simulation result of transmittance of s-polarized light and p-polarized light in a wavelength selective polarization beam splitter in Example 7.

In design, similarly to Examples 2, 5 and 6, the first multilayer film was put on the second multilayer film, and the film thickness was optimized. Table 8 shows each film thickness resulting from the design and FIG. 13 shows the transmittance at an incident angle of 45±5 degrees. PHB56 (product name) manufactured by OHARA Inc. (the material thereof having a refractive index 1.85 at a wavelength of 550 nm) was used for an incident-side prism, $TiO_2$ (with a refractive index of 2.32 at a wavelength of 550 nm) was used for the H1 layer, $Ta_2O_5$ (with a refractive index of 2.15 at a wavelength of 550 nm) was used for the H2 layer, $MgF_2$ (with a refractive index of 1.39 at a wavelength of 550 nm) was used for the L layer, $Al_2O_3$ (with a refractive index of 1.65 with a wavelength of 550 nm) was used for the M layer, and an adhesive with a refractive index of 1.55 was used on the emergence side. The number of layers is 151 in total.

In the angular range of 45±5 degrees, s-polarized light is transmitted and p-polarized light is reflected in the blue wavelength band, while s-polarized light is reflected and p-polarized light is transmitted in the red wavelength band. It can be seen that favorable characteristics are provided both in the separation of the wavelength bands and the excellent polarization splitting. Thus, it can be found that the same kind of thin film is not necessarily required in repeating the arrangement of L, H, M, and H. It is also possible to use a different thin film material for each repetition, for example, in the order of L, H1, M, H1, L, H2, M, and H2. The same applies to the M layer and L layer.

EXAMPLE 8

Examples 2 to 7 have shown that the second multilayer film is realized by laminating the three kinds of thin films, that is, the H layer with high refractive index, the L layer with low refractive index, and the M layer with middle refractive index between those of the H and L layers, in the order of the L layer, H layer, M layer, and H layer, and adjusting the refractive index and the film thickness. The present inventors have studied the second multilayer film and found that the similar characteristics to those of the second multilayer film can be realized by a fifth multilayer film formed by laminating three kinds of thin films, that is, an H layer with high refractive index, an L layer with low refractive index, and an M layer with middle refractive index between those of the H and L layers, in the order of the M layer, L layer, M layer, and H layer, and adjusting the refractive index and the film thickness.

The fifth multilayer film is a multilayer film of the L, M, H, and M layers and has the optical characteristic of high transmittance of s-polarized light and low transmittance of p-polarized light in a first wavelength band, and high transmittance in a second wavelength band different from the first wavelength band. Each of the first wavelength band and the second wavelength band has a bandwidth of 30 nm or more and includes a band in which the difference in transmittance is 60% or higher between s-polarized light and s-polarized light.

Figure 14A:
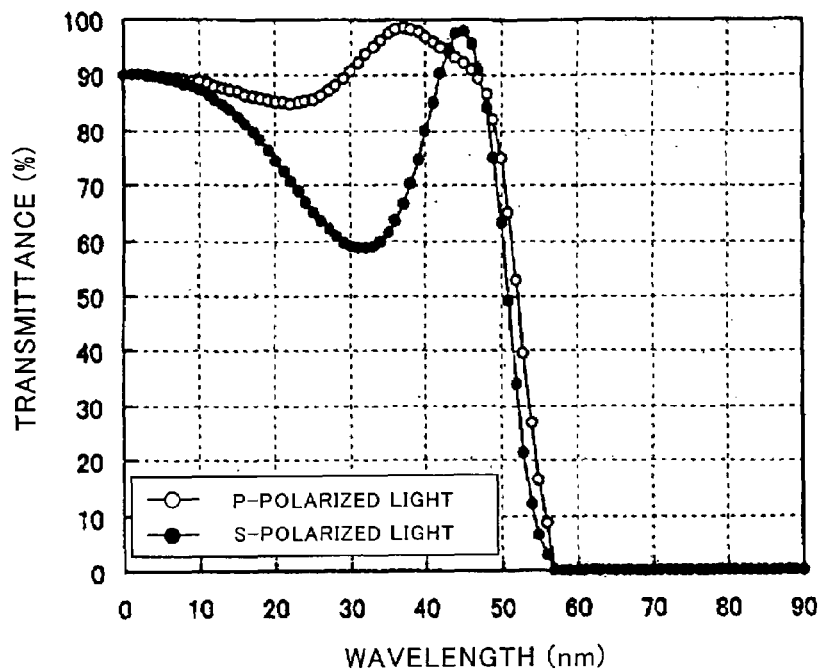
FIG. 14(a) shows the simulation result of the angular characteristic of transmittance of s-polarized light and p-polarized light at a wavelength of 500 nm in the film structure expressed as Prism|2.1M1.2L2.1M0.6H|Adhesive at a wavelength of 550 nm when an incident-side prism is made of a material having a refractive index of 1.85, an H layer has a refractive index of 2.32, an L layer has a refractive index of 1.39, an M layer has a refractive index of 1.65, and an adhesive with a refractive index of 1.55 is used on the emergence side.

S-LAH55 (product name) manufactured by OHARA Inc. was used for an incident-side prism 11 and the material thereof has a refractive index of 1.84, the H layer (the material of the H layer) has a refractive index of 2.32, the L layer (the material of the L layer) has a refractive index of 1.39, the M layer (the material of the M layer) has a refractive index of 1.65, and an adhesive with a refractive index of 1.55 was used on the emergence side to bond two prisms. FIG. 14(a) shows the angular characteristic of the transmittance of s-polarized light and p-polarized light at a wavelength of 500 nm in the film structure expressed as Prism|2.1M1.2L2.1M0.6H|Adhesive at a wavelength of 550 nm.

Figure 14B:
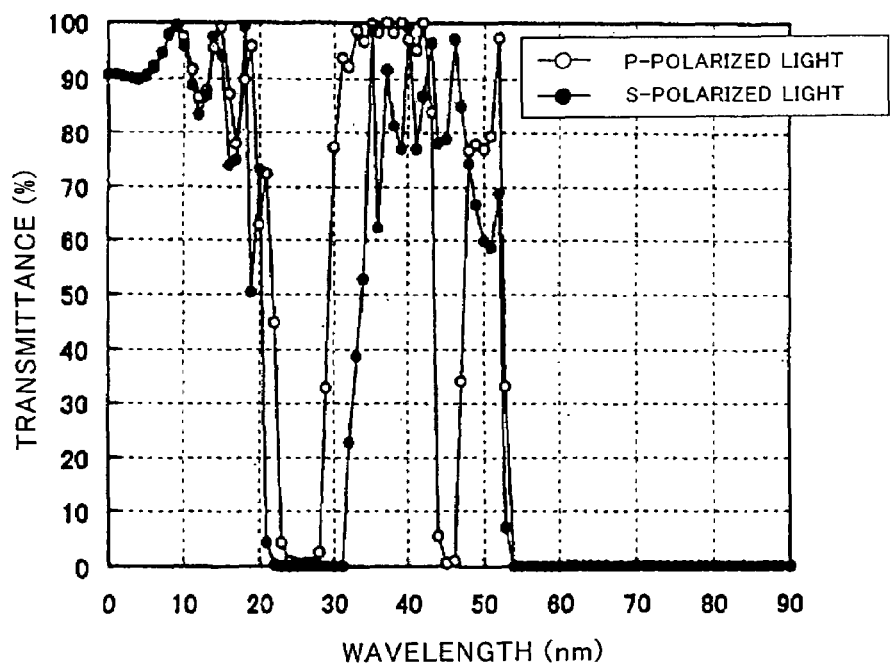
FIG. 14(b) shows the simulation result of the angular characteristic of transmittance of s-polarized light and p-polarized light in the film structure expressed as Prism|(2.1M1.2L2.1M0.6H)$^{10}$|Adhesive at a wavelength of 550 nm when the incident-side prism is made of a material having a refractive index of 1.85, the H layer has a refractive index of 2.32, the L layer has a refractive index of 1.39, the M layer has a refractive index of 1.65, and the adhesive with a refractive index of 1.55 is used on the emergence side.

The transmittance of s-polarized light is higher than that of p-polarized light at incident angles of 42 to 45 degrees, although the difference is slight. FIG. 14(b) shows the angular characteristic of the transmittance of s-polarized light and p-polarized light in the structure of 10 repetition of the abovementioned multilayer film arrangement, expressed as Prism|(2.1M1.2L2.1M0.6H)$^{10}$|Adhesive.

Figure 15:
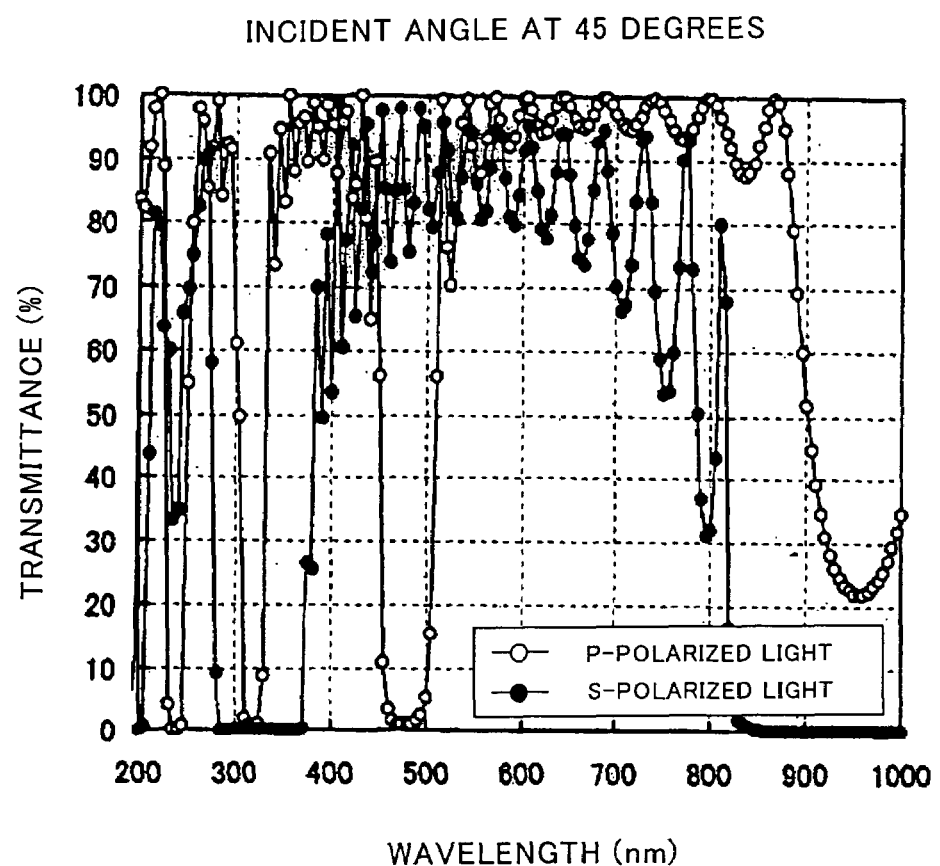
FIG. 15 shows the simulation result of the wavelength characteristic of transmittance of s-polarized light and p-polarized light at an incident angle of 45 degrees in the film structure expressed as Prism|(0.6H2.1M1.2L2.1M)$^{10}$|Adhesive at a wavelength of 550 nm when the incident-side prism is made of a material having a refractive index of 1.85, the H layer has a refractive index of 2.32, the L layer has a refractive index of 1.39, the M layer has a refractive index of 1.65, and the adhesive with a refractive index of 1.55 is used on the emergence side.

As compared with FIG. 14(a), the difference in transmittance between s-polarized light and p-polarized light is increased and obvious polarization splitting is shown. FIG. 15 shows the wavelength characteristic of the transmittance at an incident angle of 45 degrees in the multilayer film.

Similarly to FIG. 6 in Example 2, it basically shows the characteristic of an edge filter in which a transmission band and a reflection band alternately appear, and it is characterized by significant polarization splitting in s-polarized light and p-polarized light. The significant polarization splitting can be used to transmit s-polarized light and reflect p-polarized light generally in the blue wavelength band (the first wavelength band) and transmit s-polarized light and p-polarized light in the red wavelength band (the second wavelength band), that is, provide the basic characteristic of the fifth multilayer film. As compared with FIG. 6, the reflectance of p-polarized light is reduced even with the same number of layers. Thus, the number of layers in the multilayer film is reduced as compared with the case where the L layer, H layer, M layer, and H layer are repeated. On the other hand, it can be seen that the angular characteristic is sensitive, and the number of layers is increased when the range of incident angles is widened.

When multilayer films with shifted design wavelengths are laminated for the fifth multilayer film, s-polarized light is hardly affected (although ripple is larger) since it is transmitted throughout the wavelength band (approximately wavelengths of 420 nm to 650 nm), and only the blocking wavelength band of p-polarized light is widened. Thus, the fifth multilayer film can be put on another multilayer film to reduce only the transmittance of p-polarized light in the blue wavelength band as a whole.

As a result, a fourth multilayer film is formed as a multilayer film including an M layer, L layer, M layer, and H layer, in which it has high transmittance of s-polarized light in a first wavelength band and low transmittance in a second wavelength band different from the first wavelength band, and low transmittance of p-polarized light in the first wavelength band and high transmittance in the second wavelength band, each of the first wavelength band and the second wavelength band has a bandwidth of 30 nm or more, and the first wavelength band includes a band in which the difference in transmittance between s-polarized light and p-polarized light is 60% or higher. The fourth multilayer film can be put on the fifth multilayer to provide a polarization beam splitter with an excellent angular characteristic.

The result of study has shown that the polarization beam splitter can be provided with an excellent angular characteristic by satisfying the following relationship for the basic film structure in the fourth and fifth multilayer films and appropriately selecting the refractive index and film thickness of each layer:

(a×M b×L c×M d×H)

0<a<6, 0<c<6, d<b, 0<b<5, 0<d<2 where a, b, c, and d are real numbers, H the symbol for representing the quarter wavelength thickness of the layer with high refractive index of $d_H=\lambda/(4n_H)$, L the symbol for representing the quarter wavelength thickness of the layer with low refractive index of $d_L=\lambda/(4n_L)$, M the symbol for representing the quarter wavelength thickness of the layer with middle refractive index of $d_M=\lambda/(4n_M)$, $n_H$, $n_L$, and $n_M$ the refractive indexes of the H layer, L layer, and M layer, respectively, $d_H$, $d_L$, and $d_M$ the film thickness of the H layer, L layer, and M layer, and $\lambda$ the design wavelength.

In addition, the polarization beam splitter can be provided with a more excellent angular characteristic by satisfying the following relationship for the basic film structure in the multilayer film structure and appropriately selecting the refractive index and film thickness of each layer:

(a×M b×L c×M d×H)

0<a<3, 0<c<3, d<b, 0<b<2, 0<d<1

In specific design, the fifth multilayer film including an increased number of layers for widening the blocking band at a small incident angle was put on the first multilayer film, and the thickness was optimized in order to reduce ripple and adjust the wavelength band.

Figure 16:
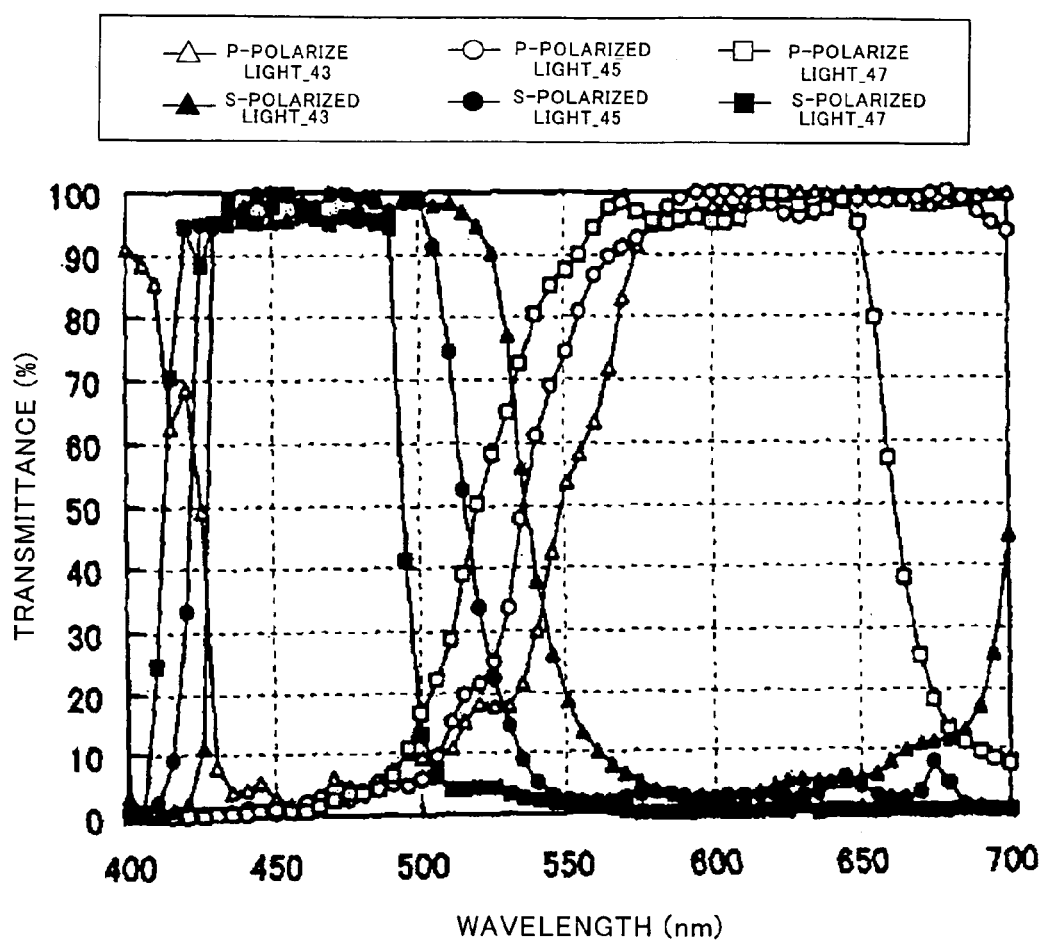
FIG. 16 shows the simulation result of transmittance of s-polarized light and p-polarized light in a wavelength selective polarization beam splitter in Example 8.

S-LAH55 (product name) manufactured by OHARA Inc. (with a refractive index 1.84 at a wavelength of 550 nm) was used for the incident-side prism 11, TiO$_2$ (with a refractive index of 2.32 at a wavelength of 550 nm) was used for the H layer, MgF$_2$ (with a refractive index of 1.39 at a wavelength of 550 nm) was used for the L layer, Al$_2$O$_3$ (with a refractive index 1.65 at a wavelength of 550 nm) was used for the M layer, and an adhesive with a refractive index of 1.55 was used on the emergence side. The number of layers is 65 in total. Table 9 shows the thickness of each film. FIG. 16 shows the transmittance at an incident angle of 45±2 degrees. In the angular range of 45±2 degrees, s-polarized light is transmitted and p-polarized light is reflected in the blue wavelength band, and s-polarized light is reflected and p-polarized light is transmitted in the red wavelength band, which shows favorable characteristics both in the separation of the wavelength bands and the excellent polarization splitting.

EXAMPLE 9

In Example 8, the three kinds of thin films, that is, the H layer with high refractive index, the L layer with low refractive index, the M layer with medium refractive index between those of the H and L layers are laminated in the order of M, L, M, and H, and then the refractive index and film thickness are adjusted, thereby providing the fifth multilayer film. The fifth multilayer film was put on the fourth multilayer film. A polarization beam splitter in Example 9 is formed by putting the fifth multilayer film formed of the lamination of the M layer, L layer, M layer, and H layer on the third multilayer film.

The third multilayer film has the optical characteristic of high transmittance of s-polarized light in a first wavelength band, low transmittance in a second wavelength band, and high transmittance of p-polarized light in the second wavelength band.

Figure 17:
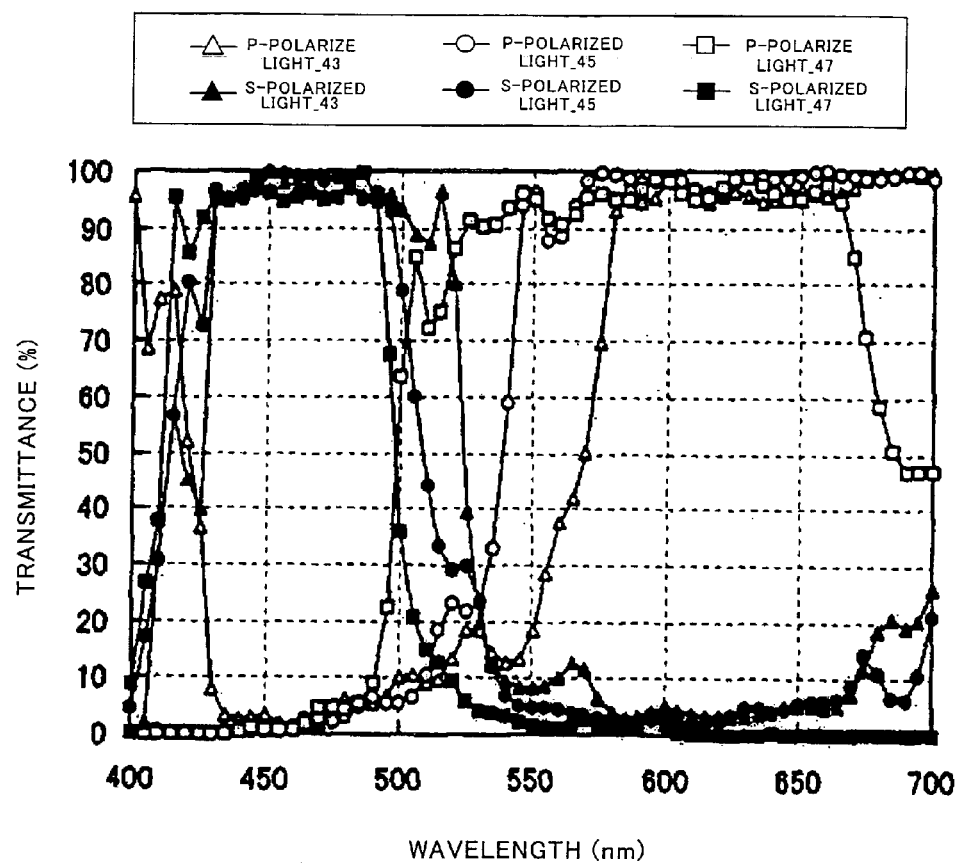
FIG. 17 shows the simulation result of transmittance of s-polarized light and p-polarized light in a third multilayer film in Example 9.

In specific design, the number of layers was increased to widen the blocking band in the fifth multilayer film, and the film thickness was optimized to reduce ripple and adjust the wavelength band. S-LAH55 (product name) manufactured by OHARA Inc. (with a refractive index 1.84 at a wavelength of 550 nm) was used for an incident-side prism, TiO$_2$ (with a refractive index of 2.32 at a wavelength of 550 nm) was used for the H layer, MgF$_2$ (with a refractive index of 1.39 at a wavelength of 550 nm) was used for the L layer, Al$_2$O$_3$ (with a refractive index of 1.65 at a wavelength of 550 nm) was used for the M layer, and an adhesive with a refractive index of 1.55 was used on the emergence side. The number of layers is 63 in total. Table 10 shows the resulting thickness of each film. FIG. 17 shows the transmittance at an incident angle of 45±2 degrees. In the angular range of 45±2 degrees, s-polarized light is transmitted and p-polarized light is reflected in the blue wavelength band, and s-polarized light is reflected and p-polarized light is transmitted in the red wavelength band, which shows favorable characteristics both in the separation of the wavelength bands and the excellent polarization splitting.

EXAMPLE 10

The wavelength selective polarization beam splitter of the present invention has the multilayer film structure 10 disposed between the incident-side prism 11 and the emergence-side prism 12 as shown in FIGS. 1(a) and 1(b). Thus, reflection occurs on the bonding surface of the adhesive and the prism on which the multilayer film is not disposed. The reflection reduces the transmittance in the transmission band. Countermeasures against this include the anti-reflection structure provided on the bonding surface of the prism and the adhesive as described above. In Example 10, the first multilayer film is separately put on the sides of the incident-side prism 11 and the emergence-prism 12, and they are bonded together with an adhesive. Since the intermediate adhesive is an non-interfering medium, the design needs to be made in view of that. The fifth multilayer film and the third multilayer film which constitute the first multilayer film are put for each of the prisms on the incident side and emergence side. Since the respective films are designed with separate functions, the design is easily performed and advantages in manufacture can be provided.

Figure 18:
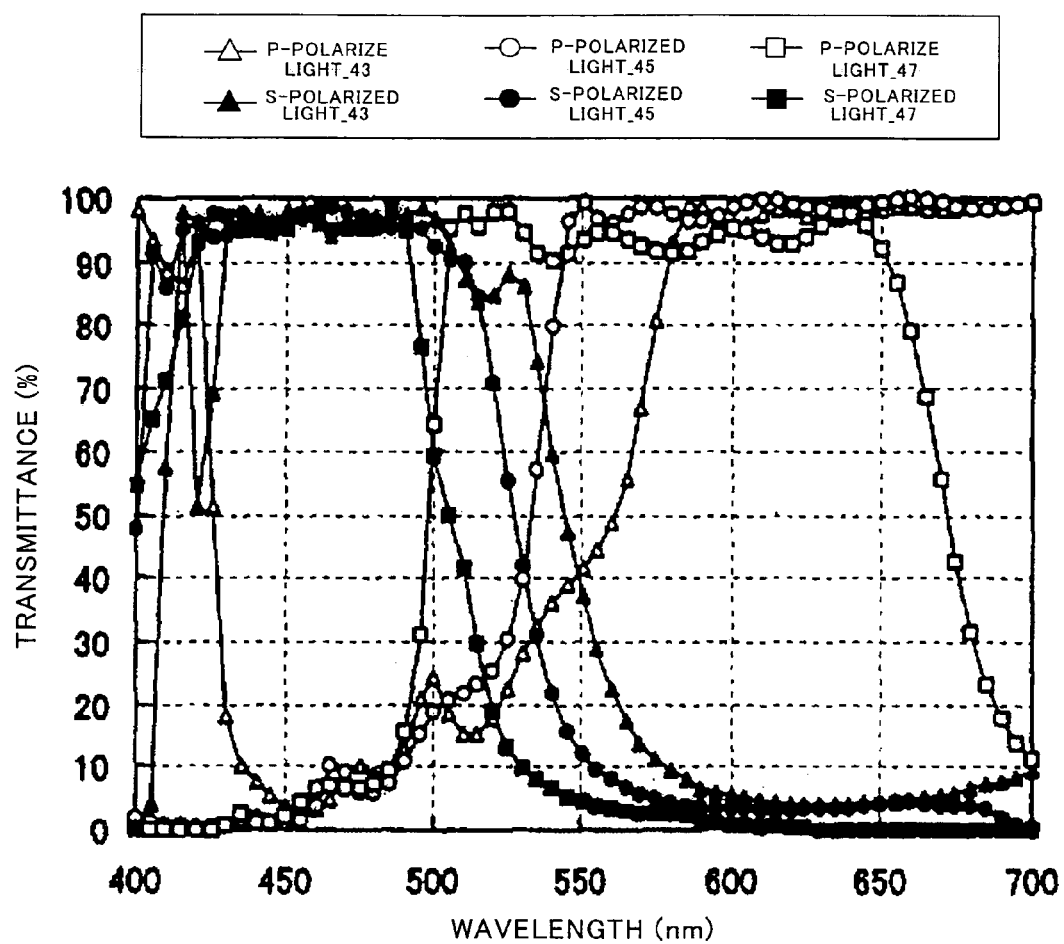
FIG. 18 shows the simulation result of transmittance of s-polarized light and p-polarized light in a wavelength selective polarization beam splitter in Example 10.

In specific design, S-LAH55 (product name) manufactured by OHARA Inc. (with a refractive index 1.84 at a wavelength of 550 nm) was used for the incident-side and emergence-side prisms, Ta$_2$O$_5$ (with a refractive index of 2.15 at a wavelength of 550 nm) was used for the H layer of the third multilayer film, Al$_2$O$_3$ (with a refractive index of 1.65 at a wavelength of 550 nm) was used for the L layer of the third multilayer film, the adhesive with a refractive index of 1.55 was used on the emergence side, TiO$_2$ (with a refractive index 2.32 at a wavelength of 550 nm) was used for the H layer of the fifth multilayer film, MgF$_2$ (with a refractive index of 1.39 at a wavelength of 550 nm) was used for the L layer of the fifth multilayer film, and Al$_2$O$_3$ (with a refractive index of 1.65 at a wavelength of 550 nm) was used for the M layer of the fifth multilayer film. The number of layers is 63 in the fifth multilayer film and 13 in the third multilayer film. Tables 11 and 12 show the thickness of each film. FIG. 18 shows the transmittance at an incident angle of 45±2 degrees in all the films including the third multilayer film and fifth multilayer film. Transmittance T was calculated by using the following expression which takes account of the multiple reflection in the adhesive of the non-interfering medium:

$$T = \frac{1}{1/T_1 + 1/T_2 - 1} \qquad \text{[EQUATION 1]}$$

where T1 and T2 represent the transmittances of the third multilayer film and fifth multilayer film, respectively. From the transmittances, s-polarized light is transmitted and p-polarized light is reflected in the blue wavelength band, and s-polarized light is reflected and p-polarized light is transmitted in the red wavelength band in the angular range of 45±2 degrees. Thus, it can be seen that favorable characteristics are provided both in the separation of the wavelength bands and the excellent polarization splitting.

When the multilayer film is separately provided on the incident side and emergence side, it is possible to use design different from that of Example 10 in which it is separately provided for different functions, and the present invention is not limited thereto. The equivalent optical characteristic can also be achieved when a symmetric multilayer film structure is used, and in this case, the same films are used on the incident side and the emergence side, so that the same process can advantageously be used to form the films. The present invention is not limited to the abovementioned structures.

EXAMPLE 11

Example 1 has shown that the first multilayer film can be realized by laminating the three kinds of thin films, that is, the H layer with high refractive index, the L layer with low refractive index, the M layer with medium refractive index between those of the H and L layers in the order of L, H, M, and H, and then adjusting the refractive index and film thickness. The present inventors have studied the first multilayer film and found that the similar characteristics to those of the second multilayer film can be realized by a sixth multilayer film provided by laminating three kinds of thin films, that is, an H layer with high refractive index, an L layer with low refractive index, an M layer with medium refractive index between those of the H and L layers in the order of L, M, L and H, and then adjusting the refractive index and film thickness.

The sixth multilayer film is a multilayer film of L, M, L, and H layers and has the optical characteristic of high transmittance of s-polarized light in a first wavelength band and low transmittance in a second wavelength band different from the first wavelength band, and low transmittance of p-polarized light in the first wavelength band and high transmittance in the second wavelength band. Each of the first wavelength band and the second wavelength band has a bandwidth of 30 nm or more and includes a band in which the difference in transmittance is 60% or higher between s-polarized light and p-polarized light.

Figure 19:
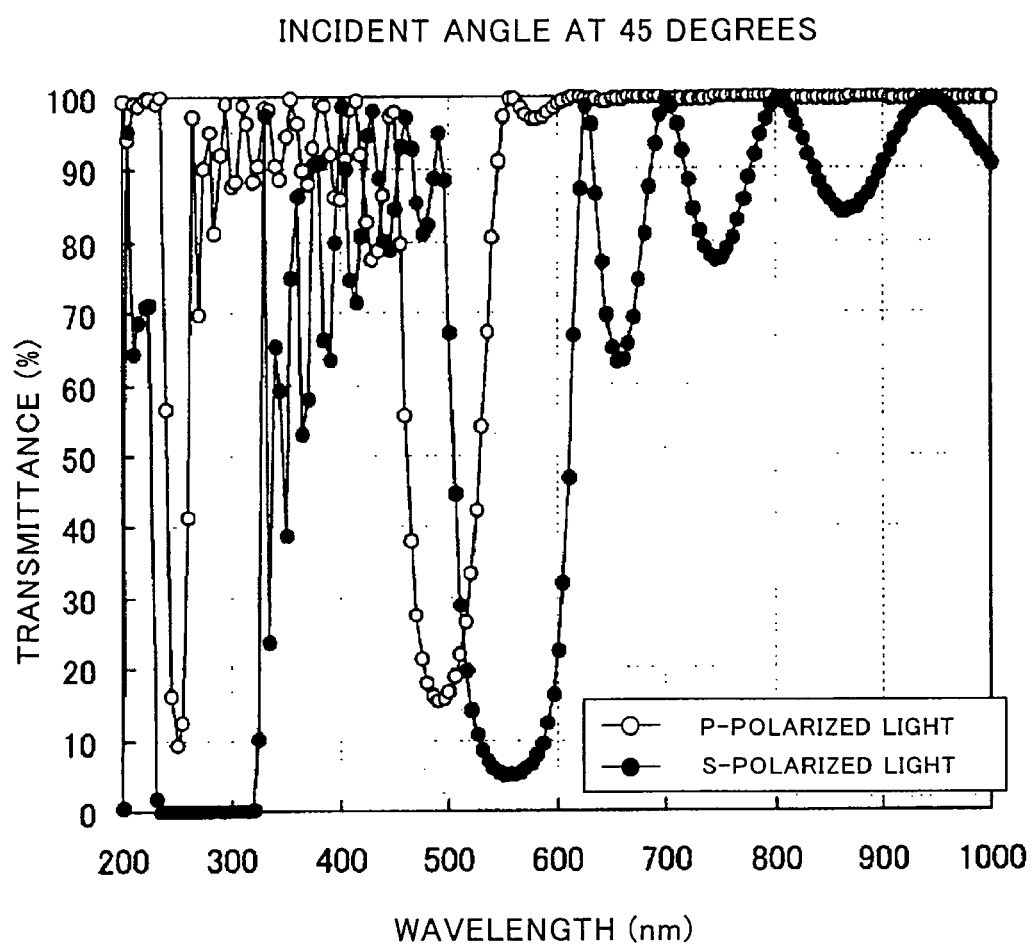
FIG. 19 shows the simulation result of the wavelength characteristic of transmittance of s-polarized light and p-polarized light at an incident angle of 45 degrees in the film structure expressed as Prism|(0.5L1.7M0.5L0.5H)$^{10}$|Adhesive at a wavelength of 550 nm when an incident-side prism is made of a material having a refractive index of 1.85, an H layer has a refractive index of 2.32, an L layer has a refractive index of 1.39, an M layer has a refractive index of 1.65, and an adhesive with a refractive index of 1.55 is used on the emergence side.

S-LAH55 (product name) manufactured by OHARA Inc. was used for an incident-side prism 11 and the material thereof has a refractive index 1.84, the H layer (the material of the H layer) has a refractive index of 2.32, the L layer (the material of the L layer) has a refractive index of 1.39, the M layer (the material of the M layer) has a refractive index of 1.65, and an adhesive with a refractive index of 1.55 was used on the emergence side to bond two prisms. FIG. 19 shows the wavelength characteristic of the transmittance of s-polarized light and p-polarized light at an incident angle of 45 degrees in the film structure expressed as Prism|(0.5L1.7M0.5L0.5H)$^{10}$|Adhesive at a wavelength of 550 nm.

Similarly to FIG. 3 in Example 1, it basically shows the characteristic of an edge filter in which a transmission band and a reflection band alternately appear, and it is characterized by significant polarization splitting in s-polarized light and p-polarized light. The significant polarization splitting can be used to provide the characteristic of transmitting s-polarized light and reflecting p-polarized light in the blue wavelength band (the first wavelength band) and reflecting s-polarized light and transmitting p-polarized light in the red wavelength band (the second wavelength band), that is, provide the basic characteristic of the wavelength selective polarization beam splitter.

The result of study has shown that the excellent polarization beam splitter can be achieved by satisfying the following relationship for the basic film structure in the sixth multilayer film and appropriately selecting the refractive index and film thickness of each layer:

(a×L b×M c×L d×H)

$0<a<3, 0<b<5, 0<c<3, 0<d\leq1$ where a, b, c, and d are real numbers, H the symbol for representing the quarter wavelength thickness of the layer with high refractive index of $d_H=\lambda/(4n_H)$, L the symbol for representing the quarter wavelength thickness of the layer with low refractive index of $d_L=\lambda/(4n_L)$, M the symbol for representing the quarter wavelength thickness of the layer with middle refractive index of $d_M=\lambda/(4n_M)$, nH, nL, and nM the refractive indexes of the H layer, L layer, and M layer, respectively, $d_H$, $d_L$, and $d_M$ the film thickness of the H layer, L layer, and M layer, and k the design wavelength.

In addition, the polarization beam splitter can be provided with a more excellent angular characteristic by satisfying the following relationship for the basic film structure in the multilayer structure and appropriately selecting the refractive index and film thickness of each layer:

(a×L b×M c×L d×H)

$0<a<1.5, 0<b<2, 0<c<1.5, 0<d\leq1$

However, ripple is seen in the transmission wavelength band in FIG. 19. The film thickness was optimized in order to reduce the ripple and adjust the wavelength band.

Figure 20:
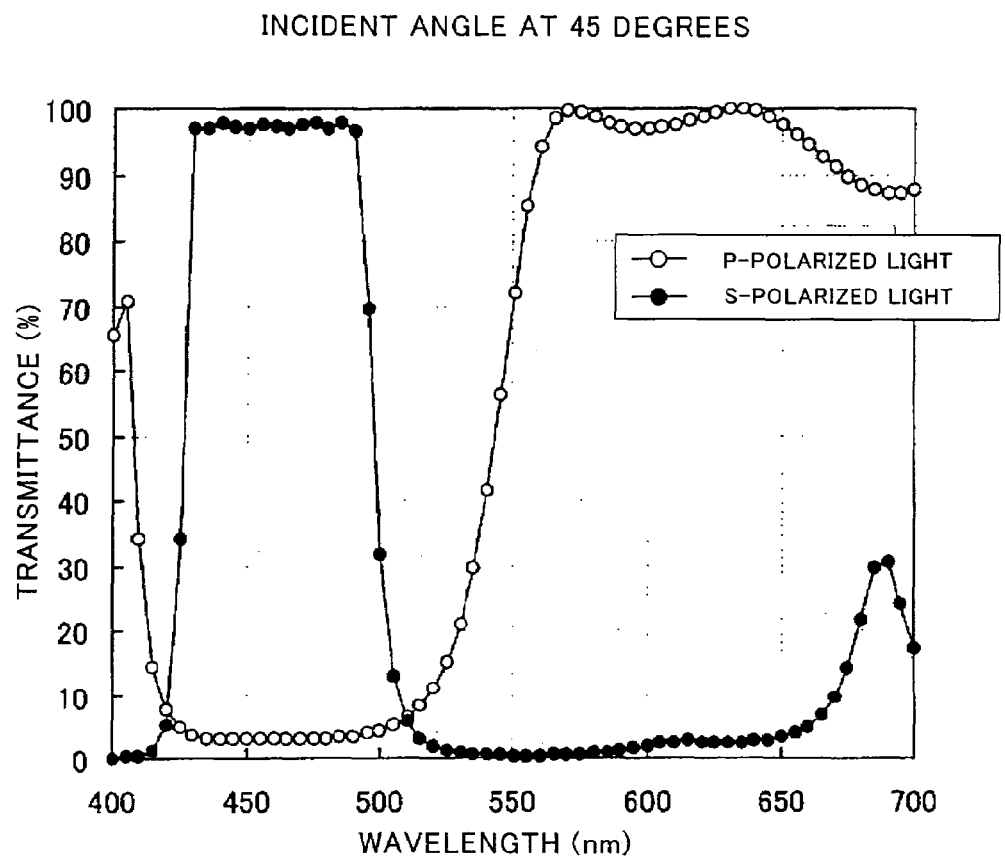
FIG. 20 shows the simulation result of transmittance of s-polarized light and p-polarized light in a wavelength selective polarization beam splitter in Example 11.

S-LAH55 (product name) manufactured by OHARA Inc. (the material thereof having a refractive index 1.84 at a wavelength of 550 nm) was used for the incident-side prism 11, TiO$_2$ (with a refractive index of 2.32 at a wavelength of 550 nm) was used for the H layer, MgF$_2$ (with a refractive index of 1.39 at a wavelength of 550 nm) was used for the L layer, Al$_2$O$_3$ (with a refractive index 1.65 at a wavelength of 550 nm) was used for the M layer, and an adhesive with a refractive index of 1.55 was used on the emergence side. The number of layers is 40 in total. Table 13 shows the thickness of each film. FIG. 20 shows the transmittance at an incident angle of 45 degrees. The number of a layer in Table 13 represents the order from the incident side. At an incident angle of 45 degrees, s-polarized light is transmitted and p-polarized light is reflected in the blue wavelength band (generally 430 to 490 nm), and s-polarized light is reflected and p-polarized light is transmitted in the red wavelength band (generally 580 to 650 nm). Thus, it can be seen that favorable characteristics are provided both in the separation of the wavelength bands and the excellent polarization splitting.

EXAMPLE 12

Examples 2 to 7 have shown that the second multilayer film can be realized by laminating the three kinds of thin films, that is, the H layer with high refractive index, the L layer with low refractive index, the M layer with medium refractive index between those of the H and L layers in the order of L, H, M, and H, and then adjusting the refractive index and film thickness. In addition, Examples 8 to 10 have shown that the fifth multilayer film similar to the second multilayer film can be realized by laminating the M layer, L layer, M layer, and H layer in the order and then adjusting the refractive index and film thickness.

The present inventors have studied the second or fifth multilayer film and found that three kinds of thin films, that is, an H layer with high refractive index, an L layer with low refractive index, an M layer with medium refractive index between those of the H and L layers are laminated in the order of the L layer, M layer, L layer, and H layer, and the refractive index and film thickness are adjusted to provide a seventh multilayer film which can realize the similar characteristics to those of the second or fifth multilayer film.

The seventh multilayer film is a multilayer of the L, M, L, and H layers, and has the optical characteristic of high transmittance of s-polarized light in a first wavelength band, low transmittance of p-polarized light in the first wavelength band, and high transmittance in a second wavelength band different from the first wavelength band. Each of the first wavelength band and the second wavelength band has a bandwidth of 30 nm or more and includes a band in which the difference in transmittance is 60% or higher between s-polarized light and s-polarized light.

Figure 21:
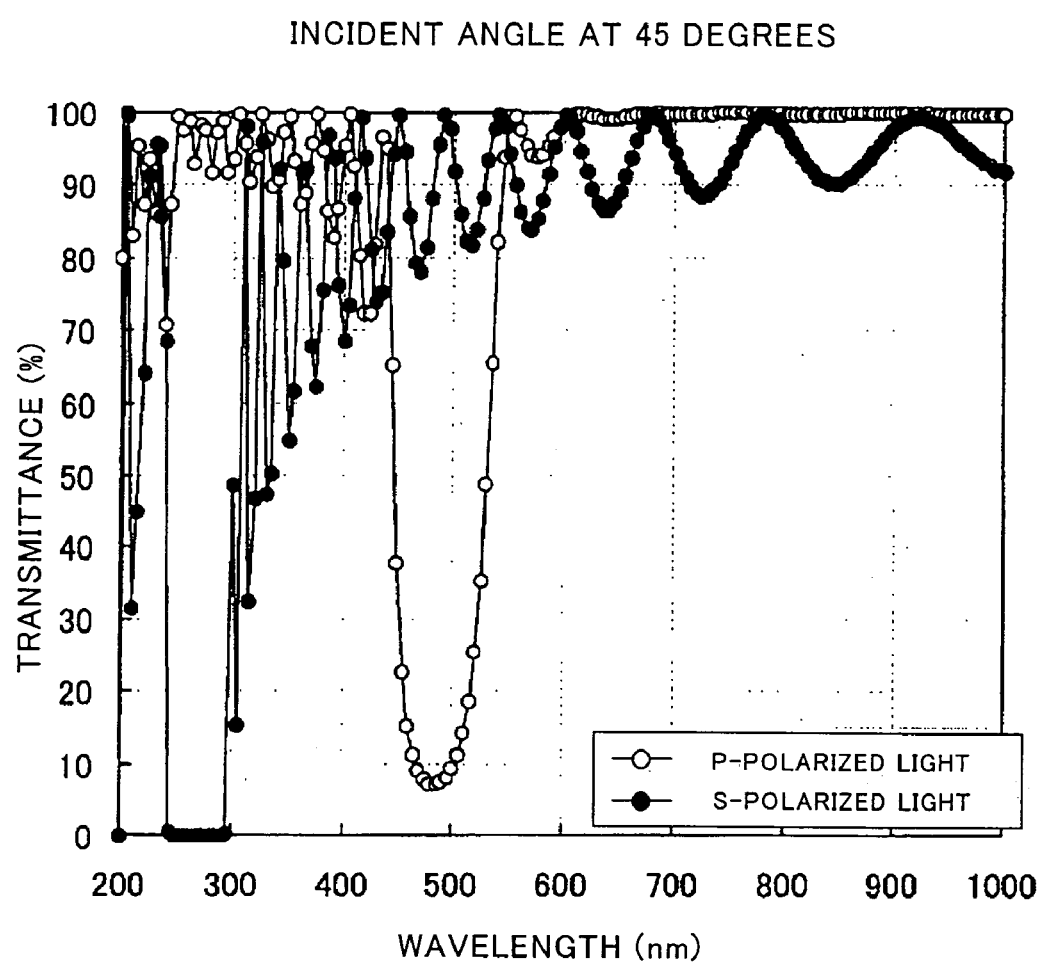
FIG. 21 shows the simulation result of the wavelength characteristic of transmittance of s-polarized light and p-polarized light at an incident angle of 45 degrees in the film structure expressed as Prism|(0.5L1.9M0.5L0.32H)$^{10}$|Adhesive at a wavelength of 550 nm when an incident-side prism is made of a material having a refractive index of 1.85, an H layer has a refractive index of 2.32, an L layer has a refractive index of 1.39, an M layer has a refractive index of 1.65, and an adhesive with a refractive index of 1.55 is used on the emergence side.

S-LAH55 (product name) manufactured by OHARA Inc. was used for an incident-side prism 11 and the material thereof has a refractive index 1.84, the H layer (the material of the H layer) has a refractive index of 2.32, the L layer (the material of the L layer) has a refractive index of 1.39, the M layer (the material of the M layer) has a refractive index of 1.65, and an adhesive with a refractive index of 1.55 was used on the emergence side to bond two prisms. FIG. 21 shows the wavelength characteristic of the transmittance of s-polarized light and p-polarized light at an incident angle of 45 degrees in the film structure expressed as Prism|(0.5L1.9M0.5L0.32H)$^{10}$|Adhesive at a wavelength of 550 nm.

Similarly to FIG. 6 in Example 2 and FIG. 15 in Example 8, it basically shows the characteristic of an edge filter in which a transmission band and a reflection band alternately appear, and it is characterized by significant polarization splitting in s-polarized light and p-polarized light. The significant polarization splitting can be used to provide the characteristic of transmitting s-polarized light and reflecting p-polarized light generally in the blue wavelength band (the first wavelength band) and transmitting s-polarized light and p-polarized light in the red wavelength band (the second wavelength band), that is, provide the basic characteristic of the seventh multilayer film.

When multilayer films with shifted design wavelengths are laminated for the seventh multilayer film, s-polarized light is hardly affected (although ripple is increased) since it is transmitted throughout the wavelength band (approximately 420 nm to 650 nm), and only the blocking wavelength band of p-polarized light is widened. Thus, the seventh multilayer film can be put on another multilayer film to reduce only the transmittance of p-polarized light in the blue wavelength band as a whole.

As a result, the first or sixth multilayer film can be put on the seventh multilayer film to provide a polarization beam splitter with an excellent angular characteristic.

The result of study has shown that the polarization beam splitter can be provided with an excellent angular characteristic by satisfying the following relationship for the basic film structure in the seven multilayer film and appropriately selecting the refractive index and film thickness of each layer:

(axL bxM cxL dxH)

0<d≦a≦b<5, 0<d≦c≦b<5 where a, b, c, and d are real numbers, H the symbol for representing the quarter wavelength thickness of the layer with high refractive index of $d_H = \lambda/(4n_H)$, L the symbol for representing the quarter wavelength thickness of the layer with low refractive index of $d_L = \lambda/(4n_L)$, M the symbol for representing the quarter wavelength thickness of the layer with middle refractive index of $d_M = \lambda/(4n_M)$, nH, nL, and nM the refractive indexes of the H layer, L layer, and M layer, respectively, $d_H$, $d_L$, and $d_M$ the film thickness of the H layer, L layer, and M layer, and λ the design wavelength.

In addition, the polarization beam splitter can be provided with a more excellent angular characteristic by satisfying the following relationship for the basic film structure in the multilayer structure and appropriately selecting the refractive index and film thickness of each layer:

(axL bxM cxL dxH)

0<d≦a≦b<3, 0<d≦c≦b<3

In specific design, the sixth multilayer film was put on the seventh multilayer film including an increased number of layers for widening the blocking band at a small incident angle, and the thickness was optimized in order to reduce ripple and adjust the wavelength band.

Figure 22:
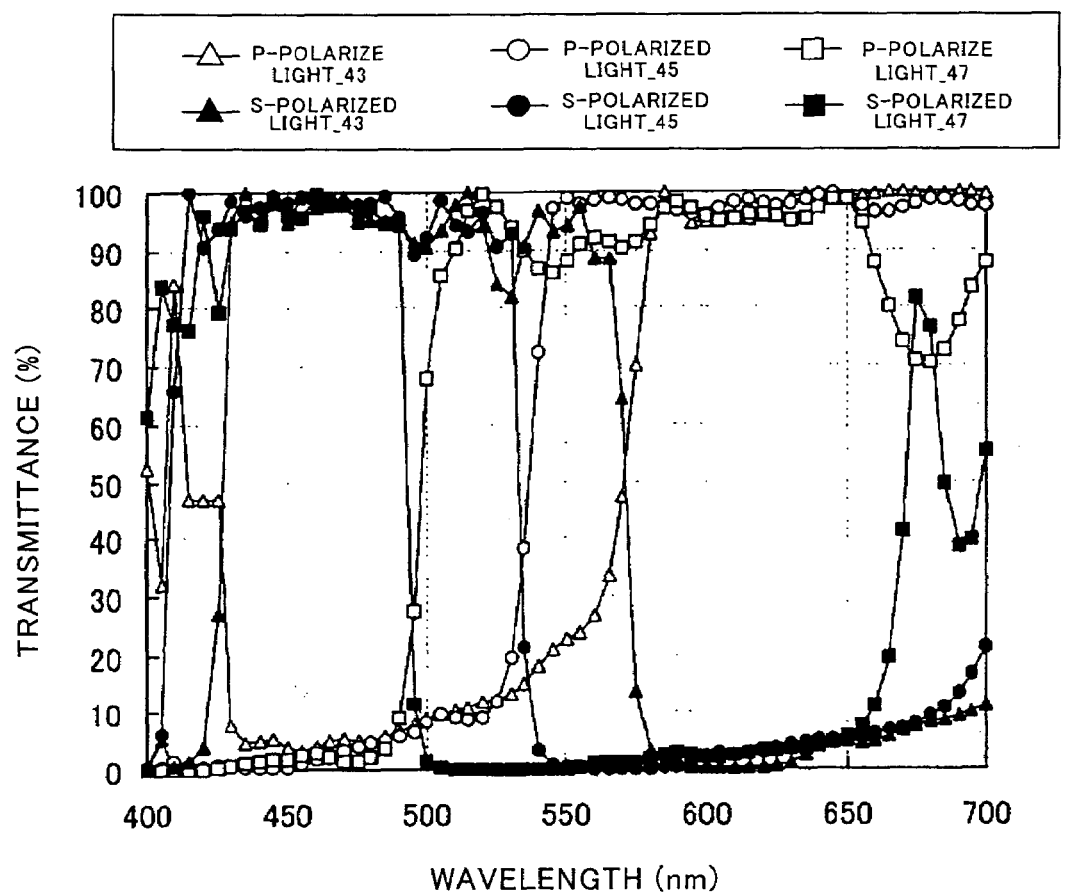
FIG. 22 shows the simulation result of transmittance of s-polarized light and p-polarized light in a wavelength selective polarization beam splitter in Example 12.

S-LAH55 (product name) manufactured by OHARA Inc. (with a refractive index 1.84 at a wavelength of 550 nm) was used for the incident-side prism, $TiO_2$ (with a refractive index of 2.32 at a wavelength of 550 nm) was used for the H layer, $MgF_2$ (with a refractive index of 1.39 at a wavelength of 550 nm) was used for the L layer, $Al_2O_3$ (with a refractive index 1.65 at a wavelength of 550 nm) was used for the M layer, and an adhesive with a refractive index of 1.55 was used on the emergence side. The number of layers is 100 in total. Table 14 shows the thickness of each film. FIG. 22 shows the transmittance at an incident angle of 45±2 degrees. In the angular range of 45±2 degrees, s-polarized light is transmitted and p-polarized light is reflected in the blue wavelength band, and s-polarized light is reflected and p-polarized light is transmitted in the red wavelength band, which shows favorable characteristics provided both in the separation of the wavelength bands and the excellent polarization splitting.

It is obvious that the equivalent characteristics can also be achieved by putting the seventh multilayer film on the second multilayer film having the similar characteristics to those of the sixth multilayer film, and the present invention is not limited thereto.

EXAMPLE 13

In Example 12, the three kinds of thin films, that is, the H layer with high refractive index, the L layer with low refractive index, the M layer with medium refractive index between those of the H and L layers are laminated in the order of the L layer, M layer, L layer, and H layer, and then the refractive index and film thickness are adjusted to provide the seventh multilayer film. The seventh multilayer film is put on the sixth multilayer film. A polarization beam splitter in Example 13 is formed by putting the third multilayer film on the seventh multilayer film provided by laminating the L layer, M layer, L layer, and H layer.

The third multilayer film has the optical characteristic of high transmittance of s-polarized light in the first wavelength band, low transmittance in the second wavelength band, and high transmittance of p-polarized light in the second wavelength band.

Figure 23:
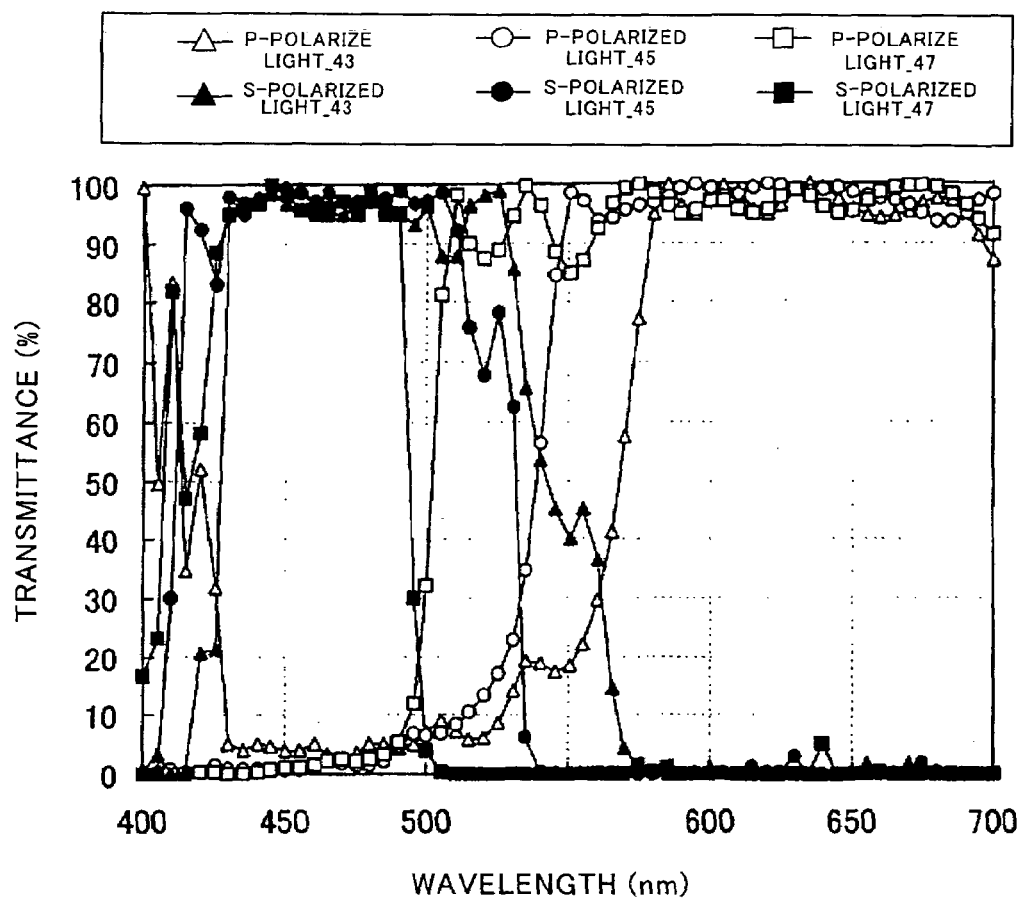
FIG. 23 shows the simulation result of transmittance of s-polarized light and p-polarized light in a wavelength selective polarization beam splitter in Example 13.

In specific design, the number of layers was increased to widen the blocking band in the seventh multilayer film, and the film thickness was optimized to reduce ripple and adjust the wavelength band. S-LAH55 (product name) manufactured by OHARA Inc. (with a refractive index 1.84 at a wavelength of 550 nm) was used for an incident-side prism 11, $TiO_2$ (with a refractive index of 2.32 at a wavelength of 550 nm) was used for the H layer, $MgF_2$ (with a refractive index of 1.39 at a wavelength of 550 nm) was used for the L layer, $Al_2O_3$ (with a refractive index 1.65 at a wavelength of 550 nm) was used for the M layer, and an adhesive with a refractive index of 1.55 was used on the emergence side. The number of layers is 117 in total. Table 15 shows the thickness of each film. FIG. 23 shows the transmittance at an incident angle of 45±2 degrees. In the angular range of 45±2 degrees, s-polarized light is transmitted and p-polarized light is reflected in the blue wavelength band, and s-polarized light is reflected and p-polarized light is transmitted in the red wavelength band, which shows favorable characteristics provided both in the separation of the wavelength bands and the excellent polarization splitting.

EXAMPLE 14

Figure 24:
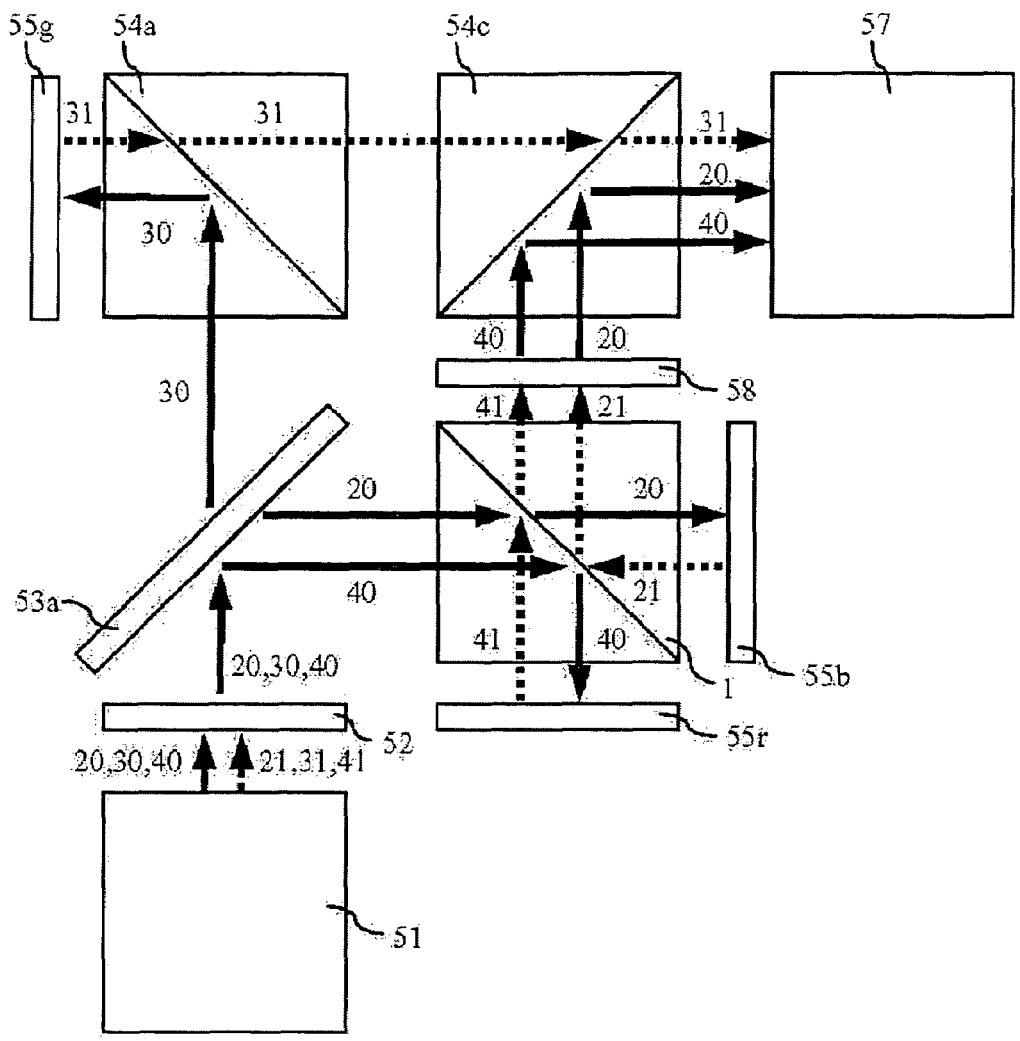
FIG. 24 shows an image projection apparatus which employs the wavelength selective polarization beam splitter and a reflection type light modulator realized with liquid crystal in Example 14.

FIG. 24 is a schematic diagram showing the main portions of Example 14 of a projection apparatus which employs the polarization beam splitter in any of Examples 1 to 13 of the present invention. FIG. 24 shows the structure in which the wavelength selective polarization beam splitter is used as a color separation/combination means, a plurality of reflection type liquid crystal display devices 55b, 55g, and 55r are used to modulate polarization directions in accordance with a plurality of signals, and a projection optical system 57 is used to project images produced by the liquid crystal display devices.

Arrows represent the optical paths of respective light beams for red, green, and blue in white display (image information is for white color). Solid lines represent s-polarized light, while broken lines represent p-polarized light.

Specifically, reference numerals 20 and 21 show s-polarized light and p-polarized light in the blue wavelength band, 30 and 31 s-polarized light and p-polarized light in the green wavelength band, and 40 and 41 s-polarized light and p-polarized light in the red wavelength band.

White light 20, 30, and 40 emit from a light source 51 (a light source means) and are unified into s-polarized light by a polarization changer 52. A dichroic mirror 53a transmits the light beam 30 in the green wavelength band (at wavelengths of approximately 500 to 580 nm), and reflects the light beam 40 in the red wavelength band (at wavelengths of approximately 580 to 650 nm) and the light beam 20 in the blue wavelength band (at wavelength of approximately 430 to 490 nm).

The light beam 30 in the green wavelength band transmitted through the dichroic mirror 53a is reflected by a PBS 54a, incident on a reflection type liquid crystal display device 55g for green, and modulated. For the white display, the modulated light emerges therefrom as p-polarized light 31 which is then transmitted through the PBS 54a and a PBS 54c and is incident on a projection lens system 57 for projection.

The light beam 20 in the blue wavelength band reflected by the dichroic mirror 53a is transmitted through a wavelength selective polarization beam splitter 1, incident on a reflection type liquid crystal display device 55b for blue, and modulated. For the white display, the modulated light emerges therefrom as p-polarized light 21, so that it is reflected by the wavelength selective polarization beam splitter 1 and changed into s-polarized light 20 through a half-wave plate 58. It is then reflected by the PBS 54c and is incident on the projection lens system 57 for projection.

The light beam 40 in the red wavelength band reflected by the dichroic mirror 53a is reflected by the wavelength selective polarization beam splitter 1, incident on a reflection type liquid crystal display device 55r for red, and modulated. For the white display, since the modulated light emerges therefrom as p-polarized light 41, it is transmitted through the wavelength selective polarization beam splitter 1, changed into s-polarized light 40 through the half-wave plate 58, reflected by the PBS 54c, and incident on the projection lens system 57 for projection.

For black display (image information is for black color), all of the light beams emerge from the reflection type liquid crystal display devices 55r, 55g, or 55b with the same polarization as when they are incident thereon, so that they return toward the light source 51 along the same optical paths through the respective optical members. The half-wave plate 58 preferably has no wavelength dependency.

Figure 27:
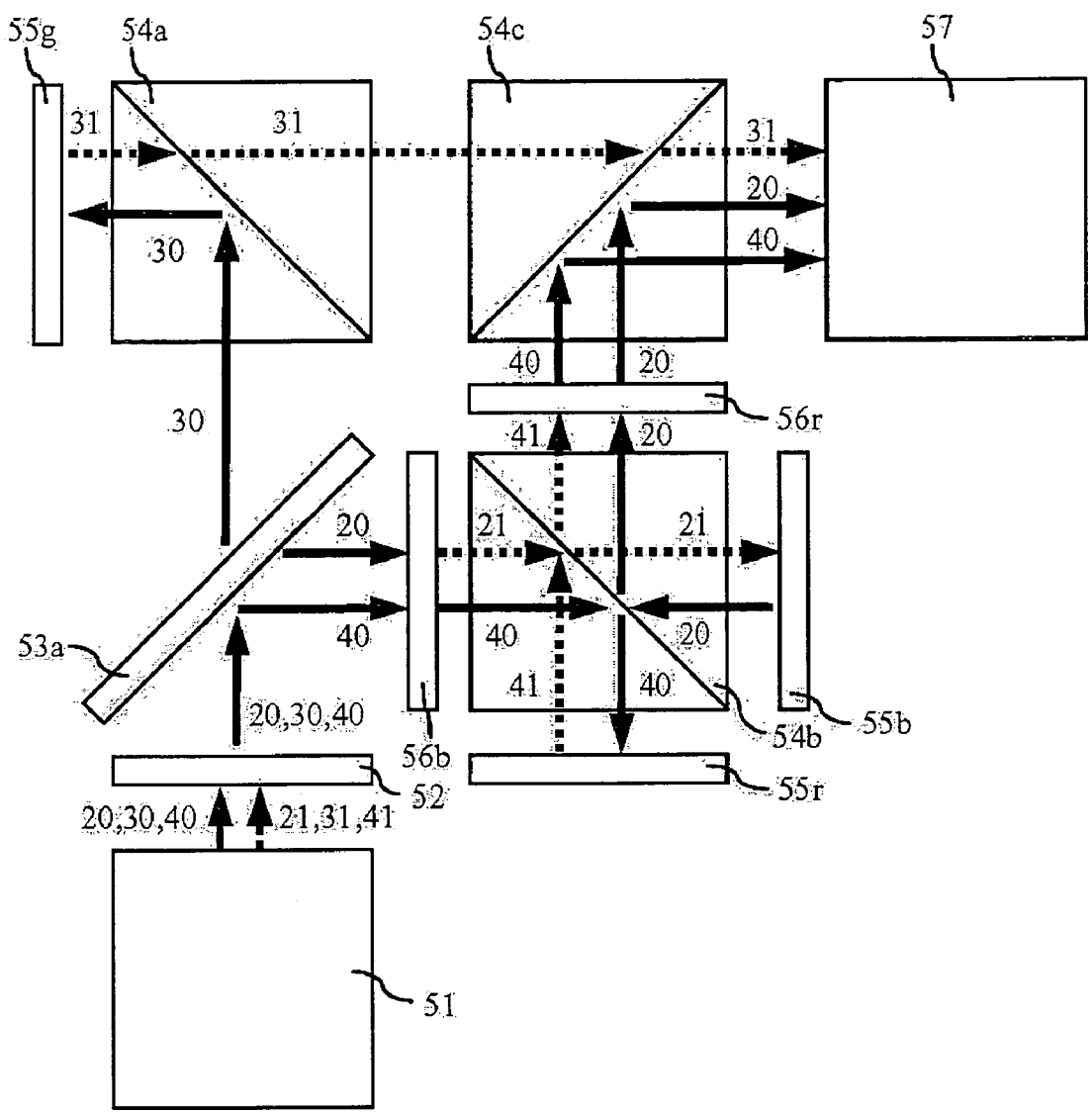
FIG. 27 shows a conventional liquid crystal projection apparatus which employs a reflection type light modulator realized with liquid crystal.

The wavelength selective polarization beam splitter 1 replaces the PBS54b in the conventional liquid crystal projection optical system which employs the reflection type liquid crystal display device in FIG. 27 to eliminate the need to use the two wavelength selective phase shifters 56b and 56r.

Since the wavelength selective polarization beam splitter in each of Examples 1 to 13 is formed with a dielectric thin film which can be fabricated through vacuum deposition or the like, the problems associated with the wavelength selective polarization beam splitter are improved, and it is possible to realize a color separation/combination means which achieves enhanced reliability and durability as well as high surface accuracy in a simplified structure. In addition, the elimination of wavelength selective phase shifters can increase the transmittance as a whole and the amount of projected light.

The color separation/combination means in FIG. 24 is only an example. Even when the optical members, wavelength bands for color separation, directions of light beams and the like are different from those in FIG. 24, a projection apparatus can be realized by using the wavelength selective polarization beam splitter. Particularly, the polarizer arranged between the components can block specific polarized light and reduce light leaked from the components, which is effective in improvement of contrast. While the polarization changer 52 changes the light into s-polarized light in FIG. 24, a similar projection apparatus can also be provided by using p-polarized light, and the present invention is not limited thereto.

Since each prism in the color separation/combination system involves a phase difference due to stress associated with a temperature rise, the polarization state of propagated light is changed. It is thus preferable to use an optical member with a low photoelastic constant. For example, PBH56 manufactured by OHRA Inc. with a photoelastic constant as low as $0.09 \times 10^{-8}$ cm$^2$/N is preferably used. It is also preferable to use an optical member in which the occurrence of stress is reduced. Since the stress is calculated by the function of the Young's modulus and expansion coefficient, an optical member with a low Young's modulus and a low expansion coefficient is preferably used. For example, S-LAL14, S-LAH55 manufactured by OHARA Inc. or the like is preferably used.

When the manufacturing tolerance of the illumination optical system and components, the spectral distribution of the light source means and the like are considered in the characteristic of the wavelength selective polarization beam splitter in each of Examples 1 to 13, sufficient brightness and contrast cannot be provided in the projection apparatus unless each of the first wavelength band and second wavelength band has a bandwidth of 30 nm or more and the difference in transmittance is 60% or higher between s-polarized light and s-polarized light in the first wavelength band and second wavelength band each having a bandwidth of 30 nm or more. More preferably, each of the first wavelength band and second wavelength band has a bandwidth of 50 nm or more and the difference in transmittance is 75% or higher between s-polarized light and s-polarized light in the first wavelength band and second wavelength band each having a bandwidth of 50 nm or more. It is apparent that a larger bandwidth and a greater difference in transmittance between s-polarized light and p-polarized light are preferable. Design may be made in view of that point.

The foregoing explanation applies to each of Examples described below.

EXAMPLE 15

Figure 25:
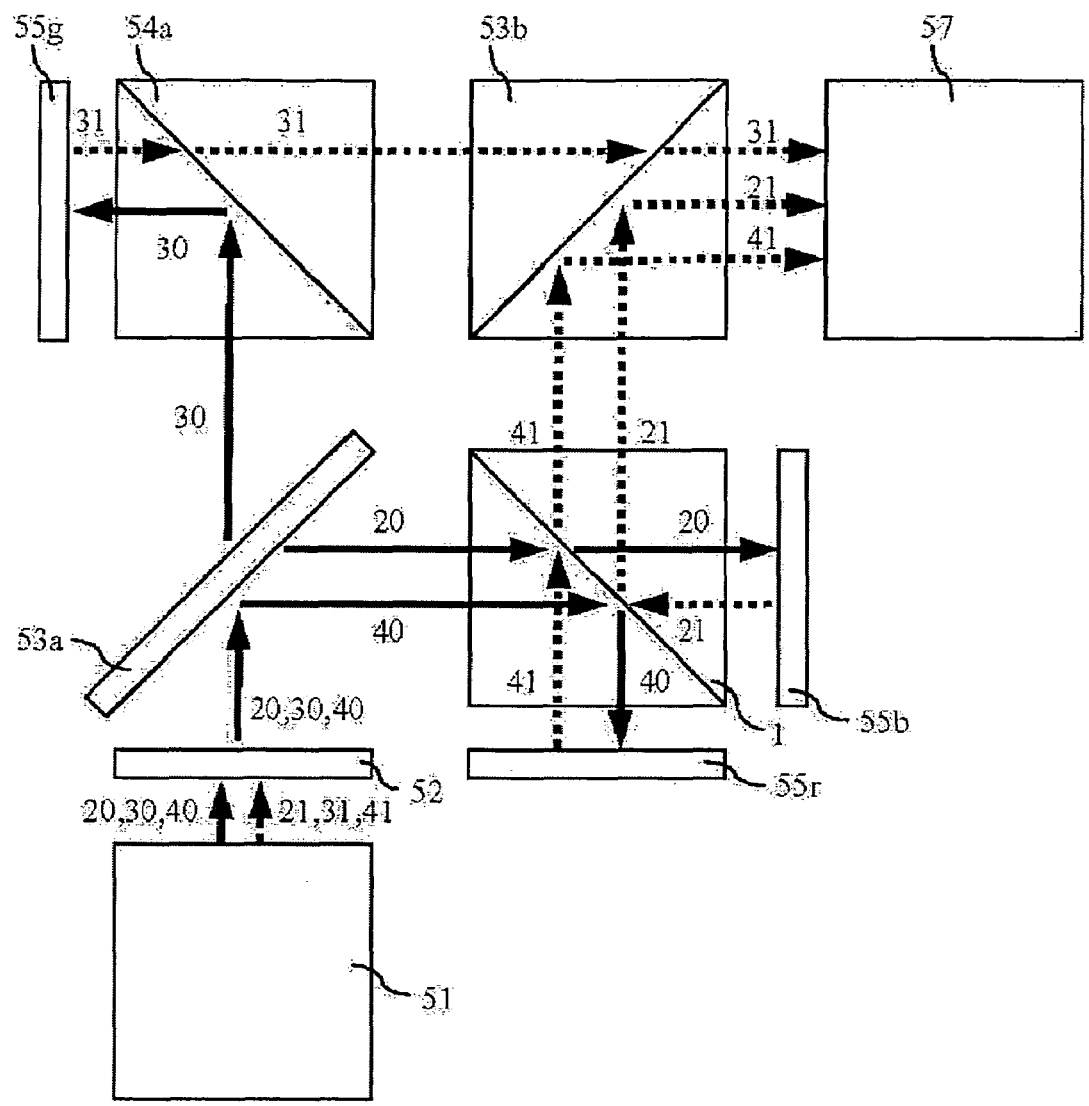
FIG. 25 shows an image projection apparatus which employs the wavelength selective polarization beam splitter and a reflection type light modulator realized with liquid crystal in Example 15.

FIG. 25 is a schematic diagram showing the main portions of a projection apparatus of Example 15 of the present invention. Example 15 is the projection apparatus which employs the wavelength selective polarization beam splitter in any of Examples 1 to 13 and a reflection type liquid crystal display device, similarly to Example 14. In FIG. 25, arrows represent the optical paths of respective light beams for red, green, and blue in white display. Solid lines represent s-polarized light, while broken lines represent p-polarized light.

White light 20, 30, and 40 emit from a light source 51 (a light source means) and are unified into s-polarized light by a polarization changer 52. A dichroic mirror 53a transmits the light beam 30 in the green wavelength band, and reflects the light beam 40 in the red wavelength band and the light beam 20 in the blue wavelength band. The light beam 30 transmitted through the dichroic mirror 53a is reflected by a PBS 54a, incident on a reflection type liquid crystal display device 55g realized with liquid crystal for green, and modulated.

For the white display, the modulated light emerges therefrom as p-polarized light 31 which is then transmitted through the PBS 54a and a dichroic prism 53b, and incident on a projection lens system 57 for projection. The dichroic prism 53b is a device formed of prisms sandwiching a multilayer film which transmits p-polarized light in the green wavelength band and reflects p-polarized light in the blue and red wavelength bands.

The light beam 20 in the blue wavelength band reflected by the dichroic mirror 53a is transmitted through a wavelength selective polarization beam splitter 1, incident on a reflection type liquid crystal display device 55b for blue, and modulated. For the white display, the modulated light emerges therefrom as p-polarized light 21, so that it is reflected by the wavelength selective polarization beam splitter 1, reflected by the dichroic prism 53b, and incident on the projection lens system 57 for projection. The light beam 40 in the red wavelength band reflected by the dichroic mirror 53a is reflected by the wavelength selective polarization beam splitter 1, incident on a reflection type liquid crystal display device 55r for red, and modulated. For the white display, since the modulated light emerges therefrom as p-polarized light 41, it is transmitted through the wavelength selective polarization beam splitter 1, reflected by the dichroic prism 53b, and incident on the projection lens system 57 for projection.

For black display, all of the light beams emerge from the reflection type liquid crystal display devices 55r, 55g, or 55b with the same polarization as when they are incident thereon, so that they return toward the light source 51 along the same optical paths through the respective optical members.

Since Example 15 does not employ a half-wave plate, the transmittance is increased as a whole and the amount of light is increased. The wavelength selective polarization beam splitter 1 replaces the PBS 54b in the conventional projection apparatus which employs the reflection type liquid crystal display device in FIG. 27 to eliminate the need to use the two wavelength selective phase shifters 56b and 56r. Since the wavelength selective polarization beam splitter in each of Examples 1 to 13 is formed with a dielectric thin film which can be fabricated through vacuum deposition or the like, the problems associated with the wavelength selective polarization beam splitter are improved, and it is possible to realize a color separation/combination means which achieves enhanced reliability and durability as well as high surface accuracy in a simplified structure. In addition, the elimination of wavelength selective phase shifters can increase the transmittance as a whole and the amount of projected light.

EXAMPLE 16

FIG. 26 is a schematic diagram showing the main portions of a projection apparatus of Example 16 of the present invention. Example 16 is provided to more enhance contrast and reduce flare in the projection apparatus of Example 15.

In FIG. 25, solid lines represent s-polarized light, broken lines represent p-polarized light, and dashed lines represent circularly polarized light.

Example 16 differs from Example 15 in that a polarizer 59 for blocking s-polarized light is disposed between a PBS 54a and a dichroic prism 53b and between a wavelength selective polarization beam splitter 1 and the dichroic prism 53b, and a quarter-wave plate 60 is disposed between the dichroic prism 53b and a projection lens system 57.

Since the polarizers 59 block light leaked from the PBS 54a and the wavelength selective polarization beam splitter 1, contrast is improved. In particular, it can block leakage of s-polarized light reflected by a reflection type liquid crystal display device from the PBS 54a and the wavelength selective polarization beam splitter 1 in black display. Depending on an anti-reflection film, each lens of the projection lens system 57 reflects some amount of light, and the reflected light returns toward the color separation/combination means as return light.

Figure 26A:
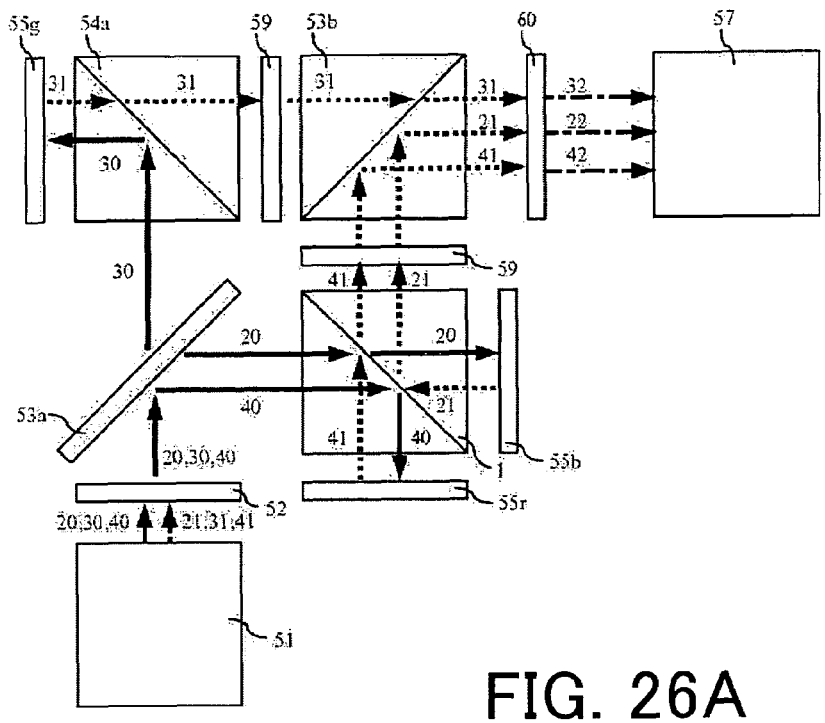
FIG. 26(a) and 26(b) show an image projection apparatus which employs the wavelength selective polarization beam splitter and a reflection type light modulator realized with liquid crystal in Example 14, and specifically.

In the conventional color separation/combination means of FIG. 27, the return light reaches the light modulator realized with liquid crystal and thus causes flare. In contrast, in Example 16, the light beams emerging from the quarter-wave plate 60 are circularly polarized light 22, 32, and 42 in the blue, green, and red wavelength bands, respectively, and incident on the projection lens 57 for projection, as shown in FIG. 26(a). Return light 22, 32, and 42 from the projection lens 57 are changed into s-polarized light 20, 30, and 40 through the quarter-wave plate 60, as show in FIG. 26(b). The dichroic prism 53b transmits or reflects the light, but all of the transmitted light and reflected light are blocked by the polarizer 59.

Figure 26B:
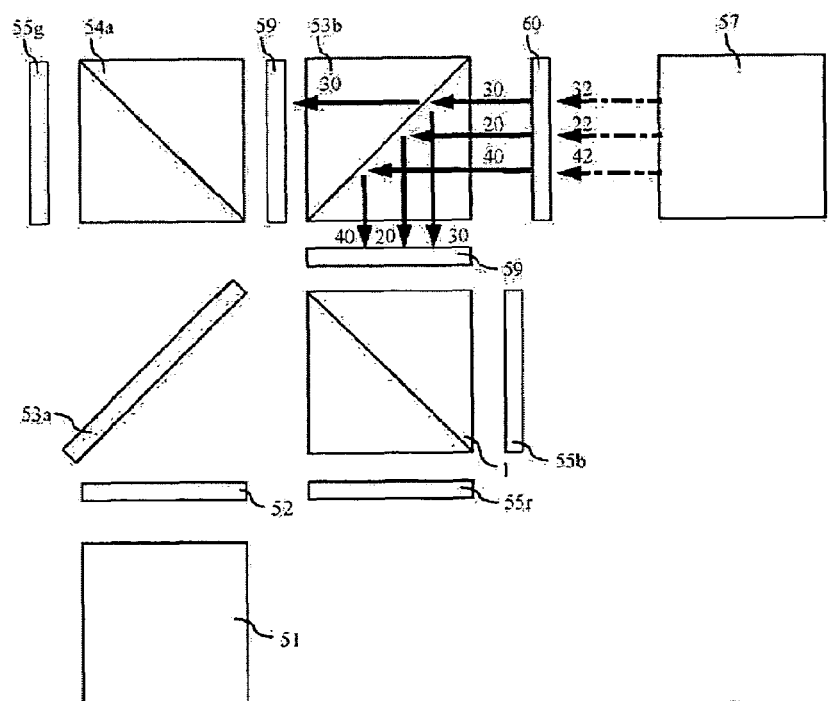

Since the return light does not reach the light modulator realized with liquid crystal, the flare can be reduced. The color separation/combination means in FIGS. 26(a) and 26(b) is only an example. Even when the optical members, wavelength bands for color separation, directions of light beams and the like are different from those in FIG. 26, a projection apparatus can be realized by using the wavelength selective polarization beam splitter.

As described above, the projection apparatus of each of Examples has the light source means, the polarization changing means for unifying the polarization directions of non-polarized light, the means for separating/combining light depending on the wavelength band, the optical means for having both of the functions of color separation and combination of light with any one of the polarization beam splitters in Examples 1 to 13, the light modulating means for modulating the polarization direction, and the projection means for projecting the combined light.

The projection apparatus (the image display apparatus) of each of Examples has the plurality of reflection type liquid crystal display devices (reflection type liquid crystal panels), and the optical member which illuminates the plurality of reflection type liquid crystal display devices with light for a plurality of colors, and combines and projects the light for the plurality of colors from the plurality of reflection type liquid crystal display devices. The optical system employs the polarization beam splitter described in any one of Examples 1 to 13 to combine the light for the plurality of colors from the plurality of reflection type liquid crystal display devices. The optical system has an optical axis at an angle of approximately 45 degrees (an angle in the range of 44 to 46 degrees) with respect to the multilayer film (the surface on which the multilayer film structure is formed) of the polarization beam splitter. A light beam incident on the multilayer film of the polarization beam splitter has the range of incident angles equal to or smaller than 10 degrees (in other words, the light beam is incident on the surface on which the multilayer film structure is formed at an angle in the range of 40 to 50 degrees).

As described above, according to each of Examples, the polarization beam splitter with wavelength selectivity including the laminated thin films having three different refractive indexes (three ranges of refractive indexes different from one another) can be used to realize the optical system (the projection apparatus) with no need for a wavelength selective phase changer in a color separation/combination means in an optical system of a reflection type liquid crystal projector, which enables the optical system with small size and high durability. In addition, it is possible to realize the structure of the color separation/combination means which blocks return light reflected by the projection lens to provide an optical system which allows improved contrast and reduced flare.

Examples discussed above will be described with reference to Table 16. Table 16 shows the general structure of the main components of the multilayer film (the general structure of the multilayer film) used in the polarization beam splitter of Examples 1 to 13, the material and the refractive index of the incident-side prism, the refractive index of the high refractive index layer, the refractive index of the middle refractive index layer, the refractive index of the low refractive index layer, the refractive index of the adhesive disposed on the emergence side, the difference in refractive index between the high refractive index layer and the middle refractive index layer, the difference in refractive index between the middle refractive index layer and the low refractive index layer, the transmittance (%) of p-polarized light at a wavelength of 430 nm, the transmittance (%) of s-polarized light at a wavelength of 430 nm, the difference (%) in transmittance between s-polarized light and p-polarized light at a wavelength of 430 nm, the transmittance (%) of p-polarized light at a wavelength of 490 nm, the transmittance (%) of s-polarized light at a wavelength of 490 nm, the difference (%) in transmittance between s-polarized light and p-polarized light at a wavelength of 490 nm, the transmittance (%) of p-polarized light at a wavelength of 580 nm, the transmittance (%) of s-polarized light at a wavelength of 580 nm, the difference (%) in transmittance between s-polarized light and p-polarized light at a wavelength of 580 nm, the transmittance (%) of p-polarized light at a wavelength of 650 nm, the transmittance (%) of s-polarized light at a wavelength of 650 nm, and the difference (%) in transmittance between s-polarized light and p-polarized light at a wavelength of 650 nm.

The wavelengths of 430 nm and 490 nm correspond to the region in which the polarization beam splitters of Examples 1 to 3 and Examples 5 to 13 transmit s-polarized light and reflect p-polarized light (that is, the first wavelength band). In Example 4, the wavelengths correspond to approximate upper and lower limits (variations of approximately 10 to 20 nm are present in some of Examples) of the region in which s-polarized light is reflected and p-polarized light is transmitted (that is, the second wavelength band).

The wavelengths of 580 nm and 650 nm correspond to the region in which the polarization beam splitters of Examples 1 to 3 transmit p-polarized light and reflect s-polarized light (that is, the second wavelength band). In Example 4, the wavelengths correspond to approximate upper and lower limits (variations of approximately 10 to 20 nm are present in some of Examples) of the region in which p-polarized light is reflected and s-polarized light is transmitted (that is, the first wavelength band).

While the difference in transmittance is shown, the difference in transmittance between p-polarized light and s-polarized light in the range of a wavelength of 430 nm to a wavelength of 490 nm is equal to or larger than the difference in transmittance at a wavelength of 430 nm and the difference in transmittance at a wavelength of 490 nm. The same applies to the range of a wavelength of 580 nm to a wavelength of 650 nm.

The following can be seen from Table 16. The following description shows conditions which are satisfied in at least some of Examples as apparent from Table 16.

It is desirable that the prism (a different optical member may be used as long as it is a transmission type member) disposed on the incident side has a refractive index of 1.55 (preferably 1.65) or hither and 2.1 (preferably 1.90) or lower.

The high refractive index layer desirably has a refractive index of 2.0 (preferably 2.1) or higher and 2.6 (preferably 2.35) or lower.

The middle refractive index layer desirably has a refractive index of 1.59 (preferably 1.60) or higher and 1.9 (preferably 1.82) or lower.

The low refractive index layer desirably has a refractive index of 1.25 (preferably 1.35) or higher and 1.56 (preferably 1.50) or lower.

The adhesive on the emergence side desirably has a refractive index of 1.40 (preferably 1.50) or higher and 1.70 (preferably 1.60) or lower.

The difference in transmittance between the high refractive index layer and the middle refractive index layer is desirably 0.35 (preferably 0.48) or higher and 0.9 (preferably 0.70) or lower.

The difference in transmittance between the middle refractive index layer and the low refractive index layer is desirably 0.12 (preferably 0.15) or higher and 0.55 (preferably 0.42) or lower.

The first wavelength range desirably includes a region of at least 450 to 480 nm (preferably 430 nm to 490 nm). It may include a region of 600 to 630 nm (preferably 585 to 630 nm) as in Example 4. In the first wavelength region, s-polarized light desirably has a transmittance of 60% (more preferably 80%, and even more preferably 90%) or higher, and p-polarized light desirably has a transmittance of 40% (more preferably 32%, and even more preferably 20%) or lower. As a result, the difference in transmittance between s-polarized light and p-polarized light is 60% (more preferably 70%, and even more desirably 80%) or higher. In Example 4, s-polarized light desirably has a transmittance of 40% (more desirably 30%, and more preferably 20%) or lower, and p-polarized light desirably has a transmittance of 60% (more desirably 80%, and more preferably 90%) or higher. As a result, in Example 4, the difference in transmittance between s-polarized light and p-polarized light is 60% (more preferably 70%) or higher.

The second wavelength range desirably includes a wavelength region of at least 600 to 630 nm (preferably 590 nm to 650 nm). It may include a region of 450 to 480 nm (preferably 430 to 490 nm) as in Example 4. In the second wavelength region, s-polarized light desirably has a transmittance of 40% (preferably 20%, and more desirably 10%) or lower, and p-polarized light desirably has a transmittance of 60% (preferably 80%, and more preferably 90%) or higher. As a result, the difference in transmittance between s-polarized light and p-polarized light is 60% (preferably 70%, and more preferably 75%) or higher. In Example 4, s-polarized light desirably has a transmittance of 40% (preferably 15%, and more preferably 7%) or lower, and p-polarized light desirably has a transmittance of 60% (preferably 70%) or higher. As a result, in Example 4, the difference in transmittance between s-polarized light and p-polarized light is 60% (preferably 70%, and more preferably 72%) or higher.

From the foregoing explanation, the following can be seen in all of Examples.

The polarization beam splitter described in each of the Examples includes a multilayer film formed by laminating a first layer having a refractive index in a first range, a second layer having a refractive index in a second range which does not overlap the first range, and a third layer having a refractive index in a third range which does not overlap the first or second range in the order of the first layer, the second layer, the first layer, and the third layer in succession. The polarization beam splitter has transmittance of s-polarized light is 60% or more higher than the transmittance of p-polarized light in a first wavelength region and has transmittance of p-polarized light equal to or higher than 70% in a second wavelength band different from the first wavelength band. Each of the first wavelength region and the second wavelength region has a bandwidth equal to or larger than 30 nm. Alternatively, the polarization beam splitter has transmittance of s-polarized light 60% or more higher than the transmittance of p-polarized light in a first wavelength region and has transmittance of p-polarized light 60% or more higher than the transmittance of s-polarized light in a second wavelength band different from the first wavelength band. Each of the first wavelength region and the second wavelength region has a bandwidth equal to or larger than 30 nm. The multilayer film is a multilayer film formed by laminating the first layer, the second layer, the first layer, and the third layer in this order in succession five times or more (preferably ten times).

The first wavelength region and the second wavelength region are included in region of visible wavelength (400 nm or higher and 700 nm or lower). The first wavelength region includes a band of 450 nm to 480 nm and the second wavelength region includes a band of 600 nm to 630 nm.

When a layer of the first, second, and third layers with the highest refractive index is an H layer (a high refractive index layer), a layer of the three layers with the second highest refractive index is an M layer (a middle refractive index layer), and a layer of the three layers with the lowest refractive index is an L layer (a low refractive index layer), then the high refractive index layer has a refractive index of 2.0 or higher and 2.6 or lower, the middle refractive index layer has a refractive index of 1.59 or higher and 1.9 or lower, and the low refractive index layer has a refractive index of 1.25 or higher and 1.56 or lower.

When a layer of the first, second, and third layers with the highest refractive index is an H layer (a high refractive index layer), a layer of the three layers with the second highest refractive index is an M layer (a middle refractive index layer), and a layer of the three layers with the lowest refractive index is an L layer (a low refractive index layer), then the difference in the refractive index between the high refractive index layer and the middle refractive index layer is 0.35 or higher and 0.9 or lower, and the difference in the refractive index between the middle refractive index layer and the lower refractive index layer is 0.12 or higher and 0.55 or lower. The multilayer film is sandwiched between a substance made of a first material having a refractive index of 1.55 or higher and 2.10 or lower and a substance made of a second material having a refractive index of 1.40 or higher and 1.70 or lower. At least one of the first layer, the second layer, and the third layer includes two layers having refractive indexes different from each other (Example 5 shows the example in which two kinds of materials are used as the material for the middle refractive index layer and two kinds of materials are used as the material for the low refractive index layer, but naturally it is contemplated that two kinds of materials are used as materials for the high refractive index layer).

The following can be seen in Examples 1 to 7.

The first range corresponds to the highest range of refractive indexes of the first, second, and third ranges. When a layer of the first, second, and third layers with the highest refractive index is an H layer, a layer of the three layers with the second highest refractive index is an M layer, a layer of the three layers with the lowest refractive index is an L layer, the refractive indexes of the H layer, L layer, and M layer are represented as $n_H$, $n_L$, and $n_M$, a design wavelength is represented as $\lambda$, the multilayer film is formed by laminating the first H layer, the M layer, the second H layer, and the L layer in this order in succession, and the film thickness of the first H layer, the M layer, the second H layer, and the L layer are represented as $b\times\lambda/(4n_H)$, $c\times\lambda/(4n_M)$, $d\times\lambda/(4n_H)$, $a\times\lambda/(4n_L)$, then $0<a<3$, $0<b\leq1$, $0<c<5$, and $0<d\leq1$ are satisfied. More desirably, $0<b\leq a\leq c<5$, $0<d\leq a\leq c<5$ are satisfied.

The following can be seen in Examples 8 to 10.

The first range corresponds to the second highest range of refractive indexes of the first, second, and third ranges. When a layer of the first, second, and third layers with the highest refractive index is an H layer, a layer of the three layers with the second highest refractive index is an M layer, a layer of the three layers with the lowest refractive index is an L layer, the refractive indexes of the H layer, L layer, and M layer are represented as $n_H$, $n_L$, and $n_M$, a design wavelength is represented as $\lambda$, the multilayer film is formed by laminating the first M layer, the L layer, the second M layer, and the H layer in this order in succession, and the film thickness of the first M layer, the L layer, the second M layer, and the H layer are represented as $a\times\lambda/(4n_M)$, $b\times\lambda/(4n_L)$, $c\times\lambda/(4n_M)$ $d\times\lambda/(4n_H)$, then $0<a<6$, $0<c<6$, $d<b$, $0<b<5$, and $0<d<2$ are satisfied. More desirably, $0<a<3$, $0<c<6$, $d<b$, $0<b<2$, and $0<d<1$ are satisfied.

The following can be seen in Examples 11 to 13.

The first range corresponds to the lowest range of refractive indexes of the first, second, and third ranges. When a layer of the first, second, and third layers with the highest refractive index is an H layer, a layer of the three layers with the second highest refractive index is an M layer, a layer of the three layers with the lowest refractive index is an L layer, the refractive indexes of the H layer, L layer, and M layer are represented as $n_H$, $n_L$, and $n_M$, a design wavelength is represented as $\lambda$, the multilayer film is formed by laminating the first L layer, the H layer, the second L layer, and the M layer in this order in succession, and the film thickness of the first L layer, the H layer, the second L layer, and the M layer are represented as $a\times\lambda/(4n_L)$, $b\times\lambda/(4n_H)$, $c\times\lambda/(4n_L)$, $d\times\lambda/(4n_M)$, then $0<a<3$, $0<b<5$, $d<b$, $0<c<3$, and $0<d\leq1$ are satisfied. More desirably, $0<b\leq a\leq c<5$, $0<d\leq a\leq c<5$ are satisfied.

The following can be seen in Example 14 to 16. The image display apparatus described in Examples 14 to 16 includes a first image display device, a second image display device, and a color combination optical system which combines first image light emerging from the first image display device and second image light emerging from the second image display device, wherein the color combination optical system has the polarization beam splitter as described above. The image display apparatus described in Examples 14 to 16 includes a first reflection type liquid crystal display device which is provided for first color light, a second reflection type liquid crystal display device which is provided for second color light different from the first color light, an illumination optical system which illuminates the first and second reflection type liquid crystal display devices with light from a light source, and a projection optical system which projects light from the first and second reflection type liquid crystal display devices to a projected surface, wherein the illumination optical system includes the polarization beam splitter as described above, and the first color light in a first polarization state and the second color light in the first polarization state are directed to the polarization beam splitter to illuminate the first reflection type liquid crystal display device with the first color light in the first polarization state and illuminate the second reflection type liquid crystal display device with the second color light in the first polarization state, and the polarization beam splitter color-combines the first color light in a second polarization state and the second color light in the second polarization state emerging from the first reflection type liquid crystal display device and the second reflection type liquid crystal display device, respectively, to direct the combined light to the projection optical system, the second polarization state showing a polarization direction orthogonal to the first polarization state.

According to Examples as described above, it is possible to provide the polarization beam splitter which can transmits s-polarized light and reflects p-polarized light in a wavelength band and the image display apparatus which employs the polarization beam splitter.

This application claims a foreign priority based on Japanese Patent Applications Nos. 2004-232126, filed on Aug. 9, 2004 and 2005-149943, filed on May 23, 2005, and each of which is hereby incorporated by reference herein.

TABLE 1

| | EXAMPLE 1 | |
|---|---|---|
| PRISM | PBH56 | |
| H LAYER | TiO$_2$ | |
| M LAYER | Al$_2$O$_3$ | |
| L LAYER | MgF$_2$ | |
| INCIDENT ANGLE | 45° | |
| FIRST WAVELENGTH BAND | BLUE | |
| SECOND WAVELENGTH BAND | RED | |
| LAYER NUMBER | MATERIAL | FILM THICKNESS |
| 1 | L | 70.66 |
| 2 | H | 26.45 |
| 3 | M | 96.53 |
| 4 | H | 39.69 |
| 5 | L | 73.55 |
| 6 | H | 7.03 |
| 7 | M | 110.43 |
| 8 | H | 1.21 |
| 9 | L | 128.8 |
| 10 | H | 33.91 |
| 11 | M | 115.31 |
| 12 | H | 17.83 |
| 13 | L | 125.68 |
| 14 | H | 19.29 |
| 15 | M | 96.21 |
| 16 | H | 9.82 |
| 17 | L | 116.6 |
| 18 | H | 27.68 |
| 19 | M | 95.48 |
| 20 | H | 22.62 |
| 21 | L | 143 |
| 22 | H | 19.38 |
| 23 | M | 85.88 |
| 24 | H | 20.76 |
| 25 | L | 157.17 |
| 26 | H | 20.98 |
| 27 | M | 89.83 |
| 28 | H | 31.88 |
| 29 | L | 131.78 |
| 30 | H | 10.57 |
| 31 | M | 70.79 |
| 32 | H | 28.64 |
| 33 | L | 86.91 |
| 34 | H | 20.84 |
| 35 | M | 91.43 |
| 36 | H | 58.71 |
| 37 | L | 87.14 |
| 38 | H | 32.94 |
| 39 | M | 65.8 |
| 40 | H | 32.24 |

(nm)

TABLE 2

| | EXAMPLE 2 | |
|---|---|---|
| PRISM | PBH56 | |
| H LAYER | TiO$_2$ | |
| M LAYER | Al$_2$O$_3$ | |
| L LAYER | MgF$_2$ | |
| INCIDENT ANGLE | 45 ± 5° | |
| FIRST WAVELENGTH BAND | BLUE | |
| SECOND WAVELENGTH BAND | RED | |
| LAYER NUMBER | MATERIAL | FILM THICKNESS |
| 1 | M | 98.07 |
| 2 | H | 11.64 |
| 3 | L | 80.55 |
| 4 | H | 5.85 |
| 5 | M | 100.99 |
| 6 | H | 14.55 |
| 7 | L | 48.92 |
| 8 | H | 28.11 |
| 9 | M | 109.47 |
| 10 | H | 16.61 |
| 11 | L | 67.84 |
| 12 | H | 14.17 |
| 13 | M | 98.6 |
| 14 | H | 9.33 |
| 15 | L | 74.44 |
| 16 | H | 15.36 |
| 17 | M | 108.53 |
| 18 | H | 30.6 |
| 19 | L | 55.04 |
| 20 | H | 4.51 |
| 21 | M | 105.02 |
| 22 | H | 2.65 |
| 23 | L | 108.13 |
| 24 | H | 7.73 |
| 25 | M | 104.17 |
| 26 | H | 9.78 |
| 27 | L | 50.06 |
| 28 | H | 25.43 |
| 29 | M | 104.79 |
| 30 | H | 20.09 |
| 31 | L | 55.13 |
| 32 | H | 11.74 |
| 33 | M | 102.06 |
| 34 | H | 17.78 |
| 35 | L | 54.17 |
| 36 | H | 20.42 |
| 37 | M | 105.54 |
| 38 | H | 15.36 |
| 39 | L | 69.55 |
| 40 | H | 18.18 |
| 41 | M | 100.25 |
| 42 | H | 16.38 |
| 43 | L | 76.31 |
| 44 | H | 16.06 |
| 45 | M | 103.82 |
| 46 | H | 24.53 |
| 47 | L | 52.1 |

TABLE 2-continued

| | | |
|---|---|---|
| 48 | H | 20.46 |
| 49 | M | 107.1 |
| 50 | H | 23.22 |
| 51 | L | 70.99 |
| 52 | H | 18.85 |
| 53 | M | 106.31 |
| 54 | H | 32.23 |
| 55 | L | 36.82 |
| 56 | H | 23.06 |
| 57 | M | 121.08 |
| 58 | H | 12.66 |
| 59 | L | 54.6 |
| 60 | H | 28.3 |
| 61 | M | 116.73 |
| 62 | H | 11.37 |
| 63 | L | 90.5 |
| 64 | H | 12.24 |
| 65 | M | 102.92 |
| 66 | H | 21.19 |
| 67 | L | 84.77 |
| 68 | H | 9.42 |
| 69 | M | 120.63 |
| 70 | H | 17.9 |
| 71 | L | 1.63 |
| 72 | H | 56.71 |
| 73 | M | 103.1 |
| 74 | H | 14.82 |
| 75 | L | 71.49 |
| 76 | H | 49.23 |
| 77 | M | 64.31 |
| 78 | H | 23.35 |
| 79 | L | 65.22 |
| 80 | H | 42.83 |
| 81 | M | 46.85 |
| 82 | H | 37.6 |
| 83 | L | 88.62 |
| 84 | H | 48.53 |
| 85 | M | 37.15 |
| 86 | H | 50.67 |
| 87 | L | 79.89 |
| 88 | H | 49.65 |
| 89 | M | 41.91 |
| 90 | H | 44.33 |
| 91 | L | 80.53 |
| 92 | H | 14.17 |
| 93 | M | 55.12 |
| 94 | H | 42.29 |
| 95 | L | 73.09 |
| 96 | H | 41.35 |
| 97 | M | 51.74 |
| 98 | H | 47.16 |
| 99 | L | 69.62 |
| 100 | H | 45.99 |
| 101 | M | 56.16 |
| 102 | H | 31.5 |
| 103 | L | 48.4 |

(nm)

TABLE 3

| | THIRD MULTILAYER FILM |
|---|---|
| PRISM | PBH56 |
| H LAYER | TiO$_2$ |
| M LAYER | Al$_2$O$_3$ |
| L LAYER | SiO$_2$ |
| INCIDENT ANGLE | 45 ± 10° |
| FIRST WAVELENGTH BAND | BLUE |
| SECOND WAVELENGTH BAND | RED |

| LAYER NUMBER | MATERIAL | FILM THICKNESS |
|---|---|---|
| 1 | M | 39.79 |
| 2 | H | 137.11 |
| 3 | M | 50.47 |

TABLE 3-continued

| | | |
|---|---|---|
| 4 | H | 163.41 |
| 5 | M | 29.44 |
| 6 | H | 162.36 |
| 7 | M | 62.55 |
| 8 | H | 138.98 |
| 9 | M | 57.83 |
| 10 | H | 365.65 |
| 11 | L | 39.41 |
| 12 | H | 137.1 |
| 13 | L | 48.67 |
| 14 | H | 127.82 |
| 15 | L | 53.72 |
| 16 | H | 127.79 |
| 17 | L | 57.95 |
| 18 | H | 128.6 |
| 19 | L | 56.91 |
| 20 | H | 128.85 |
| 21 | L | 33.15 |
| 22 | H | 126.05 |
| 23 | L | 48.29 |
| 24 | H | 124.59 |

(nm)

TABLE 4

| | EXAMPLE 3 |
|---|---|
| PRISM | PBH56 |
| H LAYER | TiO$_2$ |
| M LAYER | Al$_2$O$_3$ |
| L1 LAYER | MgF$_2$ |
| L2 LAYER | SiO$_2$ |
| INCIDENT ANGLE | 45 ± 5° |
| FIRST WAVELENGTH BAND | BLUE |
| SECOND WAVELENGTH BAND | RED |

| LAYER NUMBER | MATERIAL | FILM THICKNESS |
|---|---|---|
| 1 | M | 95.72 |
| 2 | H | 21.2 |
| 3 | L1 | 62.77 |
| 4 | H | 26.6 |
| 5 | M | 79.45 |
| 6 | H | 10.56 |
| 7 | L1 | 87.12 |
| 8 | H | 19.03 |
| 9 | M | 93.14 |
| 10 | H | 30.93 |
| 11 | L1 | 45.95 |
| 12 | H | 9.14 |
| 13 | M | 103.78 |
| 14 | H | 14.36 |
| 15 | L1 | 52.26 |
| 16 | H | 24.53 |
| 17 | M | 99.8 |
| 18 | H | 11.97 |
| 19 | L1 | 73.22 |
| 20 | H | 9.9 |
| 21 | M | 93.84 |
| 22 | H | 20.71 |
| 23 | L1 | 71.91 |
| 24 | H | 9.55 |
| 25 | M | 107.98 |
| 26 | H | 3.17 |
| 27 | L1 | 51.1 |
| 28 | H | 32.97 |
| 29 | M | 107.51 |
| 30 | H | 12.8 |
| 31 | L1 | 73.03 |
| 32 | H | 5.92 |
| 33 | M | 99.1 |
| 34 | H | 28.56 |
| 35 | L1 | 48.68 |

TABLE 4-continued

| | | |
|---|---|---|
| 36 | H | 13.04 |
| 37 | M | 101.81 |
| 38 | H | 15.92 |
| 39 | L1 | 50.99 |
| 40 | H | 30.02 |
| 41 | M | 90.86 |
| 42 | H | 9.74 |
| 43 | L1 | 91.99 |
| 44 | H | 21.79 |
| 45 | M | 80.73 |
| 46 | H | 34.34 |
| 47 | L1 | 54.24 |
| 48 | H | 10.1 |
| 49 | M | 83.88 |
| 50 | H | 38.12 |
| 51 | L1 | 44.81 |
| 52 | H | 26.51 |
| 53 | M | 83.11 |
| 54 | H | 16.34 |
| 55 | L1 | 39.09 |
| 56 | H | 39.93 |
| 57 | M | 81.79 |
| 58 | H | 27.12 |
| 59 | L1 | 73.79 |
| 60 | H | 47.11 |
| 61 | M | 46.85 |
| 62 | H | 28.07 |
| 63 | L1 | 82.24 |
| 64 | H | 18.84 |
| 65 | M | 90.41 |
| 66 | H | 38.12 |
| 67 | L1 | 59.81 |
| 68 | H | 20.12 |
| 69 | M | 100.14 |
| 70 | H | 18.8 |
| 71 | L1 | 54.9 |
| 72 | H | 17.95 |
| 73 | M | 93.01 |
| 74 | H | 21.93 |
| 75 | L1 | 43.01 |
| 76 | H | 26.72 |
| 77 | M | 105.85 |
| 78 | H | 20.88 |
| 79 | L1 | 62.24 |
| 80 | H | 26.02 |
| 81 | M | 107.91 |
| 82 | H | 17.52 |
| 83 | L1 | 68.35 |
| 84 | H | 31.1 |
| 85 | M | 94.76 |
| 86 | H | 21.48 |
| 87 | L1 | 98.77 |
| 88 | H | 25.2 |
| 89 | M | 94.58 |
| 90 | H | 27.23 |
| 91 | L1 | 75.84 |
| 92 | H | 18.07 |
| 93 | M | 100.88 |
| 94 | H | 25.12 |
| 95 | L1 | 72.97 |
| 96 | H | 26.13 |
| 97 | M | 99.09 |
| 98 | H | 40.53 |
| 99 | L1 | 55.37 |
| 100 | H | 46.62 |
| 101 | M | 67.83 |
| 102 | H | 37.05 |
| 103 | L1 | 63.28 |
| 104 | H | 31.12 |
| 105 | M | 81.84 |
| 106 | H | 24 |
| 107 | L1 | 87.2 |
| 108 | H | 27.49 |
| 109 | M | 78.02 |
| 110 | H | 46.82 |
| 111 | L1 | 60.23 |

TABLE 4-continued

| | | |
|---|---|---|
| 112 | H | 32.86 |
| 113 | M | 103.68 |
| 114 | H | 16.61 |
| 115 | L1 | 61.09 |
| 116 | H | 15.29 |
| 117 | M | 85.42 |
| 118 | H | 43.7 |
| 119 | L1 | 61.71 |
| 120 | H | 25.78 |
| 121 | M | 94.14 |
| 122 | H | 168.76 |
| 123 | M | 21.53 |
| 124 | H | 172.12 |
| 125 | M | 31.43 |
| 126 | H | 163.63 |
| 127 | M | 40.79 |
| 128 | H | 153.42 |
| 129 | M | 38.44 |
| 130 | H | 372.55 |
| 131 | L2 | 43.49 |
| 132 | H | 139.26 |
| 133 | L2 | 61.03 |
| 134 | H | 127.68 |
| 135 | L2 | 39.58 |
| 136 | H | 127.58 |
| 137 | L2 | 57.39 |
| 138 | H | 133.41 |
| 139 | L2 | 36.21 |
| 140 | H | 117.8 |
| 141 | L2 | 43.05 |
| 142 | H | 133.93 |
| 143 | L2 | 76.22 |
| 144 | H | 122.91 |

(nm)

TABLE 5

| | EXAMPLE 4 |
|---|---|
| PRISM | PBH56 |
| H LAYER | $TiO_2$ |
| M1 LAYER | $Y_2O_3$ |
| M2 LAYER | $Al_2O_3$ |
| L1 LAYER | $MgF_2$ |
| L2 LAYER | $SiO_2$ |
| INCIDENT ANGLE | 45 ± 5° |
| FIRST WAVELENGTH BAND | BLUE |
| SECOND WAVELENGTH BAND | RED |

| LAYER NUMBER | MATERIAL | FILM THICKNESS |
|---|---|---|
| 1 | M1 | 138.67 |
| 2 | H | 29.45 |
| 3 | L1 | 31.1 |
| 4 | H | 62.73 |
| 5 | M1 | 132.91 |
| 6 | H | 21.02 |
| 7 | L1 | 79.15 |
| 8 | H | 47.17 |
| 9 | M1 | 123.51 |
| 10 | H | 34.82 |
| 11 | L1 | 79.34 |
| 12 | H | 32.88 |
| 13 | M1 | 113.61 |
| 14 | H | 38.44 |
| 15 | L1 | 38.34 |
| 16 | H | 44.42 |
| 17 | M1 | 105.2 |
| 18 | H | 33.66 |
| 19 | L1 | 80.92 |
| 20 | H | 42.69 |

TABLE 5-continued

| | | |
|---|---|---|
| 21 | M1 | 118.74 |
| 22 | H | 45.28 |
| 23 | L1 | 85.81 |
| 24 | H | 39.39 |
| 25 | M1 | 144.29 |
| 26 | H | 36.17 |
| 27 | L1 | 81.29 |
| 28 | H | 42.2 |
| 29 | M1 | 110.12 |
| 30 | H | 45.44 |
| 31 | L1 | 52.31 |
| 32 | H | 35.14 |
| 33 | M1 | 115.93 |
| 34 | H | 28.22 |
| 35 | L1 | 71.22 |
| 36 | H | 41.31 |
| 37 | M1 | 127.07 |
| 38 | H | 32.4 |
| 39 | L1 | 107.43 |
| 40 | H | 26.79 |
| 41 | M1 | 121.88 |
| 42 | H | 49.61 |
| 43 | L1 | 58.96 |
| 44 | H | 14.11 |
| 45 | M1 | 115.79 |
| 46 | H | 36.59 |
| 47 | L1 | 29.26 |
| 48 | H | 38.42 |
| 49 | M1 | 116.1 |
| 50 | H | 25.18 |
| 51 | L1 | 41.5 |
| 52 | H | 42.76 |
| 53 | M1 | 109.37 |
| 54 | H | 29.38 |
| 55 | L1 | 50.48 |
| 56 | H | 38.39 |
| 57 | M1 | 111.92 |
| 58 | H | 30.38 |
| 59 | L1 | 59.49 |
| 60 | H | 37.26 |
| 61 | M1 | 111.76 |
| 62 | H | 30.11 |
| 63 | L1 | 63.99 |
| 64 | H | 32.79 |
| 65 | M1 | 124.32 |
| 66 | H | 36.16 |
| 67 | L1 | 85.18 |
| 68 | H | 22.74 |
| 69 | M1 | 127.93 |
| 70 | H | 45.35 |
| 71 | L1 | 47.82 |
| 72 | H | 18.79 |
| 73 | M1 | 116.23 |
| 74 | H | 31.03 |
| 75 | L1 | 22.01 |
| 76 | H | 45.72 |
| 77 | M1 | 112.02 |
| 78 | H | 23.51 |
| 79 | L1 | 59.64 |
| 80 | H | 45.38 |
| 81 | M1 | 97.14 |
| 82 | H | 36.48 |
| 83 | L1 | 45.51 |
| 84 | H | 37.73 |
| 85 | M1 | 87.38 |
| 86 | H | 45.52 |
| 87 | L1 | 47.24 |
| 88 | H | 40.79 |
| 89 | M1 | 77.98 |
| 90 | H | 45.89 |
| 91 | L1 | 42.53 |
| 92 | H | 41.74 |
| 93 | M1 | 78.21 |
| 94 | H | 44.49 |
| 95 | L1 | 34.47 |
| 96 | H | 43.9 |
| 97 | M1 | 74.47 |
| 98 | H | 44.66 |
| 99 | L1 | 40.2 |

TABLE 5-continued

| | | |
|---|---|---|
| 100 | H | 48.08 |
| 101 | M1 | 72.37 |
| 102 | H | 40.04 |
| 103 | L1 | 33.08 |
| 104 | H | 49.27 |
| 105 | M1 | 72.49 |
| 106 | H | 45.87 |
| 107 | L1 | 29.24 |
| 108 | H | 42.25 |
| 109 | M1 | 68.74 |
| 110 | H | 42.65 |
| 111 | L1 | 32.47 |
| 112 | H | 45.24 |
| 113 | M1 | 85.83 |
| 114 | H | 48.08 |
| 115 | L1 | 24.74 |
| 116 | H | 46.06 |
| 117 | M1 | 68.4 |
| 118 | H | 51.7 |
| 119 | L1 | 42.37 |
| 120 | H | 41.93 |
| 121 | M1 | 63.55 |
| 122 | H | 51.51 |
| 123 | L1 | 39.87 |
| 124 | H | 48.2 |
| 125 | M1 | 63.29 |
| 126 | H | 49.85 |
| 127 | L1 | 35.9 |
| 128 | H | 48.51 |
| 129 | M1 | 69.12 |
| 130 | H | 44.84 |
| 131 | L1 | 32.59 |
| 132 | H | 51.44 |
| 133 | M1 | 73.5 |
| 134 | H | 28.75 |
| 135 | L1 | 30.42 |
| 136 | H | 57.35 |
| 137 | M1 | 84.55 |
| 138 | H | 39.45 |
| 139 | L1 | 70.57 |
| 140 | H | 16.82 |
| 141 | M2 | 149.23 |
| 142 | H | 171.82 |
| 143 | M2 | 162.87 |
| 144 | H | 182.74 |
| 145 | M2 | 94.18 |
| 146 | H | 222.84 |
| 147 | M2 | 37.9 |
| 148 | H | 234.52 |
| 149 | M2 | 28.03 |
| 150 | H | 212.88 |

TABLE 6

| LAYER NUMBER | MATERIAL | FILM THICKNESS |
|---|---|---|
| 151 | L2 | 12.1 |
| 152 | H | 275.76 |
| 153 | L2 | 3.4 |
| 154 | H | 178.35 |
| 155 | L2 | 6.96 |
| 156 | H | 221.72 |
| 157 | L2 | 24.71 |
| 158 | H | 168.82 |
| 159 | L2 | 22.04 |
| 160 | H | 209.66 |
| 161 | L2 | 41.7 |
| 162 | H | 170.96 |
| 163 | L2 | 40.29 |
| 164 | H | 180.44 |

(nm)

TABLE 7

| | EXAMPLE 5 |
|---|---|
| PRISM | PBH56 |
| H LAYER | $TiO_2$ |
| M LAYER | $Y_2O_3$ |
| L LAYER | $SiO_2$ |
| INCIDENT ANGLE | 45 ± 5° |
| FIRST WAVELENGTH BAND | BLUE |
| SECOND WAVELENGTH BAND | RED |

| LAYER NUMBER | MATERIAL | FILM THICKNESS |
|---|---|---|
| 1 | M | 87.02 |
| 2 | H | 17.18 |
| 3 | L | 45.98 |
| 4 | H | 15.11 |
| 5 | M | 77.14 |
| 6 | H | 14.3 |
| 7 | L | 41 |
| 8 | H | 21.58 |
| 9 | M | 82.78 |
| 10 | H | 17.14 |
| 11 | L | 39.87 |
| 12 | H | 18.59 |
| 13 | M | 83.95 |
| 14 | H | 19.26 |
| 15 | L | 34.27 |
| 16 | H | 19.15 |
| 17 | M | 83.9 |
| 18 | H | 18.65 |
| 19 | L | 40.42 |
| 20 | H | 17.32 |
| 21 | M | 84.15 |
| 22 | H | 20.5 |
| 23 | L | 38.52 |
| 24 | H | 16.83 |
| 25 | M | 83.15 |
| 26 | H | 17.84 |
| 27 | L | 38.28 |
| 28 | H | 19.04 |
| 29 | M | 81.85 |
| 30 | H | 16.3 |
| 31 | L | 40.71 |
| 32 | H | 18.65 |
| 33 | M | 81.48 |
| 34 | H | 17.17 |
| 35 | L | 42.89 |
| 36 | H | 16.28 |
| 37 | M | 79.37 |
| 38 | H | 19.56 |
| 39 | L | 32.32 |
| 40 | H | 17.35 |
| 41 | M | 79.25 |
| 42 | H | 14.65 |
| 43 | L | 36.21 |
| 44 | H | 21.25 |
| 45 | M | 82.58 |
| 46 | H | 15.97 |
| 47 | L | 43.6 |
| 48 | H | 17.3 |
| 49 | M | 83.78 |
| 50 | H | 20.34 |
| 51 | L | 36.73 |
| 52 | H | 16.98 |
| 53 | M | 83 |
| 54 | H | 20.1 |
| 55 | L | 37.82 |
| 56 | H | 17.53 |
| 57 | M | 82.41 |
| 58 | H | 20.2 |
| 59 | L | 36.37 |
| 60 | H | 19.47 |
| 61 | M | 83.33 |

TABLE 7-continued

| 62 | H | 16.93 |
|---|---|---|
| 63 | L | 44.27 |
| 64 | H | 20.52 |
| 65 | M | 84.53 |
| 66 | H | 18.67 |
| 67 | L | 44.2 |
| 68 | H | 19.53 |
| 69 | M | 85.62 |
| 70 | H | 22.78 |
| 71 | L | 38.11 |
| 72 | H | 21.38 |
| 73 | M | 87.96 |
| 74 | H | 21.66 |
| 75 | L | 46.46 |
| 76 | H | 22.63 |
| 77 | M | 88.31 |
| 78 | H | 22.13 |
| 79 | L | 46.15 |
| 80 | H | 20.41 |
| 81 | M | 86.25 |
| 82 | H | 23.83 |
| 83 | L | 35.19 |
| 84 | H | 19.96 |
| 85 | M | 84.76 |
| 86 | H | 17.94 |
| 87 | L | 40.89 |
| 88 | H | 20.76 |
| 89 | M | 84.53 |
| 90 | H | 18.96 |
| 91 | L | 40.66 |
| 92 | H | 18.7 |
| 93 | M | 84.9 |
| 94 | H | 18.89 |
| 95 | L | 37.01 |
| 96 | H | 20.86 |
| 97 | M | 84.25 |
| 98 | H | 17.13 |
| 99 | L | 47.46 |
| 100 | H | 18.57 |
| 101 | M | 85.48 |
| 102 | H | 23.74 |
| 103 | L | 42.12 |
| 104 | H | 18.93 |
| 105 | M | 87.32 |
| 106 | H | 25.12 |
| 107 | L | 38.11 |
| 108 | H | 24.57 |
| 109 | M | 85.54 |
| 110 | H | 22.99 |
| 111 | L | 40.62 |
| 112 | H | 23.99 |
| 113 | M | 83.84 |
| 114 | H | 23.59 |
| 115 | L | 36.6 |
| 116 | H | 22.69 |
| 117 | M | 84.68 |
| 118 | H | 21.22 |
| 119 | L | 39.38 |
| 120 | H | 23.23 |
| 121 | M | 85.26 |
| 122 | H | 18.64 |
| 123 | L | 47.9 |
| 124 | H | 21.46 |
| 125 | M | 86.26 |
| 126 | H | 20.94 |
| 127 | L | 43.2 |
| 128 | H | 21.4 |
| 129 | M | 91.61 |
| 130 | H | 20.65 |
| 131 | L | 50.97 |
| 132 | H | 24.62 |
| 133 | M | 98.37 |
| 134 | H | 21.62 |
| 135 | L | 62.81 |
| 136 | H | 21.84 |
| 137 | M | 93.53 |

TABLE 7-continued

| | | |
|---|---|---|
| 138 | H | 20.87 |
| 139 | L | 56.71 |
| 140 | H | 18.15 |
| 141 | M | 95.49 |
| 142 | H | 26.42 |
| 143 | L | 52.68 |
| 144 | H | 14.93 |
| 145 | M | 102.02 |
| 146 | H | 25.41 |
| 147 | L | 49.44 |
| 148 | H | 19.71 |
| 149 | M | 98.48 |
| 150 | H | 27.04 |

TABLE 8

| LAYER NUMBER | MATERIAL | FILM THICKNESS |
|---|---|---|
| 151 | L | 34.99 |
| 152 | H | 19.71 |
| 153 | M | 92.62 |
| 154 | H | 28.33 |
| 155 | L | 33.06 |
| 156 | H | 17.28 |
| 157 | M | 91.61 |
| 158 | H | 13.1 |
| 159 | L | 47.09 |
| 160 | H | 26.06 |
| 161 | M | 93.63 |
| 162 | H | 16.97 |
| 163 | L | 48.68 |
| 164 | H | 23.74 |
| 165 | M | 107.93 |
| 166 | H | 18.57 |
| 167 | L | 50.6 |
| 168 | H | 29.7 |
| 169 | M | 93.28 |
| 170 | H | 12.76 |
| 171 | L | 83.45 |
| 172 | H | 27 |
| 173 | M | 81.39 |
| 174 | H | 27.43 |
| 175 | L | 76.99 |
| 176 | H | 39.35 |
| 177 | M | 59.7 |
| 178 | H | 29.79 |
| 179 | L | 93.3 |
| 180 | H | 32.38 |
| 181 | M | 63 |
| 182 | H | 35.49 |
| 183 | L | 97.06 |
| 184 | H | 41.83 |
| 185 | M | 39.85 |
| 186 | H | 46.93 |
| 187 | L | 91.07 |
| 188 | H | 33.42 |
| 189 | M | 47.32 |
| 190 | H | 38.37 |
| 191 | L | 68.79 |
| 192 | H | 13.86 |
| 193 | M | 76.19 |
| 194 | H | 55.39 |
| 195 | L | 46.14 |
| 196 | H | 8.98 |
| 197 | M | 80.98 |
| 198 | H | 112.43 |
| 199 | L | 31.7 |
| 200 | H | 78.78 |
| 201 | M | 64.72 |
| 202 | H | 9.84 |
| 203 | L | 78.22 |

(nm)

TABLE 9

| | EXAMPLE 6 |
|---|---|
| PRISM | S-LAL14 |
| H LAYER | $TiO_2$ |
| M LAYER | $Al_2O_3$ |
| L LAYER | $MgF_2$ |
| INCIDENT ANGLE | 45 ± 5° |
| FIRST WAVELENGTH BAND | BLUE |
| SECOND WAVELENGTH BAND | RED |

| LAYER NUMBER | MATERIAL | FILM THICKNESS |
|---|---|---|
| 1 | M | 108.34 |
| 2 | H | 14.14 |
| 3 | L | 63.85 |
| 4 | H | 21.6 |
| 5 | M | 108.06 |
| 6 | H | 20.12 |
| 7 | L | 61.29 |
| 8 | H | 16.84 |
| 9 | M | 101.81 |
| 10 | H | 16.54 |
| 11 | L | 63.38 |
| 12 | H | 18.71 |
| 13 | M | 101.28 |
| 14 | H | 21.98 |
| 15 | L | 52.64 |
| 18 | H | 18.72 |
| 17 | M | 100.53 |
| 18 | H | 19.05 |
| 19 | L | 55.95 |
| 20 | H | 21.35 |
| 21 | M | 97.75 |
| 22 | H | 18.08 |
| 23 | L | 60.53 |
| 24 | H | 19.24 |
| 25 | M | 96.12 |
| 26 | H | 21.07 |
| 27 | L | 56.12 |
| 28 | H | 19.03 |
| 29 | M | 95.37 |
| 30 | H | 21.58 |
| 31 | L | 51.69 |
| 32 | H | 20.23 |
| 33 | M | 98.14 |
| 34 | H | 19.83 |
| 35 | L | 57.85 |
| 36 | H | 21.66 |
| 37 | M | 101.62 |
| 38 | H | 23 |
| 39 | L | 58.61 |
| 40 | H | 20.5 |
| 41 | M | 98.8 |
| 42 | H | 23.88 |
| 43 | L | 49.75 |
| 44 | H | 21.87 |
| 45 | M | 93.46 |
| 46 | H | 22.38 |
| 47 | L | 48.2 |
| 48 | H | 23.33 |
| 49 | M | 92.11 |
| 50 | H | 21.29 |
| 51 | L | 51.97 |
| 52 | H | 23.17 |
| 53 | M | 93.05 |
| 54 | H | 20.72 |
| 55 | L | 52.87 |
| 56 | H | 22.34 |
| 57 | M | 94.96 |
| 58 | H | 18.83 |
| 59 | L | 56.11 |
| 60 | H | 20.87 |
| 61 | M | 99.18 |
| 62 | H | 15.73 |
| 63 | L | 65.61 |
| 64 | H | 17.43 |

TABLE 9-continued

| | | |
|---|---|---|
| 65 | M | 102.5 |
| 66 | H | 16.23 |
| 67 | L | 63.02 |
| 68 | H | 14.74 |
| 69 | M | 103.74 |
| 70 | H | 15.28 |
| 71 | L | 56.8 |
| 72 | H | 6.75 |
| 73 | M | 93.53 |
| 74 | H | 8.55 |
| 75 | L | 46.03 |
| 76 | H | 11.57 |
| 77 | M | 101.12 |
| 78 | H | 11.41 |
| 79 | L | 52.74 |
| 80 | H | 21.04 |
| 81 | M | 100.74 |
| 82 | H | 16.13 |
| 83 | L | 69 |
| 84 | H | 19.4 |
| 85 | M | 102.54 |
| 86 | H | 16.33 |
| 87 | L | 68.92 |
| 88 | H | 16.84 |
| 89 | M | 98.8 |
| 90 | H | 17.74 |
| 91 | L | 63.22 |
| 92 | H | 15.32 |
| 93 | M | 94.7 |
| 94 | H | 19.55 |
| 95 | L | 58.41 |
| 96 | H | 15.45 |
| 97 | M | 91.16 |
| 98 | H | 22.5 |
| 99 | L | 42.38 |
| 100 | H | 17.81 |
| 101 | M | 89.91 |
| 102 | H | 15.61 |
| 103 | L | 42.13 |
| 104 | H | 17.95 |
| 105 | M | 92.54 |
| 106 | H | 10.24 |
| 107 | L | 58.92 |
| 108 | H | 10.63 |
| 109 | M | 98.95 |
| 110 | H | 15.51 |
| 111 | L | 50.37 |
| 112 | H | 17.17 |
| 113 | M | 100.05 |
| 114 | H | 12.2 |
| 115 | L | 71.41 |
| 116 | H | 11.17 |
| 117 | M | 101.35 |
| 118 | H | 26.24 |
| 119 | L | 46.29 |
| 120 | H | 21.24 |
| 121 | M | 95.49 |
| 122 | H | 25.82 |
| 123 | L | 47.87 |
| 124 | H | 24.08 |
| 125 | M | 93.99 |
| 126 | H | 18.18 |
| 127 | L | 58.03 |
| 128 | H | 15.7 |
| 129 | M | 92.77 |
| 130 | H | 21.1 |
| 131 | L | 41.38 |
| 132 | H | 15.54 |
| 133 | M | 92.02 |
| 134 | H | 4.7 |
| 135 | L | 61.15 |
| 136 | H | 10.36 |
| 137 | M | 98.48 |
| 138 | H | 15.28 |
| 139 | L | 49.76 |
| 140 | H | 15.52 |
| 141 | M | 96.97 |
| 142 | H | 18.06 |
| 143 | L | 54.14 |
| 144 | H | 15.32 |
| 145 | M | 93.16 |
| 146 | H | 18.36 |
| 147 | L | 50.59 |
| 148 | H | 16.52 |
| 149 | M | 90.71 |
| 150 | H | 18.05 |

TABLE 10

| LAYER NUMBER | MATERIAL | FILM THICKNESS |
|---|---|---|
| 151 | L | 42.69 |
| 152 | H | 16.82 |
| 153 | M | 87.5 |
| 154 | H | 8.74 |
| 155 | L | 52.31 |
| 156 | H | 10.83 |
| 157 | M | 91.18 |
| 158 | H | 14.43 |
| 159 | L | 49.95 |
| 160 | H | 14.31 |
| 161 | M | 92 |
| 162 | H | 18.91 |
| 163 | L | 53.05 |
| 164 | H | 14.19 |
| 165 | M | 88.16 |
| 166 | H | 17.49 |
| 167 | L | 47.36 |
| 168 | H | 17.75 |
| 169 | M | 88.56 |
| 170 | H | 13.51 |
| 171 | L | 41.98 |
| 172 | H | 19.8 |
| 173 | M | 93.58 |
| 174 | H | 6.76 |
| 175 | L | 67.27 |
| 176 | H | 7.23 |
| 177 | M | 97.27 |
| 178 | H | 20.96 |
| 179 | L | 29.23 |
| 180 | H | 19.42 |
| 181 | M | 92.41 |
| 182 | H | 17.65 |
| 183 | L | 59.87 |
| 184 | H | 14.67 |
| 185 | M | 89.89 |
| 186 | H | 20.22 |
| 187 | L | 40.78 |
| 188 | H | 20.95 |
| 189 | M | 93.21 |
| 190 | H | 10.31 |
| 191 | L | 56.86 |
| 192 | H | 21.76 |
| 193 | M | 94.54 |
| 194 | H | 7.96 |
| 195 | L | 60.39 |
| 196 | H | 0.75 |
| 197 | M | 85.58 |
| 198 | H | 14.24 |
| 199 | L | 20.74 |
| 200 | H | 30.65 |
| 201 | M | 81.09 |
| 202 | H | 6.72 |
| 203 | L | 79.95 |
| 204 | H | 22.06 |
| 205 | M | 84.62 |
| 206 | H | 22.29 |
| 207 | L | 111.33 |
| 208 | H | 42.05 |
| 209 | M | 50.04 |
| 210 | H | 33.07 |
| 211 | L | 108.85 |
| 212 | H | 31.63 |
| 213 | M | 74.7 |

TABLE 10-continued

| LAYER NUMBER | MATERIAL | FILM THICKNESS |
|---|---|---|
| 214 | H | 20.93 |
| 215 | L | 107.94 |
| 216 | H | 21.61 |
| 217 | M | 66.96 |
| 218 | H | 33.38 |
| 219 | L | 103.68 |
| 220 | H | 24.5 |
| 221 | M | 68.85 |
| 222 | H | 38.65 |
| 223 | L | 105.43 |
| 224 | H | 23.6 |
| 225 | M | 71.92 |
| 226 | H | 39.41 |
| 227 | L | 91.2 |
| 228 | H | 19.06 |
| 229 | M | 84.75 |
| 230 | H | 32.62 |
| 231 | L | 53.42 |
| 232 | H | 11.05 |

(nm)

TABLE 11

| | EXAMPLE 7 |
|---|---|
| PRISM | PBH56 |
| H1 LAYER | TiO$_2$ |
| H2 LAYER | Ta$_2$O$_5$ |
| M LAYER | Al$_2$O$_3$ |
| L LAYER | MgF$_2$ |
| INCIDENT ANGLE | 45 ± 5° |
| FIRST WAVELENGTH BAND | BLUE |
| SECOND WAVELENGTH BAND | RED |

| LAYER NUMBER | METERIAL | FILM THICKNESS |
|---|---|---|
| 1 | M | 74.39 |
| 2 | H1 | 16.73 |
| 3 | L | 78.47 |
| 4 | H2 | 13.27 |
| 5 | M | 77.31 |
| 6 | H1 | 7.82 |
| 7 | L | 83.94 |
| 8 | H2 | 26.79 |
| 9 | M | 106.12 |
| 10 | H1 | 26.56 |
| 11 | L | 35.88 |
| 12 | H2 | 15.47 |
| 13 | M | 101.53 |
| 14 | H1 | 10.88 |
| 15 | L | 83.23 |
| 16 | H2 | 22.75 |
| 17 | M | 97.8 |
| 18 | H1 | 40.98 |
| 19 | L | 40.66 |
| 20 | H2 | 49.77 |
| 21 | M | 123.92 |
| 22 | H1 | 25.53 |
| 23 | L | 65.93 |
| 24 | H2 | 28.1 |
| 25 | M | 96.77 |
| 26 | H1 | 5.08 |
| 27 | L | 66.07 |
| 28 | H2 | 28.76 |
| 29 | M | 104.64 |
| 30 | H1 | 29.44 |
| 31 | L | 55.47 |

TABLE 11-continued

| 32 | H2 | 13.52 |
|---|---|---|
| 33 | M | 93.35 |
| 34 | H1 | 7.18 |
| 35 | L | 95.98 |
| 36 | H2 | 21.68 |
| 37 | M | 98.09 |
| 38 | H1 | 38.47 |
| 39 | L | 13.68 |
| 40 | H2 | 14.76 |
| 41 | M | 93.82 |
| 42 | H1 | 10.89 |
| 43 | L | 113.53 |
| 44 | H2 | 1.26 |
| 45 | M | 95.61 |
| 46 | H1 | 4.25 |
| 47 | L | 96.78 |
| 48 | H2 | 27.41 |
| 49 | M | 102.01 |
| 50 | H1 | 33.17 |
| 51 | L | 36.35 |
| 52 | H2 | 13.15 |
| 53 | M | 105.69 |
| 54 | H1 | 8.88 |
| 55 | L | 90.82 |
| 56 | H2 | 18.7 |
| 57 | M | 101.75 |
| 58 | H1 | 19.07 |
| 59 | L | 52.79 |
| 60 | H2 | 27.1 |
| 61 | M | 88.26 |
| 62 | H1 | 19.25 |
| 63 | L | 50.96 |
| 64 | H2 | 25.38 |
| 65 | M | 95.49 |
| 66 | H1 | 23.76 |
| 67 | L | 40.19 |
| 68 | H2 | 39.28 |
| 69 | M | 93.55 |
| 70 | H1 | 14.06 |
| 71 | L | 58.44 |
| 72 | H2 | 29.45 |
| 73 | M | 83.38 |
| 74 | H1 | 22.92 |
| 75 | L | 77.55 |
| 76 | H2 | 22.73 |
| 77 | M | 108.85 |
| 78 | H1 | 32.3 |
| 79 | L | 34.18 |
| 80 | H2 | 34.46 |
| 81 | M | 96.29 |
| 82 | H1 | 11.53 |
| 83 | L | 91.15 |
| 84 | H2 | 35.16 |
| 85 | M | 78.64 |
| 86 | H1 | 26.62 |
| 87 | L | 44.91 |
| 88 | H2 | 19.78 |
| 89 | M | 82.65 |
| 90 | H1 | 35.83 |
| 91 | L | 57.71 |
| 92 | H2 | 24.4 |
| 93 | M | 132.55 |
| 94 | H1 | 56.4 |
| 95 | L | 19.1 |
| 96 | H2 | 17.99 |
| 97 | M | 120.88 |
| 98 | H1 | 0.11 |
| 99 | L | 112.29 |
| 100 | H2 | 20.63 |
| 101 | M | 91.97 |
| 102 | H1 | 21.5 |
| 103 | L | 64.88 |
| 104 | H2 | 18.51 |
| 105 | M | 104.7 |
| 106 | H1 | 41.38 |
| 107 | L | 31.26 |

TABLE 11-continued

| | | |
|---|---|---|
| 108 | H2 | 30.6 |
| 109 | M | 102.1 |
| 110 | H1 | 23.38 |
| 111 | L | 34.16 |
| 112 | H2 | 46.31 |
| 113 | M | 87.92 |
| 114 | H1 | 13.25 |
| 115 | L | 49.1 |
| 116 | H2 | 63.21 |
| 117 | M | 63.29 |
| 118 | H1 | 25.86 |
| 119 | L | 66.82 |
| 120 | H2 | 53.73 |
| 121 | M | 55.52 |
| 122 | H1 | 28.35 |
| 123 | L | 69.03 |
| 124 | H2 | 58.62 |
| 125 | M | 61.18 |
| 126 | H1 | 35.11 |
| 127 | L | 75.84 |
| 128 | H2 | 66.02 |
| 129 | M | 65.06 |
| 130 | H1 | 29.52 |
| 131 | L | 66.69 |
| 132 | H2 | 52.56 |
| 133 | M | 55.79 |
| 134 | H1 | 28.21 |
| 135 | L | 77.81 |
| 136 | H2 | 50.78 |
| 137 | M | 55.01 |
| 138 | H1 | 42.39 |
| 139 | L | 74.07 |
| 140 | H2 | 55.69 |
| 141 | M | 44.87 |
| 142 | H1 | 40.6 |
| 143 | L | 52.48 |
| 144 | H2 | 42.91 |
| 145 | M | 56.45 |
| 146 | H1 | 42.07 |
| 147 | L | 45.32 |
| 148 | H2 | 109.5 |
| 149 | M | 15.59 |
| 150 | H1 | 26.66 |
| 151 | L | 3.64 |

TABLE 12

| | EXAMPLE 8 |
|---|---|
| PRISM | S-LAH55 |
| H LAYER | $TiO_2$ |
| M LAYER | $Al_2O_3$ |
| L LAYER | $MgF_2$ |
| INCIDENT ANGLE | 45 ± 2° |
| FIRST WAVELENGTH BAND | BLUE |
| SECOND WAVELENGTH BAND | RED |

| LAYER NUMBER | MATERIAL | FILM THICKNESS |
|---|---|---|
| 1 | M | 152.22 |
| 2 | L | 71.49 |
| 3 | M | 173.34 |
| 4 | H | 24.18 |
| 5 | M | 152.08 |
| 6 | L | 128.01 |
| 7 | M | 139.44 |
| 8 | H | 38.04 |
| 9 | M | 134.43 |
| 10 | L | 153.05 |

TABLE 12-continued

| | | |
|---|---|---|
| 11 | M | 130.58 |
| 12 | H | 37.56 |
| 13 | M | 128.45 |
| 14 | L | 204.7 |
| 15 | M | 116.37 |
| 16 | H | 47.66 |
| 17 | M | 115.53 |
| 18 | L | 206.51 |
| 19 | M | 121.15 |
| 20 | H | 43.08 |
| 21 | M | 123.87 |
| 22 | L | 195.76 |
| 23 | M | 112.73 |
| 24 | H | 58.22 |
| 25 | M | 105.01 |
| 26 | L | 202.96 |
| 27 | M | 116.41 |
| 28 | H | 50.02 |
| 29 | M | 124.79 |
| 30 | L | 169.06 |
| 31 | M | 130.68 |
| 32 | H | 56.79 |
| 33 | M | 152.96 |
| 34 | L | 122.8 |
| 35 | M | 172.4 |
| 36 | H | 15 |
| 37 | L | 17.03 |
| 38 | H | 46.99 |
| 39 | M | 98.21 |
| 40 | H | 15 |
| 41 | L | 118.64 |
| 42 | H | 28.44 |
| 43 | M | 93.76 |
| 44 | H | 17.96 |
| 45 | L | 95.72 |
| 46 | H | 26.23 |
| 47 | M | 81.62 |
| 48 | H | 30.05 |
| 49 | L | 126.35 |
| 50 | H | 33.3 |
| 51 | M | 69.05 |
| 52 | H | 36.43 |
| 53 | L | 110.09 |
| 54 | H | 33.97 |
| 55 | M | 60.1 |
| 56 | H | 34.1 |
| 57 | L | 85.72 |
| 58 | H | 24.37 |
| 59 | M | 78.42 |
| 60 | H | 35.69 |
| 61 | L | 113.53 |
| 62 | H | 15.16 |
| 63 | M | 128.04 |
| 64 | H | 22.6 |
| 65 | L | 34.67 |

(nm)

TABLE 13

| | EXAMPLE 9 |
|---|---|
| PRISM | S-LAH55 |
| H LAYER | $TiO_2$ |
| M LAYER | $Al_2O_3$ |
| L LAYER | $MgF_2$ |
| INCIDENT ANGLE | 45 ± 2° |
| FIRST WAVELENGTH BAND | BLUE |
| SECOND WAVELENGTH BAND | RED |

| LAYER NUMBER | MATERIAL | FILM THICKNESS |
|---|---|---|
| 1 | M | 160.04 |
| 2 | L | 88.86 |

TABLE 13-continued

| | | |
|---|---|---|
| 3 | M | 172.22 |
| 4 | H | 32.53 |
| 5 | M | 156.68 |
| 6 | L | 125.64 |
| 7 | M | 147.62 |
| 8 | H | 31.14 |
| 9 | M | 147.24 |
| 10 | L | 146.48 |
| 11 | M | 136.3 |
| 12 | H | 45.08 |
| 13 | M | 131.78 |
| 14 | L | 200.26 |
| 15 | M | 129.64 |
| 16 | H | 44.92 |
| 17 | M | 125.52 |
| 18 | L | 182.86 |
| 19 | M | 127.71 |
| 20 | H | 45.17 |
| 21 | M | 130.32 |
| 22 | L | 215.91 |
| 23 | M | 129.55 |
| 24 | H | 49.36 |
| 25 | M | 129 |
| 26 | L | 154.2 |
| 27 | M | 135.74 |
| 28 | H | 47.5 |
| 29 | M | 139.3 |
| 30 | L | 156.4 |
| 31 | M | 134.38 |
| 32 | H | 64.35 |
| 33 | M | 148.16 |
| 34 | L | 145.67 |
| 35 | M | 154.6 |
| 36 | H | 65.19 |
| 37 | M | 147.8 |
| 38 | L | 164.92 |
| 39 | M | 148.46 |
| 40 | H | 64.49 |
| 41 | M | 148.32 |
| 42 | L | 159.44 |
| 43 | M | 153.92 |
| 44 | H | 65.86 |
| 45 | M | 150.29 |
| 46 | L | 175.25 |
| 47 | M | 150.17 |
| 48 | H | 64.19 |
| 49 | M | 148.56 |
| 50 | L | 152.2 |
| 51 | M | 168.21 |
| 52 | H | 19.24 |
| 53 | M | 436.52 |
| 54 | L | 103.34 |
| 55 | M | 92.74 |
| 56 | H | 118.36 |
| 57 | M | 72.01 |
| 58 | L | 105.84 |
| 59 | M | 28.98 |
| 60 | H | 124.08 |
| 61 | M | 95.07 |
| 62 | L | 111.28 |
| 63 | M | 63.11 |

(nm)

TABLE 14

| | EXAMPLE 10 FIFTH MULTILAYER FILM |
|---|---|
| PRISM | S-LAH55 |
| H LAYER | TiO$_2$ |
| M LAYER | Al$_2$O$_3$ |
| L LAYER | MgF$_2$ |
| INCIDENT ANGLE | 45 ± 2° |
| FIRST WAVELENGTH BAND | BLUE |
| SECOND WAVELENGTH BAND | RED |

| LAYER NUMBER | MATERIAL | FILM THICKNESS |
|---|---|---|
| 1 | M | 160.04 |
| 2 | L | 88.86 |
| 3 | M | 172.22 |
| 4 | H | 32.53 |
| 5 | M | 156.68 |
| 6 | L | 125.64 |
| 7 | M | 147.62 |
| 8 | H | 31.14 |
| 9 | M | 147.24 |
| 10 | L | 146.48 |
| 11 | M | 136.3 |
| 12 | H | 45.08 |
| 13 | M | 131.78 |
| 14 | L | 200.26 |
| 15 | M | 129.64 |
| 16 | H | 44.92 |
| 17 | M | 125.52 |
| 18 | L | 182.86 |
| 19 | M | 127.71 |
| 20 | H | 45.17 |
| 21 | M | 130.32 |
| 22 | L | 215.91 |
| 23 | M | 129.55 |
| 24 | H | 49.36 |
| 25 | M | 129 |
| 26 | L | 154.2 |
| 27 | M | 135.74 |
| 28 | H | 47.5 |
| 29 | M | 139.3 |
| 30 | L | 156.4 |
| 31 | M | 134.38 |
| 32 | H | 64.35 |
| 33 | M | 148.16 |
| 34 | L | 145.67 |
| 35 | M | 154.6 |
| 36 | H | 65.19 |
| 37 | M | 147.8 |
| 38 | L | 164.92 |
| 39 | M | 148.46 |
| 40 | H | 64.49 |
| 41 | M | 148.32 |
| 42 | L | 159.44 |
| 43 | M | 153.92 |
| 44 | H | 65.86 |
| 45 | M | 150.29 |
| 46 | L | 175.25 |
| 47 | M | 150.17 |
| 48 | H | 64.19 |
| 49 | M | 148.56 |
| 50 | L | 152.2 |
| 51 | M | 168.21 |
| 52 | H | 19.24 |
| 53 | M | 436.52 |
| 54 | L | 103.34 |
| 55 | M | 92.74 |
| 56 | H | 118.36 |
| 57 | M | 72.01 |
| 58 | L | 105.84 |
| 59 | M | 28.98 |
| 60 | H | 124.08 |
| 61 | M | 95.07 |
| 62 | L | 111.28 |
| 63 | M | 63.11 |

(nm)

TABLE 15

|  | EXAMPLE 10 THIRD MULTILAYER FILM |
| --- | --- |
| PRISM | S-LAH55 |
| H LAYER | Ta$_2$O$_5$ |
| L LAYER | Al$_2$O$_3$ |
| INCIDENT ANGLE | 45 ± 2° |
| FIRST WAVELENGTH BAND | BLUE |
| SECOND WAVELENGTH BAND | RED |

| LAYER NUMBER | MATERIAL | FILM THICKNESS |
| --- | --- | --- |
| 1 | L | 46.22 |
| 2 | H | 143.62 |
| 3 | L | 76.75 |
| 4 | H | 132.79 |
| 5 | L | 96.29 |
| 6 | H | 126.37 |
| 7 | L | 98.49 |
| 8 | H | 122.26 |
| 9 | L | 102.47 |
| 10 | H | 124.2 |
| 11 | L | 131.06 |
| 12 | H | 126.09 |
| 13 | L | 145.13 |

(nm)

TABLE 16

|  | EXAMPLE 11 |
| --- | --- |
| PRISM | S-LAH55 |
| H LAYER | TiO$_2$ |
| M LAYER | Al$_2$O$_3$ |
| L LAYER | MgF$_2$ |
| INCIDENT ANGLE | 45° |
| FIRST WAVELENGTH BAND | BLUE |
| SECOND WAVELENGTH BAND | RED |

| LAYER NUMBER | MATERIAL | FILM THICKNESS |
| --- | --- | --- |
| 1 | H | 32.17 |
| 2 | L | 50.59 |
| 3 | M | 126.48 |
| 4 | L | 67.2 |
| 5 | H | 81.8 |
| 6 | L | 53.46 |
| 7 | M | 122.26 |
| 8 | L | 24.94 |
| 9 | H | 55.29 |
| 10 | L | 10.2 |
| 11 | M | 102.96 |
| 12 | L | 179.91 |
| 13 | H | 18.77 |
| 14 | L | 23.41 |
| 15 | M | 89.33 |
| 16 | L | 116.35 |
| 17 | H | 16.07 |
| 18 | L | 104.14 |
| 19 | M | 107.03 |
| 20 | L | 175.75 |
| 21 | H | 10 |
| 22 | L | 49.46 |
| 23 | M | 106.18 |
| 24 | L | 144.51 |
| 25 | H | 10 |
| 26 | L | 93.96 |
| 27 | M | 107.54 |
| 28 | L | 104.12 |
| 29 | H | 11.47 |
| 30 | L | 137.83 |
| 31 | M | 107.68 |
| 32 | L | 88.54 |
| 33 | H | 11.42 |
| 34 | L | 142.16 |
| 35 | M | 105.07 |
| 36 | L | 114.77 |
| 37 | H | 26.14 |
| 38 | L | 82.63 |
| 39 | M | 103.54 |
| 40 | L | 184.4 |

(nm)

TABLE 17

|  | EXAMPLE 12 |
| --- | --- |
| PRISM | S-LAH55 |
| H LAYER | TiO$_2$ |
| M LAYER | Al$_2$O$_3$ |
| L LAYER | MgF$_2$ |
| INCIDENT ANGLE | 45 ± 2° |
| FIRST WAVELENGTH BAND | BLUE |
| SECOND WAVELENGTH BAND | RED |

| LAYER NUMBER | MATERIAL | FILM THICKNESS |
| --- | --- | --- |
| 1 | H | 10.54 |
| 2 | L | 61.9 |
| 3 | M | 146.54 |
| 4 | L | 10.1 |
| 5 | H | 85.33 |
| 6 | L | 44.89 |
| 7 | M | 123.62 |
| 8 | L | 57.47 |
| 9 | H | 36.54 |
| 10 | L | 35.95 |
| 11 | M | 136.27 |
| 12 | L | 75.06 |
| 13 | H | 24.42 |
| 14 | L | 36.59 |
| 15 | M | 140.66 |
| 16 | L | 90.83 |
| 17 | H | 30.48 |
| 18 | L | 25.71 |
| 19 | M | 159.82 |
| 20 | L | 108.21 |
| 21 | H | 36.1 |
| 22 | L | 10 |
| 23 | M | 80.58 |
| 24 | L | 18 |
| 25 | H | 15.73 |
| 26 | L | 123.02 |
| 27 | M | 154.04 |
| 28 | L | 56.22 |
| 29 | H | 10 |
| 30 | L | 89.07 |
| 31 | M | 145.08 |
| 32 | L | 42.49 |
| 33 | H | 21.86 |
| 34 | L | 79.01 |
| 35 | M | 144.7 |
| 36 | L | 43.36 |
| 37 | H | 15.16 |
| 38 | L | 81.05 |
| 39 | M | 157.24 |
| 40 | L | 45.98 |
| 41 | H | 18.2 |
| 42 | L | 73.69 |
| 43 | M | 138.9 |
| 44 | L | 28.12 |
| 45 | H | 26.13 |
| 46 | L | 68.66 |
| 47 | M | 142.26 |
| 48 | L | 61.34 |
| 49 | H | 20.5 |
| 50 | L | 51.78 |
| 51 | M | 113.97 |

TABLE 17-continued

| | | |
|---|---|---|
| 52 | L | 60.95 |
| 53 | H | 20.74 |
| 54 | L | 41.45 |
| 55 | M | 108.42 |
| 56 | L | 77.69 |
| 57 | H | 12.82 |
| 58 | L | 66.79 |
| 59 | M | 127.23 |
| 60 | L | 67.78 |
| 61 | H | 12.31 |
| 62 | L | 73.12 |
| 63 | M | 126.35 |
| 64 | L | 50.7 |
| 65 | H | 13.37 |
| 66 | L | 73.82 |
| 67 | M | 123.04 |
| 68 | L | 56.34 |
| 69 | H | 13.96 |
| 70 | L | 77.49 |
| 71 | M | 123.52 |
| 72 | L | 42.17 |
| 73 | H | 32.52 |
| 74 | L | 36.45 |
| 75 | M | 106.48 |
| 76 | L | 48.56 |
| 77 | H | 10 |
| 78 | L | 91.94 |
| 79 | M | 136.58 |
| 80 | L | 58.74 |
| 81 | H | 14.81 |
| 82 | L | 18.85 |
| 83 | M | 129.53 |
| 84 | L | 74.36 |
| 85 | H | 10 |
| 86 | L | 86.37 |
| 87 | M | 106 |
| 88 | L | 32.74 |
| 89 | H | 20.4 |
| 90 | L | 47.22 |
| 91 | M | 140.69 |
| 92 | L | 60.09 |
| 93 | H | 18.14 |
| 94 | L | 23.94 |
| 95 | M | 108 |
| 96 | L | 11.61 |
| 97 | H | 16.34 |
| 98 | L | 146.54 |
| 99 | M | 181.46 |
| 100 | L | 50.18 |

(nm)

TABLE 18

| | EXAMPLE 13 |
|---|---|
| PRISM | S-LAH55 |
| H1 LAYER | TiO$_2$ |
| M LAYER | Al$_2$O$_3$ |
| L LAYER | MgF$_2$ |
| INCIDENT ANGLE | 45 ± 2° |
| FIRST WAVELENGTH BAND | BLUE |
| SECOND WAVELENGTH BAND | RED |

| LAYER NUMBER | MATERIAL | FILM THICKNESS |
|---|---|---|
| 1 | M | 27.8 |
| 2 | H | 110.65 |
| 3 | M | 157 |
| 4 | H | 102.94 |
| 5 | M | 116.18 |
| 6 | H | 102.63 |
| 7 | M | 171.4 |
| 8 | H | 108.58 |

TABLE 18-continued

| | | |
|---|---|---|
| 9 | M | 195.47 |
| 10 | H | 102.74 |
| 11 | M | 140.76 |
| 12 | H | 106.87 |
| 13 | M | 200 |
| 14 | H | 10 |
| 15 | L | 58.93 |
| 16 | M | 143.04 |
| 17 | L | 30.44 |
| 18 | H | 22.3 |
| 19 | L | 10.76 |
| 20 | M | 201.74 |
| 21 | L | 37.6 |
| 22 | H | 29.04 |
| 23 | L | 13.65 |
| 24 | M | 178.38 |
| 25 | L | 51.66 |
| 26 | H | 29.98 |
| 27 | L | 28.04 |
| 28 | M | 147.75 |
| 29 | L | 113.16 |
| 30 | H | 30.22 |
| 31 | L | 10 |
| 32 | M | 94.71 |
| 33 | L | 10 |
| 34 | H | 18.84 |
| 35 | L | 96.43 |
| 36 | M | 178.44 |
| 37 | L | 69.74 |
| 38 | H | 23.12 |
| 39 | L | 49.38 |
| 40 | M | 157.54 |
| 41 | L | 82.48 |
| 42 | H | 19.06 |
| 43 | L | 43.06 |
| 44 | M | 146.44 |
| 45 | L | 134.28 |
| 46 | H | 15.27 |
| 47 | L | 10 |
| 48 | M | 117.99 |
| 49 | L | 10 |
| 50 | H | 16.08 |
| 51 | L | 111.53 |
| 52 | M | 143.45 |
| 53 | L | 16.12 |
| 54 | H | 21.7 |
| 55 | L | 76.92 |
| 56 | M | 157.05 |
| 57 | L | 26.02 |
| 58 | H | 33.38 |
| 59 | L | 54.31 |
| 60 | M | 165.5 |
| 61 | L | 31 |
| 62 | H | 26.53 |
| 63 | L | 65.5 |
| 64 | M | 127.67 |
| 65 | L | 62.49 |
| 66 | H | 28.12 |
| 67 | L | 35.5 |
| 68 | M | 110.92 |
| 69 | L | 51.71 |
| 70 | H | 10.9 |
| 71 | L | 75.34 |
| 72 | M | 112.15 |
| 73 | L | 89.74 |
| 74 | H | 14.59 |
| 75 | L | 54.84 |
| 76 | M | 123 |
| 77 | L | 61.44 |
| 78 | H | 12.26 |
| 79 | L | 85 |
| 80 | M | 118.54 |
| 81 | L | 57.99 |
| 82 | H | 13.54 |
| 83 | L | 93.41 |
| 84 | M | 109.89 |
| 85 | L | 49.53 |
| 86 | H | 24.9 |
| 87 | L | 79.87 |

TABLE 18-continued

| | | |
|---|---|---|
| 88 | M | 111.74 |
| 89 | L | 74.13 |
| 90 | H | 27.13 |
| 91 | L | 49.48 |
| 92 | M | 98.69 |
| 93 | L | 108.9 |
| 94 | H | 10 |
| 95 | L | 53.47 |
| 96 | M | 95.36 |
| 97 | L | 43.7 |
| 98 | H | 10.78 |
| 99 | L | 108.93 |
| 100 | M | 101.99 |
| 101 | L | 61.46 |
| 102 | H | 25.7 |
| 103 | L | 80.39 |
| 104 | M | 117.64 |
| 105 | L | 84.62 |

TABLE 18-continued

| | | |
|---|---|---|
| 106 | H | 20.25 |
| 107 | L | 53.43 |
| 108 | M | 85.03 |
| 109 | L | 96.44 |
| 110 | H | 10 |
| 111 | L | 80.49 |
| 112 | M | 113.28 |
| 113 | L | 29.28 |
| 114 | H | 23.9 |
| 115 | L | 32 |
| 116 | M | 149.35 |
| 117 | L | 42.93 |

(nm)

TABLE 19

| | | EXAMPLE | | | | |
|---|---|---|---|---|---|---|
| | | 1 | 2 | 3 | 4 | 5 |
| GENERAL STRUCTURE OF MULTILAYER FILM | | HMHL | HMHL | HMHL | HMHL | HMHL |
| REFRACTIVE INDEX OF INCIDENT-SIDE (PRISM | P | 1.85 | 1.85 | 1.85 | 1.85 | 1.85 |
| MATERIAL OF INCIDENT-SIDE (PRISM | | PBH56 | PBH56 | PBH56 | PBH56 | PBH56 |
| REFRACTIVE INDEX OF HIGH REFRACTIVE INDEX LAYER | H | 2.32 | 2.32 | 2.32 | 2.32 | 2.32 |
| REFRACTIVE INDEX OF MIDDLE REFRACTIVE INDEX LAYER | M | 1.65 | 1.65 | 1.65 | 1.8 1.65 | 1.8 |
| REFRACTIVE INDEX OF LOW REFRACTIVE INDEX LAYER | L | 1.39 | 1.39 | 1.49 | 1.39 1.49 | 1.49 |
| REFRACTIVE INDEX OF EMERGENCE-SIDE (ADHESIVE) | ADHESIVE | 1.55 | 1.55 | 1.55 | 1.55 | 1.55 |
| REFRACTIVE INDEX DIFFERENCE BETWEEN HIGH REFRACTIVE INDEX LAYER AND MIDDLE REFRACTIVE INDEX LAYER | | 0.67 | 0.67 | 0.67 | 0.52~0.67 | 0.52 |
| REFRACTIVE INDEX DIFFERENCE BETWEEN MIDDLE REFRACTIVE INDEX LAYER AND LOW REFRACTIVE INDEX LAYER | | 0.26 | 0.26 | 0.16 | 0.16~0.41 | 0.31 |
| TRANSMITTANCE (%) OF P-POLARIZED LIGHT AT WAVELENGTH OF 430 NM | | 5.71 | 1.36~26.45 | 0.57~18.47 | 92.17~99.78 | 0.83~29.80 |
| TRANSMITTANCE (%) OF S-POLARIZED LIGHT AT WAVELENGTH OF 430 NM | | 98.17 | 91.89~98.64 | 93.10~97.96 | 0.00 | 89.04~91.60 |
| TRANSMITTANCE DIFFERENCE (%) BETWEEN S-POLARIZED LIGHT AND P-POLARIZED LIGHT AT WAVELENGTH OF 430 NM | | 92.46 | 85.43~97.28 | 74.63~97.38 | 92.16~99.76 | 81.80~90.47 |
| TRANSMITTANCE (%) OF P-POLARIZED LIGHT AT WAVELENGTH OF 490 NM | | 2.62 | 3.13~21.72 | 9.66~22.77 | 74.06~97.55 | 8.94~30.88 |
| TRANSMITTANCE (%) OF S-POLARIZED LIGHT AT WAVELENGTH OF 490 NM | | 95.04 | 82.84~96.77 | 92.48~96.72 | 0.04~3.71 | 82.66~96.58 |
| TRANSMITTANCE DIFFERENCE (%) BETWEEN S-POLARIZED LIGHT AND P-POLARIZED LIGHT AT WAVELENGTH OF 490 NM | | 92.42 | 71.21~83.24 | 70.33~87.06 | 72.15~97.51 | 63.74~81.41 |
| TRANSMITTANCE (%) OF P-POLARIZED LIGHT AT WAVELENGTH OF 580 NM (585 NM IN EXAMPLE 4) | | 96.81 | 86.99~93.55 | 81.32~93.55 | 0.71~27.46 | 89.18~82.34 |
| TRASMITTANCE (%) OF S-POLARIZED LIGHT AT WAVELENGTH OF 580 NM (585 NM IN EXAMBLE 4) | | 0.51 | 0.02~13.64 | 0.00~1.81 | 96.42~99.86 | 0.31~12.48 |
| TRANSMITTANCE DIFFERENCE (%) BETWEEN S-POLARIZED LIGHT AND P-POLARIZED LIGHT AT WAVELENGTH OF 580 NM (585 NM IN EXAMPLE 4) | | 96.29 | 73.35~93.53 | 79.52~93.51 | 70.69~98.16 | 79.85~89.17 |
| TRANSMITTANCE (%) OF P-POLARIZED LIGHT AT WAVELENGTH OF 650 NM | | 99.74 | 93.55~99.32 | 88.70~97.06 | 9.49~20.46 | 90.13~99.82 |

TABLE 19-continued

|  |  | | | | | |
|---|---|---|---|---|---|---|
| TRANSMITTANCE (%) OF P-POLARIZED LIGHT AT WAVELENGTH OF 650 NM | | 3.45 | 1.01~6.78 | 0.04~5.35 | 93.48~99.32 | 2.65~14.73 |
| TRANSMITTANCE DIFFERENCE (%) BETWEEN S-POLARIZED LIGHT AND P-POLARIZED LIGHT AT WAVELENGTH OF 650 NM | | 96.29 | 80.33~88.22 | 76.52~85.36 | 76.52~85.35 | 75.41~85.93 |

| | | EXAMPLE | | | |
|---|---|---|---|---|---|
| | | 6 | 7 | 8 | 9 |
| GENERAL STRUCTURE OF MULTILAYER FILM | | HMHL | HMHL | MLMH | MLMH |
| REFRACTIVE INDEX OF INCIDENT-SIDE (PRISM | P | 1.7 | 1.85 | 1.84 | 1.84 |
| MATERIAL OF INCIDENT-SIDE (PRISM | | S-LAL14 | PBH56 | S-LAH55 | S-LAH55 |
| REFRACTIVE INDEX OF HIGH REFRACTIVE INDEX LAYER | H | 2.32 | 2.32<br>2.15 | 2.32 | 2.32 |
| REFRACTIVE INDEX OF MIDDLE REFRACTIVE INDEX LAYER | M | 1.65 | 1.65 | 1.65 | 1.65 |
| REFRACTIVE INDEX OF LOW REFRACTIVE INDEX LAYER | L | 1.39 | 1.39 | 1.39 | 1.39 |
| REFRACTIVE INDEX OF EMERGENCE-SIDE (ADHESIVE) | ADHESIVE | 1.55 | 1.55 | 1.55 | 1.55 |
| REFRACTIVE INDEX DIFFERENCE BETWEEN HIGH REFRACTIVE INDEX LAYER AND MIDDLE REFRACTIVE INDEX LAYER | | 0.67 | 0.5~0.67 | 0.67 | 0.67 |
| REFRACTIVE INDEX DIFFERENCE BETWEEN MIDDLE REFRACTIVE INDEX LAYER AND LOW REFRACTIVE INDEX LAYER | | 0.26 | 0.26 | 0.26 | 0.26 |
| TRANSMITTANCE (%) OF P-POLARIZED LIGHT AT WAVELENGTH OF 430 NM | | 0.30~18.54 | 0.40~16.71 | 0.27~7.99 | 0.11~7.96 |
| TRANSMITTANCE (%) OF S-POLARIZED LIGHT AT WAVELENGTH OF 430 NM | | 92.38~96.98 | 91.33~93.38 | 94.28~95.02 | 94.77~98.53 |
| TRANSMITTANCE DIFFERENCE (%) BETWEEN S-POLARIZED LIGHT AND P-POLARIZED LIGHT AT WAVELENGTH OF 430 NM | | 73.84~96.68 | 75.40~92.57 | 86.85~94.60 | 86.80~96.41 |
| TRANSMITTANCE (%) OF P-POLARIZED LIGHT AT WAVELENGTH OF 490 NM | | 7.37~18.76 | 4.43~18.88 | 5.08~7.13 | 5.48~9.12 |
| TRANSMITTANCE (%) OF S-POLARIZED LIGHT AT WAVELENGTH OF 490 NM | | 91.05~99.96 | 85.88~97.04 | 94.33~96.91 | 94.73~98.05 |
| TRANSMITTANCE DIFFERENCE (%) BETWEEN S-POLARIZED LIGHT AND P-POLARIZED LIGHT AT WAVELENGTH OF 490 NM | | 72.29~81.39 | 78.15~83.59 | 87.95~91.80 | 85.61~89.66 |
| TRANSMITTANCE (%) OF P-POLARIZED LIGHT AT WAVELENGTH OF 580 NM (585 NM IN EXAMPLE 4) | | 87.28~98.30 | 91.09~96.86 | 94.52~95.26 | 93.10~99.30 |
| TRASMITTANCE (%) OF S-POLARIZED LIGHT AT WAVELENGTH OF 580 NM (585 NM IN EXAMPLE 4) | | 0.27~4.48 | 0.07~19.75 | 0.04~3.72 | 1.08~3.60 |
| TRANSMITTANCE DIFFERENCE (%) BETWEEN S-POLARIZED LIGHT AND P-POLARIZED LIGHT AT WAVELENGTH OF 580 NM (585 NM IN EXAMPLE 4) | | 87.01~96.70 | 73.67~98.58 | 90.81~95.22 | 89.30~96.94 |
| TRANSMITTANCE (%) OF P-POLARIZED LIGHT AT WAVELENGTH OF 650 NM | | 88.75~99.47 | 86.90~99.30 | 94.79~99.91 | 94.87~99.09 |
| TRANSMITTANCE (%) OF P-POLARIZED LIGHT AT WAVELENGTH OF 650 NM | | 1.76~6.16 | 1.57~4.79 | 0.00~5.25 | 0.01~5.34 |
| TRANSMITTANCE DIFFERENCE (%) BETWEEN S-POLARIZED LIGHT AND P-POLARIZED LIGHT AT WAVELENGTH OF 650 NM | | 86.46~97.71 | 84.22~95.18 | 84.66~94.79 | 91.47~94.86 |

| | | EXAMPLE | | | |
|---|---|---|---|---|---|
| | | 10 | 11 | 12 | 13 |
| GENERAL STRUCTURE OF MULTILAYER FILM | | MLMH | LMLH | LMLH | LMLH |
| REFRACTIVE INDEX OF INCIDENT-SIDE (PRISM | P | 1.84 | 1.84 | 1.84 | 1.84 |
| MATERIAL OF INCIDENT-SIDE (PRISM | | S-LAH55 | S-LAH55 | S-LAH55 | S-LAH55 |
| REFRACTIVE INDEX OF HIGH REFRACTIVE INDEX LAYER | H | 2.15 | 2.32 | 2.32 | 2.32 |

TABLE 19-continued

| | | | | | |
|---|---|---|---|---|---|
| REFRACTIVE INDEX OF MIDDLE REFRACTIVE INDEX LAYER | M | 1.65 | 1.65 | 1.65 | 1.65 |
| REFRACTIVE INDEX OF LOW REFRACTIVE INDEX LAYER | L | 1.39 | 1.39 | 1.39 | 1.39 |
| REFRACTIVE INDEX OF EMERGENCE-SIDE (ADHESIVE) | ADHESIVE | 1.55 | 1.55 | 1.55 | 1.55 |
| REFRACTIVE INDEX DIFFERENCE BETWEEN HIGH REFRACTIVE INDEX LAYER AND MIDDLE REFRACTIVE INDEX LAYER | | 0.5 | 0.67 | 0.67 | 0.67 |
| REFRACTIVE INDEX DIFFERENCE BETWEEN MIDDLE REFRACTIVE INDEX LAYER AND LOW REFRACTIVE INDEX LAYER | | 0.26 | 0.26 | 0.26 | 0.26 |
| TRANSMITTANCE (%) OF P-POLARIZED LIGHT AT WAVELENGTH OF 430 NM | | 0.72~18.01 | 3.79 | 0.62~8.02 | 0.13~5.21 |
| TRANSMITTANCE (%) OF S-POLARIZED LIGHT AT WAVELENGTH OF 430 NM | | 94.40~96.98 | 96.93 | 94.01~98.41 | 94.92~97.85 |
| TRANSMITTANCE DIFFERENCE (%) BETWEEN S-POLARIZED LIGHT AND P-POLARIZED LIGHT AT WAVELENGTH OF 430 NM | | 78.08~96.23 | 93.14 | 86.86~97.79 | 89.74~96.94 |
| TRANSMITTANCE (%) OF P-POLARIZED LIGHT AT WAVELENGTH OF 490 NM | | 10.89~15.62 | 3.49 | 5.64~8.92 | 4.47~5.59 |
| TRANSMITTANCE (%) OF S-POLARIZED LIGHT AT WAVELENGTH OF 490 NM | | 94.95~97.41 | 96.57 | 94.38~95.73 | 94.96~98.98 |
| TRANSMITTANCE DIFFERENCE (%) BETWEEN S-POLARIZED LIGHT AND P-POLARIZED LIGHT AT WAVELENGTH OF 490 NM | | 79.33~84.90 | 93.09 | 85.52~90.09 | 89.38~94.24 |
| TRANSMITTANCE (%) OF P-POLARIZED LIGHT AT WAVELENGTH OF 580 NM (585 NM IN EXAMPLE 4) | | 91.28~97.42 | 98.72 | 92.68~7.81 | 94.84~98.72 |
| TRASMITTANCE (%) OF S-POLARIZED LIGHT AT WAVELENGTH OF 580 NM (585 NM IN EXAMPLE 4) | | 2.36~9.33 | 0.77 | 0.14~3.36 | 0.11~0.35 |
| TRANSMITTANCE DIFFERENCE (%) BETWEEN S-POLARIZED LIGHT AND P-POLARIZED LIGHT AT WAVELENGTH OF 580 NM (585 NM IN EXAMPLE 4) | | 83.85~93.28 | 97.95 | 89.32~87.77 | 94.49~98.43 |
| TRANSMITTANCE (%) OF P-POLARIZED LIGHT AT WAVELENGTH OF 650 NM | | 92.04~99.32 | 97.66 | 98.46~98.96 | 95.64~98.72 |
| TRANSMITTANCE (%) OF P-POLARIZED LIGHT AT WAVELENGTH OF 650 NM | | 0.01~5.34 | 3.29 | 4.95~5.63 | 0.01~0.49 |
| TRANSMITTANCE DIFFERENCE (%) BETWEEN S-POLARIZED LIGHT AND P-POLARIZED LIGHT AT WAVELENGTH OF 650 NM | | 92.03~95.32 | 94.37 | 92.83~94.01 | 95.15~98.72 |

What is claimed is:

1. A polarization beam splitter comprising:
a multilayer film formed by laminating a first layer having a refractive index in a first range, a second layer having a refractive index in a second range which does not overlap the first range, and a third layer having a refractive index in a third range which does not overlap the first or second range in the order of the first layer, the second layer, the first layer, and the third layer,
wherein the transmittance of s-polarized light is 60% or more higher than the transmittance of p-polarized light in a first wavelength region,
the transmittance of p-polarized light is 60% or more higher than the transmittance of s-polarized light in a second wavelength region different from the first wavelength region, and
each of the first wavelength region and the second wavelength region has a bandwidth equal to or larger than 30 nm.

2. The polarization beam splitter according to claim 1, wherein the multilayer film is a multilayer film formed by laminating the first layer, the second layer, the first layer, and the third layer in this order in succession five times or more.

3. The polarization beam splitter according to claim 1, wherein the first wavelength region and the second wavelength region are included in region of visible wavelength from 400 nm or higher and 700 nm or lower.

4. The polarization beam splitter according to claim 1, wherein the first wavelength region includes a band of 450 nm to 480 nm and the second wavelength region includes a band of 600 nm to 630 nm.

5. The polarization beam splitter according to claim 1, wherein, when a layer of the first, second, and third layers with the highest refractive index is an H layer, a high refractive index layer, a layer of the three layers with the second highest refractive index is an M layer, a middle refractive index layer, and a layer of the three layers with the lowest refractive index is an L layer, a low refractive index layer, then the high refractive index layer has a refractive index of 2.0 or higher and 2.6 or lower, the middle refractive index layer has a refractive index of 1.59 or higher and 1.9 or lower, and the low refractive index layer has a refractive index of 1.25 or higher and 1.56 or lower.

6. The polarization beam splitter according to claim 1, wherein, when a layer of the first, second, and third layers with the highest refractive index is an H layer, a high refractive index layer, a layer of the three layers with the second highest refractive index is an M layer, a middle refractive index layer, and a layer of the three layers with the lowest refractive index is an L layer, a low refractive index layer, then the difference in the refractive index between the high refractive index layer and the middle refractive index layer is 0.35 or higher and 0.9 or lower, and the difference in the refractive index between the middle refractive index layer and the lower refractive index layer is 0.12 or higher and 0.55 or lower.

7. The polarization beam splitter according to claim 1, wherein the multilayer film is sandwiched between a substance made of a first material having a refractive index of 1.55 or higher and 2.10 or lower and a substance made of a second material having a refractive index of 1.40 or higher and 1.70 or lower.

8. The polarization beam splitter according to claim 1, wherein at least one of the first layer, the second layer, and the third layer includes two layers having refractive indexes different from each other.

9. The polarization beam splitter according to claim 1, wherein the first range corresponds to the highest range of refractive indexes of the first, second, and third ranges.

10. The polarization beam splitter according to claim 9, wherein, when a layer of the first, second, and third layers with the highest refractive index is an H layer, a layer of the three layers with the second highest refractive index is an M layer, a layer of the three layers with the lowest refractive index is an L layer, the refractive indexes of the H layer, L layer, and M layer are represented as $n_H$, $n_L$, and $n_M$, a design wavelength is represented as $\lambda$, the multilayer film is formed by laminating the first H layer, the M layer, the second H layer, and the L layer in this order in succession, and the film thickness of the first H layer, the M layer, the second H layer, and the L layer are represented as $b\times\lambda/(4n_H)$, $c\times\lambda/(4n_M)$, $d\times\lambda/(4n_H)$, $a\times\lambda/(4n_L)$, then $0<a<3$, $0<b\leq1$, $0<c<5$, and $0<d\leq1$ are satisfied.

11. The polarization beam splitter according to claim 9, wherein, when a layer of the first, second, and third layers with the highest refractive index is an H layer, a layer of the three layers with the second highest refractive index is an M layer, a layer of the three layers with the lowest refractive index is an L layer, the refractive indexes of the H layer, L layer, and M layer are represented as $n_H$, $n_L$, and $n_M$, a design wavelength is represented as $\lambda$, the multilayer film is formed by laminating the first H layer, the M layer, the second H layer, and the L layer in this order in succession, and the film thickness of the first H layer, the M layer, the second H layer, and the L layer are represented as $b\times\lambda/(4n_H)$, $c\times\lambda/(4n_M)$, $d\times\lambda/(4n_H)$, $a\times\lambda/(4n_L)$, then $0<b\leq a\leq c<5$, $0<d\leq a\leq c<5$ are satisfied.

12. The polarization beam splitter according to claim 1, wherein the first range corresponds to the second highest range of refractive indexes of the first, second, and third ranges.

13. The polarization beam splitter according to claim 12, wherein, when a layer of the first, second, and third layers with the highest refractive index is an H layer, a layer of the three layers with the second highest refractive index is an M layer, a layer of the three layers with the lowest refractive index is an L layer, the refractive indexes of the H layer, L layer, and M layer are represented as $n_H$, $n_L$, and $n_M$, a design wavelength is represented as $\lambda$, the multilayer film is formed by laminating the first M layer, the L layer, the second M layer, and the H layer in this order in succession, and the film thickness of the first M layer, the L layer, the second M layer, and the H layer are represented as $a\times\lambda/(4\text{ nm})$, $b\times\lambda/(4n_L)$, $c\times\lambda/(4n_M)$, $d\times\lambda/(4n_H)$, then $0<a<6$, $0<c<6$, $d<b$, $0<b<5$, and $0<d<2$ are satisfied.

14. The polarization beam splitter according to claim 12, wherein, when a layer of the first, second, and third layers with the highest refractive index is an H layer, a layer of the three layers with the second highest refractive index is an M layer, a layer of the three layers with the lowest refractive index is an L layer, the refractive indexes of the H layer, L layer, and M layer are represented as $n_H$, $n_L$, and $n_M$, a design wavelength is represented as $\lambda$, the multilayer film is formed by laminating the first M layer, the L layer, the second M layer, and the H layer in this order in succession, and the film thickness of the first M layer, the L layer, the second M layer, and the H layer are represented as $a\times\lambda/(4n_M)$, $b\times\lambda/(4n_L)$, $c\times\lambda/(4n_M)$, $d\times\lambda/(4n_H)$, then $0<a<3$, $0<c<6$, $d<b$, $0<b<2$, and $0<d<1$ are satisfied.

15. The polarization beam splitter according to claim 1, wherein the first range corresponds to the lowest range of refractive indexes of the first, second, and third ranges.

16. The polarization beam splitter according to claim 15, wherein, when a layer of the first, second, and third layers with the highest refractive index is an H layer, a layer of the three layers with the second highest refractive index is an M layer, a layer of the three layers with the lowest refractive index is an L layer, the refractive indexes of the H layer, L layer, and M layer are represented as $n_H$, $n_L$, and $n_M$, a design wavelength is represented as $\lambda$, the multilayer film is formed by laminating the first L layer, the H layer, the second L layer, and the M layer in this order in succession, and the film thickness of the first L layer, the H layer, the second L layer, and the M layer are represented as $a\times\lambda/(4n_L)$, $b\times\lambda/(4n_H)$, $c\times\lambda/(4n_L)$, $d\times\lambda/(4n_M)$, then $0<a<3$, $0<b<5$, $d<b$, $0<c<3$, and $0<d\leq1$ are satisfied.

17. The polarization beam splitter according to claim 15, wherein, when a layer of the first, second, and third layers with the highest refractive index is an H layer, a layer of the three layers with the second highest refractive index is an M layer, a layer of the three layers with the lowest refractive index is an L layer, the refractive indexes of the H layer, L layer, and M layer are represented as $n_H$, $n_L$, and $n_M$, a design wavelength is represented as $\lambda$, the multilayer film is formed by laminating the first L layer, the H layer, the second L layer, and the M layer in this order in succession, and the film thickness of the first L layer, the H layer, the second L layer, and the M layer are represented as $a\times\lambda/(4n_L)$, $b\times\lambda/(4n_H)$, $c\times\lambda/(4n_L)$, $d\times\lambda/(4n_M)$, then $0<b\leq a\leq c<5$, $0<d\leq a\leq c<5$ are satisfied.

18. An image display apparatus comprising:
   a first image display device;
   a second image display device;
   a color combination optical system which combines first image light emerging from the first image display device and second image light emerging from the second image display device,
   wherein the color combination optical system has the polarization beam splitter according to claim 1.

19. An image display apparatus comprising:
   a first reflection type liquid crystal display device which is provided for first color light;
   a second reflection type liquid crystal display device which is provided for second color light different from the first color light;

an illumination optical system which illuminates the first and second reflection type liquid crystal display devices with light from a light source; and a projection optical system which projects light from the first and second reflection type liquid crystal display devices to a projected surface, wherein the illumination optical system includes the polarization beam splitter according to claim 1, and the first color light in a first polarization state and the second color light in the first polarization state are directed to the polarization beam splitter to illuminate the first reflection type liquid crystal display device with the first color light in the first polarization state and illuminate the second reflection type liquid crystal display device with the second color light in the first polarization state, and the polarization beam splitter color-combines the first color light in a second polarization state and the second color light in the second polarization state emerging from the first reflection type liquid crystal display device and the second reflection type liquid crystal display device, respectively, to direct the combined light to the projection optical system, the second polarization state showing a polarization direction orthogonal to the first polarization state.

* * * * *